(12) United States Patent  
Hu et al.

(10) Patent No.: US 12,126,539 B2  
(45) Date of Patent: Oct. 22, 2024

(54) COMMUNICATION METHOD, APPARATUS, AND SYSTEM

(71) Applicant: HUAWEI TECHNOLOGIES CO., LTD., Shenzhen (CN)

(72) Inventors: Xingxing Hu, Shanghai (CN); Hongping Zhang, Shenzhen (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 469 days.

(21) Appl. No.: 17/514,332

(22) Filed: Oct. 29, 2021

(65) Prior Publication Data

US 2022/0052956 A1   Feb. 17, 2022

Related U.S. Application Data

(63) Continuation of application No. PCT/CN2020/087223, filed on Apr. 27, 2020.

(30) Foreign Application Priority Data

Apr. 30, 2019 (CN) .......................... 201910366086

(51) Int. Cl.  
 *H04L 47/283* (2022.01)  
 *H04W 28/02* (2009.01)  
 *H04W 72/23* (2023.01)

(52) U.S. Cl.  
 CPC ....... *H04L 47/283* (2013.01); *H04W 28/0268* (2013.01); *H04W 72/23* (2023.01)

(58) Field of Classification Search  
 None  
 See application file for complete search history.

(56) References Cited

U.S. PATENT DOCUMENTS

| 2018/0206173 | A1  | 7/2018  | Virtej et al. |
| 2019/0029057 | A1  | 1/2019  | Pan et al. |
| 2020/0314862 | A1* | 10/2020 | Wu .......................... H04L 1/08 |

FOREIGN PATENT DOCUMENTS

| CN | 106937305 A | 7/2017 |
| CN | 108377567 A | 8/2018 |

(Continued)

OTHER PUBLICATIONS

3GPP Draft; TR 37.816 V0.3.0, "3rd Generation Partnership Project; Technical Specification Group Radio Access Network; Evolved Universal Terrestrial Radio Access (E-UTRA) and and NR; Study on RAN-centric data collection and utilization for LTE and NR (Release 16)", Apr. 29, 2019, XP051712424, total 26 pages.

(Continued)

*Primary Examiner* — Alex Skripnikov  
(74) *Attorney, Agent, or Firm* — Maier & Maier, PLLC

(57) ABSTRACT

A communication method, a related device, and a system. The method includes: a first network device receives first information from a terminal device, where the first information includes a first delay and a second delay, the first delay is a delay of the terminal device on a first path, the second delay is a delay of the terminal device on a second path, and data packets transmitted on the first path and the second path belong to a first data radio bearer (DRB). The first network device determines an uplink delay of the first DRB based on the first information, a fourth delay, and a fifth delay, where the fourth delay is a network-side delay on the first path, and the fifth delay is a network-side delay on the second path.

17 Claims, 17 Drawing Sheets

(56) References Cited

FOREIGN PATENT DOCUMENTS

| | | | |
|---|---|---|---|
| CN | 108632879 A | 10/2018 |
| CN | 108809548 A | 11/2018 |
| CN | 108924876 A | 11/2018 |
| CN | 109526029 A | 3/2019 |
| CN | 109548085 A | 3/2019 |
| CN | 109672510 A | 4/2019 |
| EP | 3456006 A1 | 3/2019 |

OTHER PUBLICATIONS

Qualcomm Incorporated: "Summary of email discussion [105#44] [NR/RD-CU] delay measurements in NR MDT", 3GPP Draft; R2-1904372,Apr. 6, 2019, XP051701677, total 20 pages.

Huawei et al: "Discussion on latency measurement in MR-DC", 3GPP Draft; R2-1909733,Aug. 16, 2019, XP051767528, total 4 pages.

"3rd Generation Partnership Project; Technical Specification Group Radio Access Network; NR; Radio Resource Control (RRC) protocol specification (Release 15)", 3GPP TS 38.331 V15.5.1 (Apr. 2019), 491 pages.

"3rd Generation Partnership Project; Technical Specification Group Services and System Aspects; System Architecture for the 5G System; Stage 2 (Release 16)", 3GPP TS 23.501 V16.0.2 (Apr. 2019), 317 pages.

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.5.0 (Mar. 2019), 68 pages.

"3rd Generation Partnership Project; Technical Specification Group Services and System Aspects; Management and orchestration; 5G performance measurements(Release 16)", 3GPP TS 28.552 V16.1.0 (Mar. 2019), 87 pages.

"3rd Generation Partnership Project; Technical Specification Group Radio Access Network; NG-RAN; NR user plane protocol(Release 15)", 3GPP TS 38.425 V15.5.0 (Mar. 2019), 22 pages.

3GPP TSG-RAN WG3 Meeting #101bis, "Potential Impacts of Higher Layer Multi-Connectivity related to the Key Issue 1", Ericsson, Chengdu, P.R. China, Oct. 8-12, 2018; 7 pages.

3GPP TSG RAN WG3 #65bis R3-092552, "Relay delay consideration", Huawei, LG Electronics Inc., Miyazaki, Japan, Oct. 12-16, 2009; 12 pages.

\* cited by examiner

COMMUNICATION METHOD, APPARATUS, AND SYSTEM

CROSS-REFERENCE TO RELATED APPLICATIONS

This application is a continuation of International Application No. PCT/CN2020/087223, filed on Apr. 27, 2020, which claims priority to Chinese Patent Application No. 201910366086.2, filed on Apr. 30, 2019. The disclosures of the aforementioned applications are hereby incorporated by reference in their entireties.

TECHNICAL FIELD

The embodiments relate to the field of communication technologies, and in particular, to a communication method, a related device, and a system.

BACKGROUND

With the development of communication requirements, low-latency performance needs to be ensured for an increasing quantity of services. For example, an ultra-reliable low-latency communication (URLLC) service requires a latency less than 0.5 ms. To ensure service performance, a base station needs to measure a transmission delay. In a conventional technology, the base station performs delay measurement based on a data radio bearer (DRB), and in the conventional technology, only a delay measurement method used when user equipment (UE) and one base station perform one-path communication (that is, one DRB corresponds to only one radio link control (RLC) entity bearer) is mentioned. One DRB corresponds to only one RLC entity bearer, in other words, a data packet of one DRB is transmitted on only one RLC entity.

A multi-radio dual connectivity (MR-DC) technology is introduced in a fifth generation (5G) communication technology, and a network side may provide a multi-path communication service for the UE through two or more base stations. However, in the conventional technology, that one-path communication is performed between the UE and one base station is merely provided, and a scenario in which one DRB corresponds to two or more RLC entity bearers is not considered. Therefore, in the scenario in which one DRB corresponds to two or more RLC entity bearers, how to measure a transmission delay of the DRB is a technical problem that needs to be resolved currently.

SUMMARY

Embodiments provide a communication method, a related device, and a system to implement DRB delay measurement in a scenario in which one DRB corresponds to two or more RLC entity bearers.

According to a first aspect, an embodiment provides a communication method, applied to a network side, and the method includes: receiving first information from a terminal device, where the first information includes information about a first delay and information about a second delay, or the first information includes information about a third delay, the first delay is a delay of the terminal device on a first path, the second delay is a delay of the terminal device on a second path, the third delay is obtained by the terminal device based on the delay of the terminal device on the first path and the delay of the terminal device on the second path, the first path is used to transmit a first data packet, the second path is used to transmit a second data packet, and both the first data packet and the second data packet belong to a first DRB; and then, determining an uplink delay of the first DRB based on the first information, a fourth delay, and a fifth delay, where the fourth delay is a network-side delay on the first path, and the fifth delay is a network-side delay on the second path.

In this embodiment, in a scenario in which one DRB corresponds to two or more RLC entity bearers (that is, a data packet of one DRB is transmitted on two or more paths), UE may separately perform UE-side delay measurement on each path, and a network device may separately perform network-side delay measurement on each path, and finally determine an uplink delay of the DRB, thereby implementing DRB delay measurement. The network side measures and obtain the delay of the DRB, so that the network side can adjust resource allocation based on the delay, to meet a delay requirement of a service.

In a possible implementation, this embodiment may be applied to a multi-radio dual connectivity (MR-DC) scenario. In this case, the network-side delay on the first path is a delay of a first network device on the first path, and the network-side delay on the second path is a delay of a second network device on the second path.

In a possible implementation, in the DC scenario, before the determining an uplink delay of the first DRB based on the first information, a fourth delay, and a fifth delay, the method further includes: receiving the fifth delay from a second communication device.

In a possible implementation, this embodiment may also be applied to a carrier aggregation (CA) scenario. In this case, the network-side delay on the first path is a network-side delay on a path corresponding to a first RLC entity of a first network device, and the network-side delay on the second path is a network-side delay on a path corresponding to a second RLC entity of the first network device.

In a possible implementation, the first information includes the information about the first delay and the information about the second delay, and the determining an uplink delay of the first DRB based on the first information, a fourth delay, and a fifth delay includes: determining a first uplink delay based on the first delay and the fourth delay, and determining a second uplink delay based on the second delay and the fifth delay; and determining the uplink delay of the first DRB based on the first uplink delay and the second uplink delay.

Alternatively, the first information includes the information about the third delay, and the determining an uplink delay of the first DRB based on the first information, a fourth delay, and a fifth delay includes: determining a sixth delay based on the fourth delay and the fifth delay, and determining the uplink delay of the first DRB based on the third delay and the sixth delay.

In a possible implementation, if the first information includes the information about the first delay and the information about the second delay, the first information further includes an identifier corresponding to the first delay and an identifier corresponding to the second delay, and the identifiers are used to distinguish between different delays.

Optionally, the identifiers may distinguish between different paths. For example, in the DC scenario, the identifier may be a logical channel (LCH) identifier, a cell group identifier, a base station identifier, or the like. In the CA scenario, the identifier may be a logical channel identifier, a cell group identifier, an RLC identifier, or the like.

In a possible implementation, in the DC scenario, the first delay includes a delay between a time point at which a packet data convergence protocol (PDCP) entity of the terminal device receives the first data packet from an upper layer and a time point at which the terminal device obtains an uplink grant for sending the first data packet to the first network device. Similarly, the second delay includes a delay between a time point at which the PDCP entity of the terminal device receives the second data packet from the upper layer and a time point at which the terminal device obtains an uplink grant for sending the second data packet to the second network device.

In a possible implementation, in the CA scenario, the first delay includes a delay between a time point at which a PDCP entity of the terminal device receives the first data packet from an upper layer and a time point at which the terminal device obtains an uplink grant for sending the first data packet to the first RLC entity. Similarly, the second delay includes a delay between a time point at which the PDCP entity of the terminal device receives the second data packet from the upper layer and a time point at which the terminal device obtains an uplink grant for sending the second data packet to the second RLC entity.

In a possible implementation, in the DC scenario, the fourth delay includes at least one of a hybrid automatic repeat request HARQ transmission delay of the first network device, a delay of an RLC entity of the first network device, a delay of a PDCP entity of the first network device, and a delay of a first interface, and the first interface is a communication interface between a central unit CU of the first network device and a distributed unit DU of the first network device. Similarly, the fifth delay includes at least one of a HARQ transmission delay of the second network device, a delay of an RLC entity of the second network device, and a delay of a second interface, and the second interface is a communication interface between the first network device and the second network device.

In a possible implementation, in the CA scenario, the fourth delay includes at least one of a HARQ transmission delay of the first network device, a delay of the first RLC entity of the first network device, a delay of a PDCP entity of the first network device, and a delay of a first interface, and the first interface is a communication interface between a CU of the network device and a DU of the network device. Similarly, the fifth delay includes at least one of the HARQ transmission delay of the first network device, a delay of the second RLC entity of the first network device, the delay of the PDCP entity of the first network device, and the delay of the first interface.

In a possible implementation, before the receiving first information from a terminal device, the method further includes: sending first indication information to the terminal device, where the first indication information is used to indicate the terminal device to obtain the first information. Optionally, the first indication information may further carry an identifier of the first DRB. In this process, delay measurement configuration may be performed based on a DRB granularity, thereby implementing flexible configuration of DRB delay measurement.

In a possible implementation, before the determining an uplink delay of the first DRB based on the first information, a fourth delay, and a fifth delay, the method further includes: sending second indication information to the second network device, where the second indication information is used to indicate the second network device to obtain the fifth delay. Optionally, the second indication information may further carry the identifier of the first DRB. In this process, delay measurement configuration may be performed based on a DRB granularity, thereby implementing flexible configuration of DRB delay measurement.

In a possible implementation, the method further includes: sending third indication information to the terminal device, where the third indication information is used to indicate the terminal device to stop obtaining the first information. Optionally, the third indication information may further carry the identifier of the first DRB. In this process, DRB delay measurement can be flexibly configured, load of the UE can be reduced, and processing overheads of the UE can be reduced.

In a possible implementation, the method further includes: sending fourth indication information to the second network device, where the fourth indication information is used to indicate the second network device to stop obtaining the fifth delay. Optionally, the fourth indication information may further carry the identifier of the first DRB. In this process, DRB delay measurement can be flexibly configured, load of the second network device can be reduced, and processing overheads of the second network device can be reduced.

According to a second aspect, an embodiment provides another communication method, applied to a terminal device side, and the method includes: obtaining first information, where the first information includes information about a first delay and information about a second delay, or the first information includes information about a third delay, the first delay is a delay of a terminal device on a first path, the second delay is a delay of the terminal device on a second path, the third delay is obtained by the terminal device based on the delay of the terminal device on the first path and the delay of the terminal device on the second path, the first path is used to transmit a first data packet, the second path is used to transmit a second data packet, and both the first data packet and the second data packet belong to a first DRB; and then sending the first information to a first network device.

In this embodiment, in a scenario in which one DRB corresponds to two or more RLC entity bearers (that is, a data packet of one DRB is transmitted on two or more paths), UE may separately perform UE-side delay measurement on each path, and a network device may separately perform network-side delay measurement on each path, and finally determine an uplink delay of the DRB, thereby implementing DRB delay measurement. A network side measures and obtain the delay of the DRB, so that the network side can adjust resource allocation based on the delay, to meet a delay requirement of a service.

In a possible implementation, this embodiment may be applied to a DC scenario. In this case, a network-side delay on the first path is a delay of the first network device on the first path, and a network-side delay on the second path is a delay of a second network device on the second path.

In a possible implementation, this embodiment may also be applied to a CA scenario. In this case, a network-side delay on the first path is a network-side delay on a path corresponding to a first RLC entity of the first network device, and a network-side delay on the second path is a network-side delay on a path corresponding to a second RLC entity of the first network device.

In a possible implementation, if the first information includes the information about the first delay and the information about the second delay, the first information further includes an identifier corresponding to the first delay and an identifier corresponding to the second delay, and the identifiers are used to distinguish between different delays.

Optionally, the identifiers may distinguish between different paths. For example, in the DC scenario, the identifier may be a logical channel (LCH) identifier, a cell group identifier, a base station identifier, or the like. In the CA scenario, the identifier may be a logical channel identifier, a cell group identifier, an RLC identifier, or the like.

In a possible implementation, in the DC scenario, the first delay includes a delay between a time point at which a PDCP entity of the terminal device receives the first data packet from an upper layer and a time point at which the terminal device obtains an uplink grant for sending the first data packet to the first network device, and the second delay includes a delay between a time point at which the PDCP entity of the terminal device receives the second data packet from the upper layer and a time point at which the terminal device obtains an uplink grant for sending the second data packet to the second network device.

In a possible implementation, in the CA scenario, the first delay includes a delay between a time point at which a PDCP entity of the terminal device receives the first data packet from an upper layer and a time point at which the terminal device obtains an uplink grant for sending the first data packet to the first RLC entity, and the second delay includes a delay between a time point at which the PDCP entity of the terminal device receives the second data packet from the upper layer and a time point at which the terminal device obtains an uplink grant for sending the second data packet to the second RLC entity.

In a possible implementation, before the obtaining first information, the method further includes: receiving first indication information from the first network device, where the first indication information is used to indicate the terminal device to obtain the first information. Optionally, the first indication information may further carry an identifier of the first DRB. In this process, delay measurement configuration may be performed based on a DRB granularity, thereby implementing flexible configuration of DRB delay measurement.

In a possible implementation, the method further includes: receiving third indication information from the first network device, where the third indication information is used to indicate the terminal device to stop obtaining the first information. Optionally, the third indication information may further carry the identifier of the first DRB. In this process, DRB delay measurement can be flexibly configured, load of the UE can be reduced, and processing overheads of the UE can be reduced.

According to a third aspect, an embodiment provides a communication method, applied to a network device side, and the method includes: receiving second information from a terminal device, where the second information includes information about a first delay or information about a second delay, the first delay is a delay of the terminal device on a first path, the second delay is a delay of the terminal device on a second path, the first path is used to transmit a first data packet, the second path is used to transmit a second data packet, and both the first data packet and the second data packet belong to a first DRB; and then determining an uplink delay of the first DRB based on the second information and a sixth delay, where if the second information includes the information about the first delay, the sixth delay is a network-side delay on the first path; if the second information includes the information about the second delay, the sixth delay is a network-side delay on the second path.

In this embodiment, in a scenario in which one DRB corresponds to two or more RLC entity bearers (that is, a data packet of one DRB is transmitted on two or more paths), UE may perform UE-side delay measurement on a path, and a network device may perform network-side delay measurement on the path, and finally determine an uplink delay of the DRB, thereby implementing DRB delay measurement. A network side measures and obtain the delay of the DRB, so that the network side can adjust resource allocation based on the delay, to meet a delay requirement of a service.

In a possible implementation, this embodiment may be applied to a DC scenario. In this case, the network-side delay on the first path is a delay of a first network device on the first path, and the network-side delay on the second path is a delay of a second network device on the second path.

In a possible implementation, in the DC scenario, before the determining an uplink delay of the first DRB based on the second information and a sixth delay, the method further includes: receiving a fifth delay from a second communication device.

In a possible implementation, this embodiment may also be applied to a CA scenario. In this case, the network-side delay on the first path is a network-side delay on a path corresponding to a first RLC entity of a first network device, and the network-side delay on the second path is a network-side delay on a path corresponding to a second RLC entity of the first network device.

In a possible implementation, the first information further includes an identifier corresponding to the first delay or an identifier corresponding to the second delay, and the identifiers are used to distinguish between different delays.

Optionally, the identifiers may distinguish between different paths. For example, in the DC scenario, the identifier may be a logical channel (LCH) identifier, a cell group identifier, a base station identifier, or the like. In the CA scenario, the identifier may be a logical channel identifier, a cell group identifier, an RLC identifier, or the like.

In a possible implementation, in the DC scenario, the first delay includes a delay between a time point at which a PDCP entity of the terminal device receives the first data packet from an upper layer and a time point at which the terminal device obtains an uplink grant for sending the first data packet to the first network device.

Alternatively, the second delay includes a delay between a time point at which a PDCP entity of the terminal device receives the second data packet from an upper layer and a time point at which the terminal device obtains an uplink grant for sending the second data packet to the second network device.

In a possible implementation, in the CA scenario, the first delay includes a delay between a time point at which a PDCP entity of the terminal device receives the first data packet from an upper layer and a time point at which the terminal device obtains an uplink grant for sending the first data packet to the first RLC entity.

Alternatively, the second delay includes a delay between a time point at which a PDCP entity of the terminal device receives the second data packet from an upper layer and a time point at which the terminal device obtains an uplink grant for sending the second data packet to the second RLC entity.

In a possible implementation, in the DC scenario, if the second information includes the information about the first delay, the sixth delay includes at least one of a HARQ transmission delay of the first network device, a delay of an RLC entity of the first network device, a delay of a PDCP entity of the first network device, and a delay of a first interface, and the first interface is a communication interface between a CU of the first network device and a DU of the first network device.

Alternatively, if the second information includes the information about the second delay, the sixth delay includes at least one of a HARQ transmission delay of the second network device, a delay of an RLC entity of the second network device, and a delay of a second interface, and the second interface is a communication interface between the first network device and the second network device.

In a possible implementation, in the CA scenario, if the second information includes the information about the first delay, the sixth delay includes at least one of a HARQ transmission delay of the first network device, a delay of the first RLC entity of the first network device, a delay of a PDCP entity of the first network device, and a delay of a first interface, and the first interface is a communication interface between a CU of the first network device and a DU of the first network device.

Alternatively, if the second information includes the information about the second delay, the sixth delay includes at least one of a HARQ transmission delay of the first network device, a delay of the second RLC entity of the first network device, a delay of a PDCP entity of the first network device, and a delay of a first interface.

In a possible implementation, before the receiving second information from a terminal device, the method further includes: sending fifth indication information to the terminal device, where the fifth indication information is used to indicate the terminal device to measure the second information. Optionally, the fifth indication information may further carry an identifier of the first DRB. In this process, delay measurement configuration may be performed based on a DRB granularity, thereby implementing flexible configuration of DRB delay measurement.

In a possible implementation, the method further includes: sending sixth indication information to the second network device, where the sixth indication information is used to indicate the second network device to measure the network-side delay on the second path. Optionally, the sixth indication information may further carry the identifier of the first DRB. In this process, delay measurement configuration may be performed based on a DRB granularity, thereby implementing flexible configuration of DRB delay measurement.

In a possible implementation, the method further includes: sending seventh indication information to the terminal device, where the seventh indication information is used to indicate the terminal device to stop measuring the second information. Optionally, the seventh indication information may further carry the identifier of the first DRB. In this process, DRB delay measurement can be flexibly configured, load of the UE can be reduced, and processing overheads of the UE can be reduced.

In a possible implementation, the method further includes: sending eighth indication information to the second network device, where the eighth indication information is used to indicate the second network device to stop measuring the network-side delay on the second path. Optionally, the eighth indication information may further carry the identifier of the first DRB. In this process, DRB delay measurement can be flexibly configured, load of the second network device can be reduced, and processing overheads of the second network device can be reduced.

According to a fourth aspect, an embodiment provides a communication method, applied to a terminal device side, and the method includes: obtaining second information, where the second information includes information about a first delay or information about a second delay, the first delay is a delay of a terminal device on a first path, the second delay is a delay of the terminal device on a second path, the first path is used to transmit a first data packet, the second path is used to transmit a second data packet, and both the first data packet and the second data packet belong to a first DRB; and then sending the second information to a first network device.

In this embodiment, in a scenario in which one DRB corresponds to two or more RLC entity bearers (that is, a data packet of one DRB is transmitted on two or more paths), UE may perform UE-side delay measurement on a path, and a network device may perform network-side delay measurement on the path, and finally determine an uplink delay of the DRB, thereby implementing DRB delay measurement. A network side measures and obtain the delay of the DRB, so that the network side can adjust resource allocation based on the delay, to meet a delay requirement of a service.

In a possible implementation, this embodiment may be applied to a DC scenario. In this case, a network-side delay on the first path is a delay of the first network device on the first path, and a network-side delay on the second path is a delay of a second network device on the second path.

In a possible implementation, this embodiment may also be applied to a CA scenario. In this case, a network-side delay on the first path is a network-side delay on a path corresponding to a first RLC entity of the first network device, and a network-side delay on the second path is a network-side delay on a path corresponding to a second RLC entity of the first network device.

In a possible implementation, the first information further includes an identifier corresponding to the first delay or an identifier corresponding to the second delay, and the identifiers are used to distinguish between different delays.

Optionally, the identifiers may distinguish between different paths. For example, in the DC scenario, the identifier may be a logical channel (LCH) identifier, a cell group identifier, a base station identifier, or the like. In the CA scenario, the identifier may be a logical channel identifier, a cell group identifier, an RLC identifier, or the like.

In a possible implementation, in the DC scenario, the first delay includes a delay between a time point at which a PDCP entity of the terminal device receives the first data packet from an upper layer and a time point at which the terminal device obtains an uplink grant for sending the first data packet to the first network device.

Alternatively, the second delay includes a delay between a time point at which a PDCP entity of the terminal device receives the second data packet from an upper layer and a time point at which the terminal device obtains an uplink grant for sending the second data packet to the second network device.

In a possible implementation, in the CA scenario, the first delay includes a delay between a time point at which a PDCP entity of the terminal device receives the first data packet from an upper layer and a time point at which the terminal device obtains an uplink grant for sending the first data packet to the first RLC entity.

Alternatively, the second delay includes a delay between a time point at which a PDCP entity of the terminal device receives the second data packet from an upper layer and a time point at which the terminal device obtains an uplink grant for sending the second data packet to the second RLC entity.

In a possible implementation, before the obtaining second information, the method further includes: receiving fifth indication information from the first network device, where the fifth indication information is used to indicate the terminal device to obtain the second information. Optionally, the fifth indication information may further carry an identifier of the first DRB. In this process, delay measurement configuration may be performed based on a DRB granularity, thereby implementing flexible configuration of DRB delay measurement.

In a possible implementation, the method further includes: receiving seventh indication information from the first network device, where the seventh indication information is used to indicate the terminal device to stop obtaining the second information. Optionally, the seventh indication information may further carry the identifier of the first DRB. In this process, DRB delay measurement can be flexibly configured, load of the UE can be reduced, and processing overheads of the UE can be reduced.

According to a fifth aspect, an embodiment provides another communication method, applied to a network side, and the method includes: obtaining a fifth delay, and sending the fifth delay to a first network device, where the fifth delay is a network-side delay on a second path, the second path is used to transmit a second data packet, the second data packet belongs to a first DRB, and there are two or more paths used to transmit a data packet of the first DRB.

In this embodiment, in a scenario in which one DRB corresponds to two or more RLC entity bearers (that is, a data packet of one DRB is transmitted on two or more paths), UE may separately perform UE-side delay measurement on each path, and a network device may separately perform network-side delay measurement on each path, and finally determine an uplink delay of the DRB, thereby implementing DRB delay measurement. The network side measures and obtain the delay of the DRB, so that the network side can adjust resource allocation based on the delay, to meet a delay requirement of a service.

In a possible implementation, this embodiment may be applied to a DC scenario. In this case, a network-side delay on a first path is a delay of the first network device on the first path, and a network-side delay on the second path is a delay of a second network device on the second path.

In a possible implementation, the fifth delay includes at least one of a HARQ transmission delay of the second network device, a delay of an RLC entity of the second network device, and a delay of a second interface, and the second interface is a communication interface between the first network device and the second network device.

In a possible implementation, before the obtaining a fifth delay, the method further includes: receiving second indication information from the first network device, where the second indication information is used to indicate the second network device to obtain the fifth delay. Optionally, the second indication information may further carry an identifier of the first DRB. In this process, delay measurement configuration may be performed based on a DRB granularity, thereby implementing flexible configuration of DRB delay measurement.

In a possible implementation, the method further includes: receiving fourth indication information from the first network device, where the fourth indication information is used to indicate the second network device to stop obtaining the fifth delay. Optionally, the fourth indication information may further carry the identifier of the first DRB. In this process, DRB delay measurement can be flexibly configured, load of the second network device can be reduced, and processing overheads of the second network device can be reduced.

According to a sixth aspect, an embodiment provides a communication apparatus. The communication apparatus may include at least one functional module or unit, configured to correspondingly perform the communication method provided in the first aspect or the communication method provided in any one of the possible implementations of the first aspect. The communication apparatus may be a network device, or may be a component (for example, a chip or a circuit) that can be used in the network device. In a possible manner, the communication apparatus may include a transceiver unit and a processing unit.

The transceiver unit is configured to receive first information from a terminal device, where the first information includes information about a first delay and information about a second delay, or the first information includes information about a third delay, the first delay is a delay of the terminal device on a first path, the second delay is a delay of the terminal device on a second path, the third delay is obtained by the terminal device based on the delay of the terminal device on the first path and the delay of the terminal device on the second path, the first path is used to transmit a first data packet, the second path is used to transmit a second data packet, and both the first data packet and the second data packet belong to a first DRB.

The processing unit is configured to determine an uplink delay of the first DRB based on the first information, a fourth delay, and a fifth delay, where the fourth delay is a network-side delay on the first path, and the fifth delay is a network-side delay on the second path.

Optionally, the transceiver unit may be implemented by using a transceiver, and the transceiver may be a transceiver circuit, an interface circuit, or the like. The processing unit may be implemented by using a processor. Optionally, the communication apparatus may further include a memory, configured to store code (a program) or data.

According to a seventh aspect, an embodiment provides a communication apparatus. The communication apparatus may include at least one functional module or unit, configured to correspondingly perform the communication method provided in the second aspect or the communication method provided in any one of the possible implementations of the second aspect. The communication apparatus may be a terminal device, or may be a component (for example, a chip or a circuit) that can be used in the terminal device. In a possible manner, the communication apparatus may include a processing unit and a transceiver unit.

The processing unit is configured to obtain first information, where the first information includes information about a first delay and information about a second delay, or the first information includes information about a third delay, the first delay is a delay of the terminal device on a first path, the second delay is a delay of the terminal device on a second path, the third delay is obtained by the terminal device based on the delay of the terminal device on the first path and the delay of the terminal device on the second path, the first path is used to transmit a first data packet, the second path is used to transmit a second data packet, and both the first data packet and the second data packet belong to a first DRB.

The transceiver unit is configured to send the first information to a first network device.

Optionally, the transceiver unit may be implemented by using a transceiver, and the transceiver may be a transceiver circuit, an interface circuit, or the like. The processing unit may be implemented by using a processor. Optionally, the communication apparatus may further include a memory, configured to store code (a program) or data.

According to an eighth aspect, an embodiment provides a communication apparatus. The communication apparatus may include at least one functional module or unit, configured to correspondingly perform the communication method provided in the third aspect or the communication method provided any one of the possible implementations of the third aspect. The communication apparatus may be a network device, or may be a component (for example, a chip or a circuit) that can be used in the network device. In a possible manner, the communication apparatus may include a transceiver unit and a processing unit.

The transceiver unit is configured to receive second information from a terminal device, where the second information includes information about a first delay or information about a second delay, the first delay is a delay of the terminal device on a first path, the second delay is a delay of the terminal device on a second path, the first path is used to transmit a first data packet, the second path is used to transmit a second data packet, and both the first data packet and the second data packet belong to a first DRB.

The processing unit is configured to determine an uplink delay of the first DRB based on the second information and a sixth delay. If the second information includes the information about the first delay, the sixth delay is a network-side delay on the first path. If the second information includes the information about the second delay, the sixth delay is a network-side delay on the second path.

Optionally, the transceiver unit may be implemented by using a transceiver, and the transceiver may be a transceiver circuit, an interface circuit, or the like. The processing unit may be implemented by using a processor. Optionally, the communication apparatus may further include a memory, configured to store code (a program) or data.

According to a ninth aspect, an embodiment provides another communication apparatus. The communication apparatus may include at least one functional module or unit, configured to correspondingly perform the communication method provided in the fourth aspect or the communication method provided in any one of the possible implementations of the fourth aspect. The communication apparatus may be a terminal device, or may be a component (for example, a chip or a circuit) that can be used in the terminal device. In a possible manner, the communication apparatus may include a processing unit and a transceiver unit.

The processing unit is configured to obtain second information, where the second information includes information about a first delay or information about a second delay, the first delay is a delay of the terminal device on a first path, the second delay is a delay of the terminal device on a second path, the first path is used to transmit a first data packet, the second path is used to transmit a second data packet, and both the first data packet and the second data packet belong to a first DRB.

The transceiver unit is configured to send the second information to a first network device.

Optionally, the transceiver unit may be implemented by using a transceiver, and the transceiver may be a transceiver circuit, an interface circuit, or the like. The processing unit may be implemented by using a processor. Optionally, the communication apparatus may further include a memory, configured to store code (a program) or data.

According to a tenth aspect, an embodiment provides a communication apparatus. The communication apparatus may include at least one functional module or unit, configured to correspondingly perform the communication method provided in the fifth aspect or the communication method provided in any one of the possible implementations of the fifth aspect. The communication apparatus may be a network device, or may be a component (for example, a chip or a circuit) that can be used in the network device. In a possible manner, the communication apparatus may include a transceiver unit and a sending unit.

The processing unit is configured to obtain a fifth delay, where the fifth delay is a network-side delay on a second path, the second path is used to transmit a second data packet, the second data packet belongs to a first DRB, and there are two or more paths used to transmit a data packet of the first DRB.

The transceiver unit is configured to send the fifth delay to a first network device.

Optionally, the transceiver unit may be implemented by using a transceiver, and the transceiver may be a transceiver circuit, an interface circuit, or the like. The processing unit may be implemented by using a processor. Optionally, the communication apparatus may further include a memory, configured to store code (a program) or data.

According to an eleventh aspect, an embodiment provides a network device, configured to perform the communication method described in the first aspect, the third aspect, or the fifth aspect. The network device may include a memory, and a processor, a transmitter, and a receiver that are coupled to the memory. For example, the transmitter is configured to support the network device in performing the step of sending information by the network device in the communication method provided in the first aspect, the third aspect, or the fifth aspect. The receiver is configured to support the network device in performing the step of receiving information by the network device in the communication method provided in the first aspect, the third aspect, or the fifth aspect. The processor is configured to support the network device in performing the processing step of the network device other than information sending and information receiving in the communication method provided in the first aspect, the third aspect, or the fifth aspect. It should be noted that the transmitter and the receiver in this embodiment may be integrated together or may be coupled by using a coupler. The memory is configured to store implementation code of the communication method described in the first aspect, the third aspect, or the fifth aspect, and the processor is configured to execute the program code stored in the memory, so that the network device performs the communication method provided in the first aspect, the third aspect, or the fifth aspect. The memory and the processor may be integrated together, or may be coupled by using a coupler.

According to a twelfth aspect, an embodiment provides a terminal device, configured to perform the communication method described in the second aspect or the fourth aspect. The terminal device may include a memory, and a processor, a transmitter, and a receiver that are coupled to the memory. For example, the transmitter is configured to support the terminal device in performing the step of sending information by the terminal device in the communication method provided in the second aspect or the fourth aspect. The receiver is configured to support the terminal device in performing the step of receiving information by the terminal device in the communication method provided in the second aspect or the fourth aspect. The processor is configured to support the terminal device in performing the processing step of the terminal device other than information sending and information receiving in the communication method provided in the second aspect or the fourth aspect. It should be noted that the transmitter and the receiver in this embodiment may be integrated together or may be coupled by using a coupler. The memory is configured to store implementation code of the communication method described in the second aspect or the fourth aspect, and the processor is configured to execute the program code stored in the memory, that is, perform the communication method provided in the second aspect or the fourth aspect. The memory and the processor may be integrated together, or may be coupled by using a coupler.

According to a thirteenth aspect, an embodiment provides a communication system, including a terminal device and a first network device. For example, the first network device may be the communication apparatus described in the sixth aspect or the network device described in the eleventh aspect, and the terminal device may be the communication apparatus described in the seventh aspect or the terminal device described in the twelfth aspect. Alternatively, the first network device may be the communication apparatus described in the eighth aspect or the network device described in the eleventh aspect, and the terminal device may be the communication apparatus described in the ninth aspect or the terminal device described in the twelfth aspect.

In a possible implementation, the communication system further includes a second network device, and the second network device may be the communication apparatus described in the tenth aspect or the network device described in the eleventh aspect.

According to a fourteenth aspect, an embodiment provides a computer-readable storage medium. The readable storage medium stores instructions, and when the instructions are run on a computer, the computer is enabled to perform the communication method described in any one of the foregoing aspects.

According to a fifteenth aspect, an embodiment provides a computer program product including instructions. When the computer program product runs on a computer, the computer is enabled to perform the communication method described in any one of the foregoing aspects.

According to a sixteenth aspect, an embodiment provides a communication chip. The communication chip may include a processor, and one or more interfaces coupled to the processor. For example, the processor may be configured to: invoke, from a memory, an implementation program of the communication method provided in any one of the foregoing aspects, and execute instructions included in the program. The interface may be configured to output a processing result of the processor.

BRIEF DESCRIPTION OF DRAWINGS

The following describes the accompanying drawings for describing embodiments or the background.

DETAILED DESCRIPTION OF THE EMBODIMENTS

Terms used in embodiments are only used to explain specific embodiments, but are not intended as limiting.

Figure 1:
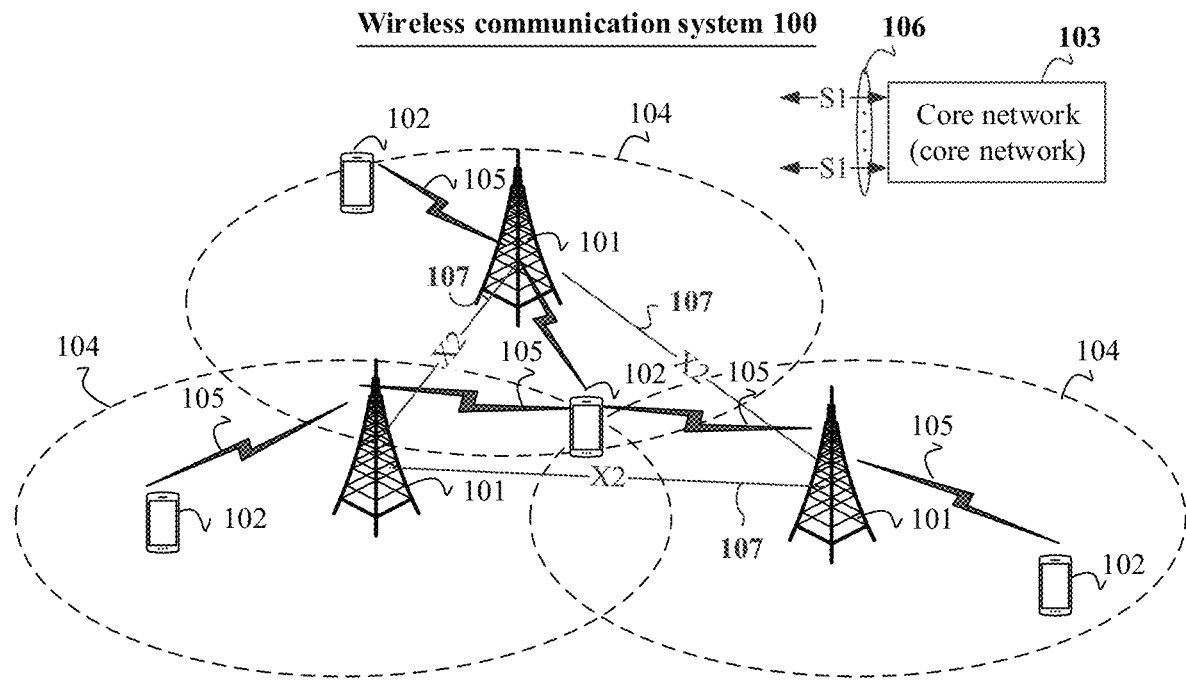
FIG. 1 is a schematic diagram of a wireless communication system according to an embodiment.

First, a communication system is described. FIG. 1 shows a wireless communication system according to an embodiment. The wireless communication system 100 may operate in a licensed frequency band or an unlicensed frequency band. The wireless communication system 100 is not limited to a long term evolution ( ) system, and may be a 5G system, a new radio technology (NR) system, another evolved system, or the like. It may be understood that use of the unlicensed frequency band can increase a system capacity of the wireless communication system 100. As shown in FIG. 1, the wireless communication system 100 includes one or more access network devices 101, one or more terminal devices 102, and a core network 103.

The access network device 101 may perform wireless communication with the terminal device 102 through one or more antennas. Each access network device 101 can provide communication coverage for a coverage area 104 corresponding to the access network device 101. The coverage area 104 corresponding to the access network device 101 may be divided into a plurality of sectors. One sector corresponds to a part of the coverage area (not shown).

In this embodiment, the access network device 101 may include: an evolved NodeB (eNB, or eNodeB), a next-generation NodeB (gNB), or the like. The wireless communication system 100 may include several access network devices 101 of different types, for example, a macro base station (macro base station) and a micro base station. The access network device 101 may use different wireless technologies, for example, a cell wireless access technology or a wireless local area network (WLAN) wireless access technology. In addition, the access network device 101 may also be referred to as a base station, an access point (AP), a transmission reception point (TRP), a central unit (CU), or another network entity, and may include some or all of functions of the foregoing network entity.

In this embodiment, the terminal device 102 is a device having a wireless transceiver function. The terminal device 102 may be deployed on land, including an indoor device, an outdoor device, a handheld device, a wearable device, or a vehicle-mounted device; or may be deployed on a water surface (for example, on a ship); or may be deployed in the air (for example, on a plane or a balloon). The terminal device may be a mobile phone, a tablet computer (Pad), a portable computer, a computer having a wireless transceiver function, a virtual reality (VR) terminal device, an augmented reality AR) terminal device, a wireless terminal in industrial control, a wireless terminal in self driving, a wireless terminal in telemedicine, a wireless terminal in a smart grid, a wireless terminal in transportation safety (transportation safety), a wireless terminal in a smart city, a smart automobile, a wireless terminal in a smart home, or the like. An application scenario is not limited in this embodiment. The terminal device may also be referred to as UE, a terminal, an access terminal, a UE unit, a UE station, a mobile device, a mobile station, a mobile terminal, a mobile client, a mobile unit, a remote station, a remote terminal device, a remote unit, a wireless unit, a wireless communication device, a user agent, a user apparatus, or the like.

For example, the access network device 101 communicates with the terminal device 102 through a wireless interface 105. Also, the access network device 101 may be configured to transmit control information or user data to the core network 103 through an interface 106 (for example, an S1 interface or an NG interface). Further, the access network devices 101 may directly or indirectly communicate with each other through an interface 107 (for example, an X2/Xn interface).

A core network 103 (for example, a 5G core network) device includes but is not limited to an access and mobility management function (AMF) entity, a session management function (SMF) entity, a user plane function (UPF) entity, or the like. The AMF is configured to: perform access and mobility management and perform functions such as interaction and signaling forwarding with network elements such as a radio access network (RAN) device and the SMF. The SMF is configured to: manage creation, deletion, and the like of a protocol data unit (PDU) session (session) of a user and maintain a PDU session context and user plane forwarding management channel information. The UPF is configured to: receive a data packet from the terminal device 102, and forward the data packet. The UPF is further configured to perform quality of service (QoS) control, charging information measurement, and the like.

A core network 103 (for example, a 4G core network) device includes but is not limited to an MME, a serving gateway (S-GW) entity, a packet data network gateway (PDN-GW) entity, or the like. The MME is configured to perform functions such as access control, lawful interception, user roaming control, including security and permission control, and mobility management, interaction and signaling forwarding with network elements such as the radio access network device and the S-GW. When the S-GW is configured to: perform handover between radio access network devices, the S-GW may serve as a local anchor and assist in completing a reordering function of the radio access network device. When performing handover between different access systems, the S-GW serves as a mobility anchor and also has the reordering function; performs a lawful interception function; routes and forwards a data packet; performs packet marking at uplink and downlink transport layers; performs downlink packet buffering and initiation of network-triggered service request functions in an idle state; and performs functions such as charging between operators. The PDN-GW is configured to perform functions such as user packet filtering, lawful interception, IP address allocation for UE, transport layer marking of a data packet on an uplink/a downlink, uplink/downlink service class charging and service-level gating, and service-based uplink/downlink rate control.

An interface between a 4G base station and a 4G core network is referred to as an S1 interface, an interface between a 5G base station and a 5G core network is referred to as an NG interface, an interface between two 4G base stations is referred to as an X2 interface, and an interface between two 5G base stations is referred to as an Xn interface. When UE is connected to the 4G core network, an interface between a 4G base station and a 5G base station that both serve the UE is referred to as an X2 interface. When UE is connected to the 5G core network, an interface between a 4G base station and a 5G base station that both serve the UE is referred to an Xn interface.

It should be noted that the wireless communication system 100 shown in FIG. 1 is only intended to describe the solutions of the embodiments more clearly, but is not intended to limit the embodiments. A person of ordinary skill in the art may know that as a network architecture evolves and a new service scenario emerges, the solutions provided are also applicable to a similar problem.

Unless otherwise specified, a network device in the following embodiments may be understood as an access network device.

In this embodiment, there may be one or more access network devices that provide a data transmission service for the terminal device. For example, there are two base stations that provide a data transmission service for the UE, where one base station is a master base station, and the other base station is a secondary base station. Both the master base station and the secondary base station may send downlink data to the UE, and may also receive uplink data sent by the UE.

It should be noted that, terms "system" and "network" in the embodiments may be used interchangeably. "A plurality of" means two or more. In view of this, "a plurality of" may also be understood as "at least two" in the embodiments. The term "and/or" describes an association relationship between associated objects and indicates that three relationships may exist. For example, A and/or B may indicate the following three cases: only A exists, both A and B exist, and only B exists. In addition, unless otherwise specified, the character "/" generally indicates an "or" relationship between associated objects.

Figure 2:
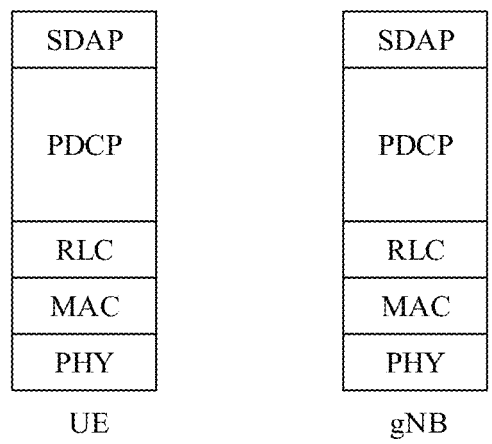
FIG. 2 is a schematic architectural diagram of a protocol layer of a user plane (UP) according to an embodiment.

The following describes a protocol layer of a wireless network in the embodiments. FIG. 2 is a schematic architectural diagram of a protocol layer of a user plane (UP) according to an embodiment. For the user plane, protocol layers of each of UE and a base station (such as a gNB) are respectively a service data adaptation protocol (SDAP) layer, a packet data convergence protocol ( ) layer, a radio link control (RLC) layer, a media access control (MAC) layer, and a physical (PHY) layer from top to bottom.

The SDAP layer is a newly introduced protocol layer in 5G, and is responsible for mapping each quality of service flow (QoS flow) from a 5th generation core network (5GC) to a DRB at a radio access stratum, that is, placing, on a corresponding DRB for transmission based on a service attribute corresponding to the QoS flow, a data packet corresponding to the QoS flow.

The PDCP layer may perform services such as security, header compression, encryption, and handover. There may be a plurality of PDCP entities at the PDCP layer, and each entity carries data of one radio bearer (RB). The PDCP layer may be configured to ensure that data submitted to an upper layer is in order (that is, data is submitted in order).

The RLC layer may perform services such as segmentation, reassembly, and retransmission. There may be a plurality of RLC entities at the RLC layer, and each RLC entity provides a service for each PDCP entity.

The MAC layer may provide a data transmission service for a service on a logical channel and perform services such as scheduling and a hybrid automatic repeat request (HARQ) acknowledgment and non-acknowledgment.

The PHY layer may encode and transmit data from the MAC layer.

Correspondingly, for a control plane, protocol layers of each of the UE and the base station are respectively an RRC layer, a PDCP layer, an RLC layer, a MAC layer, and a PHY layer from top to bottom.

The RRC layer is configured to perform broadcast, paging, RRC link establishment, radio bearer control, mobility, UE measurement reporting control, and the like.

For a transmit end, data obtained after each layer processes data is referred to as a PDU at the layer. For each layer, data input from an upper layer is referred to as a service data unit (SDU) of the layer. For example, data input by the PDCP layer to the RLC layer is referred to as a PDCP PDU for the PDCP layer, and is referred to as an RLC SDU for the RLC layer.

In this embodiment, an access network device 101 may be a base station (for example, a gNB) with an architecture in which a central unit (CU) and a distributed unit (DU) are separated. The base station may be connected to a core network device (for example, a core network device in a 4G core network or a 5G core network). The CU and the DU may be understood as division of the base station from a perspective of a logical function. The CU and the DU may be physically separated or physically deployed together. A plurality of DUs may share one CU. One DU may also be connected to a plurality of CUs. The CU and the DU may be connected through an interface, for example, an F1 interface.

Optionally, functions of the CU and functions of the DU may be classified based on protocol layers of a wireless network. For example, functions of the RRC layer, the SDAP layer, and the PDCP layer are set on the CU, and functions of the RLC layer, the MAC layer, the PHY layer, and the like are set on the DU. It may be understood that the classification of the functions of the CU and the functions of the DU based on the protocol layers is merely an example, or the classification may be performed in another manner. For example, the CU or the DU may have more functions of the protocol layers, or the CU or the DU may have some processing functions of the protocol layer. For example, some functions of the RLC layer and functions of a protocol layer above the RLC layer may be set on the CU, and remaining functions of the RLC layer and functions of a protocol layer below the RLC layer may be set on the DU.

Alternatively, the functions of the CU and the functions of the DU may be classified based on a service type or another system requirement. For example, classification is performed based on a delay. Functions whose processing time needs to meet a delay requirement are set on the DU, and functions whose processing time does not need to meet the delay requirement are set on the CU.

Alternatively, the CU may have one or more functions of a core network. One or more CUs may be disposed together, or may be disposed separately. For example, the CUs may be disposed on a network side for centralized management. The DU may have a plurality of radio frequency functions, and the radio frequency functions may be remotely set.

Figure 3:
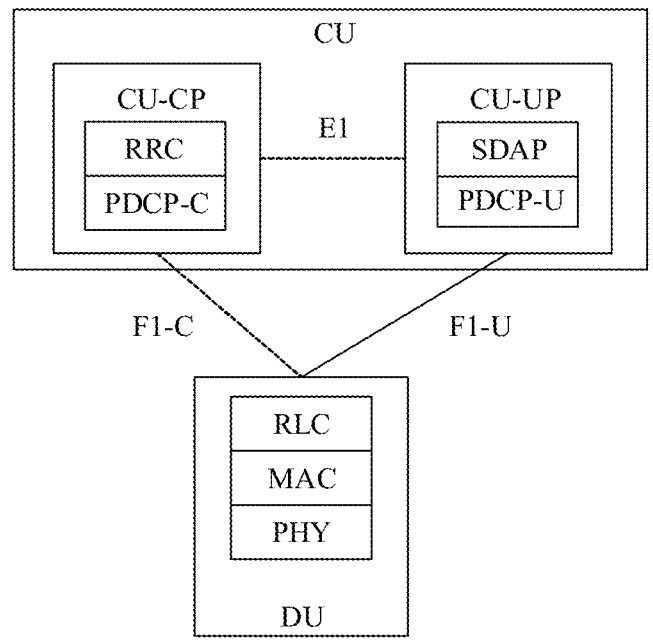
FIG. 3 is a schematic diagram of a protocol stack of a network device according to an embodiment.

It should be understood that the functions of the CU may be implemented by one entity, or may be implemented by different entities. Optionally, the functions of the CU may be further classified. For example, FIG. 3 is a schematic diagram of a protocol stack of a network device according to an embodiment. As shown in FIG. 3, a control plane (CP) and a user plane (UP) of a CU may be separated, that is, a control plane of the CU (CU-CP) and a user plane of the CU (CU-UP). The CU-CP and the CU-UP may be implemented by different function entities. The CU-CP and the CU-UP may be coupled to a DU to jointly implement functions of a base station. In a possible manner, the CU-CP is responsible for control plane functions, including a function of an RRC layer and a function of a PDCP-C. The PDCP-C is mainly responsible for encryption and decryption, integrity protection, data transmission, and the like of control plane data. The CU-UP is responsible for user plane functions, including a function of an SDAP layer and a function of a PDCP-U. The PDCP-U is mainly responsible for encryption and decryption, integrity protection, header compression, serial number maintenance, data transmission, and the like of a data plane. The CU-CP and the CU-UP may be connected through an interface, for example, an µ1 interface. The CU-CP indicates that the base station may be connected to a core network device through an interface, and be connected to the DU through a control plane interface (for example, F1-C (control plane)). The CU-UP is connected to the DU through a user plane interface (for example, F1-U (user plane)). Optionally, in another possible implementation, the function of the PDCP-C is also on a CU-UP side (not shown in the figure).

Based on the protocol layer of the wireless network, the following describes data transmission content related to a DRB.

For each UE, a core network establishes one or more PDU sessions for the UE. A RAN (for example, a base station) establishes one or more DRBs for each PDU session. The DRB may be understood as a data bearer between the base station and the UE. Data packets in the data bearer have same forwarding processing. The PDU session may be understood as a connection that provides a PDU connection service between the UE and a data network (DN). In a PDU session, data flows that have a same QoS requirement are QoS flows.

Figure 4:
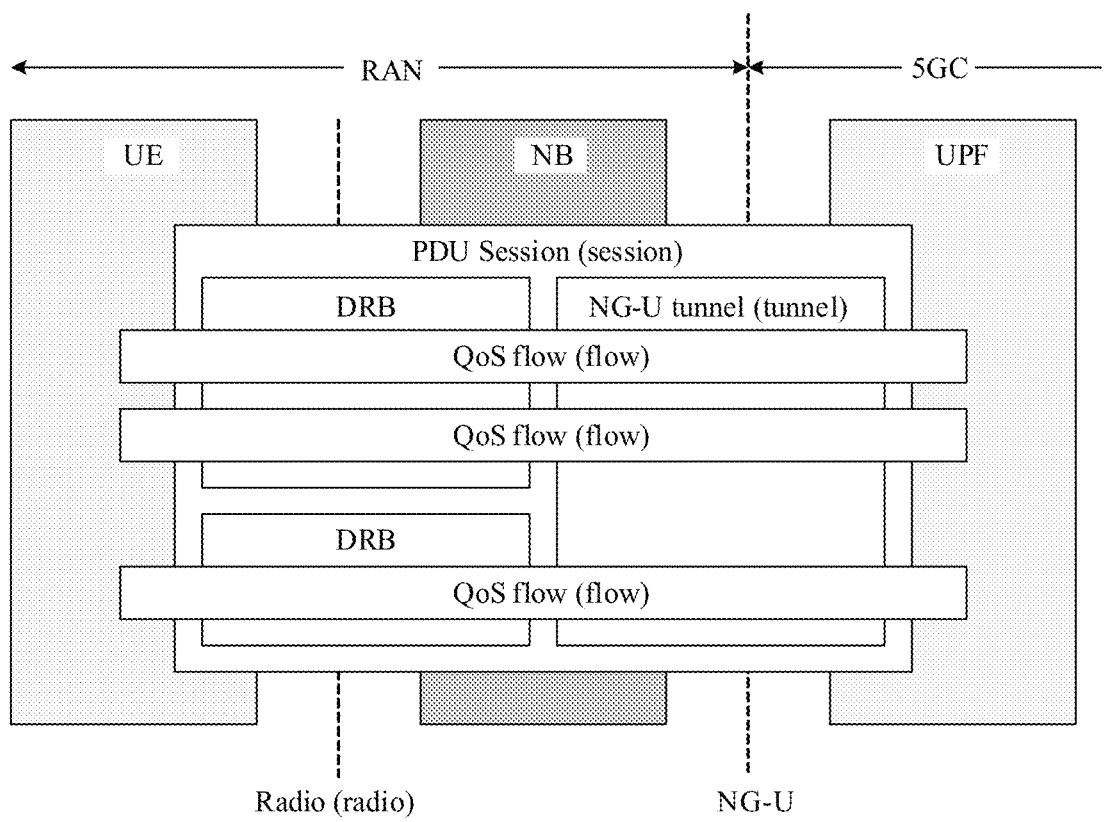
FIG. 4 is a schematic diagram of a QoS flow-based QoS architecture according to an embodiment.

In a 5G scenario, a QoS flow-based QoS architecture is shown in FIG. 4. The architecture is applicable to a RAN device in an NR system, for example, a gNB is connected to a 5GC. The architecture is also applicable to a RAN device in an evolved universal terrestrial radio access (E-UTRA) system, for example, an eNB is connected to the 5GC. For each UE, the 5GC establishes one or more PDU sessions for the UE. For each UE, the RAN establishes one or more DRBs for each PDU session. QoS flows are data flows that have a same QoS requirement in a PDU session, and may be a plurality of IP flows having a same QoS requirement.

Transmission between the base station and the UE is referred to as an access stratum (AS), and transmission between the UE and the core network is referred to as a non-access stratum (NAS). The QoS flow-based QoS architecture mainly includes access stratum AS QoS flow mapping and non-access stratum NAS QoS flow mapping. The NAS stratum is mainly responsible for a mapping relationship between an IP flow or another type of data packet and a QoS flow, and a core network user plane function UPF entity generates a downlink QoS flow, for example, according to a packet detection rule (PDR). A terminal generates an uplink QoS flow, for example, according to QoS rules. The AS stratum is mainly responsible for a mapping relationship between a QoS flow and a DRB (that is, the mapping relationship is implemented according to a mapping rule of the AS). A network side (for example, the base station) configures the mapping relationship between the QoS flow and the DRB, and provides, in a DRB of an air interface, a QoS service for a QoS flow.

At the NAS stratum, a QoS flow is a minimum granularity of QoS differentiation in each PDU session. In each PDU session, a header of a data packet of NG-U carries a QoS flow ID (QFI) to identify a specific QoS flow to which the data packet belongs. Both the PDR and the QoS rule identify a corresponding data packet type through a packet filter, to learn of a specific QoS flow to which the packet belongs. The packet filter determines the data packet by identifying a feature of the data packet. For example, for an IP data packet, a type of the packet is identified by using a source IP address or a destination IP address, a source port number or a destination port number, a transport layer protocol number, and the like of the data packet. For the UE, the QoS rule may be notified to the UE through the 5GC, or may be preconfigured inside the UE, or may be obtained through a reflective QoS feature. The reflective QoS feature means that the UE may generate a correspondence between a data packet and a QoS flow of an uplink service based on a correspondence between a data packet and a QoS flow of a downlink service.

The core network may activate the reflective QoS feature by using a control plane or a user plane. For example, the core network may notify, through a non-access stratum message, the terminal to activate the reflective QoS feature for a QoS flow. For example, a QoS flow rule carries indication information used to indicate to activate the reflective QoS feature (reflective service flow feature) for the QoS flow, or the core network includes a reflective service flow feature indicator (reflective QoS indicator, RQI) in a data packet header sent to a radio access network side, to indicate that the data packet has the reflective QoS feature.

Figure 5:
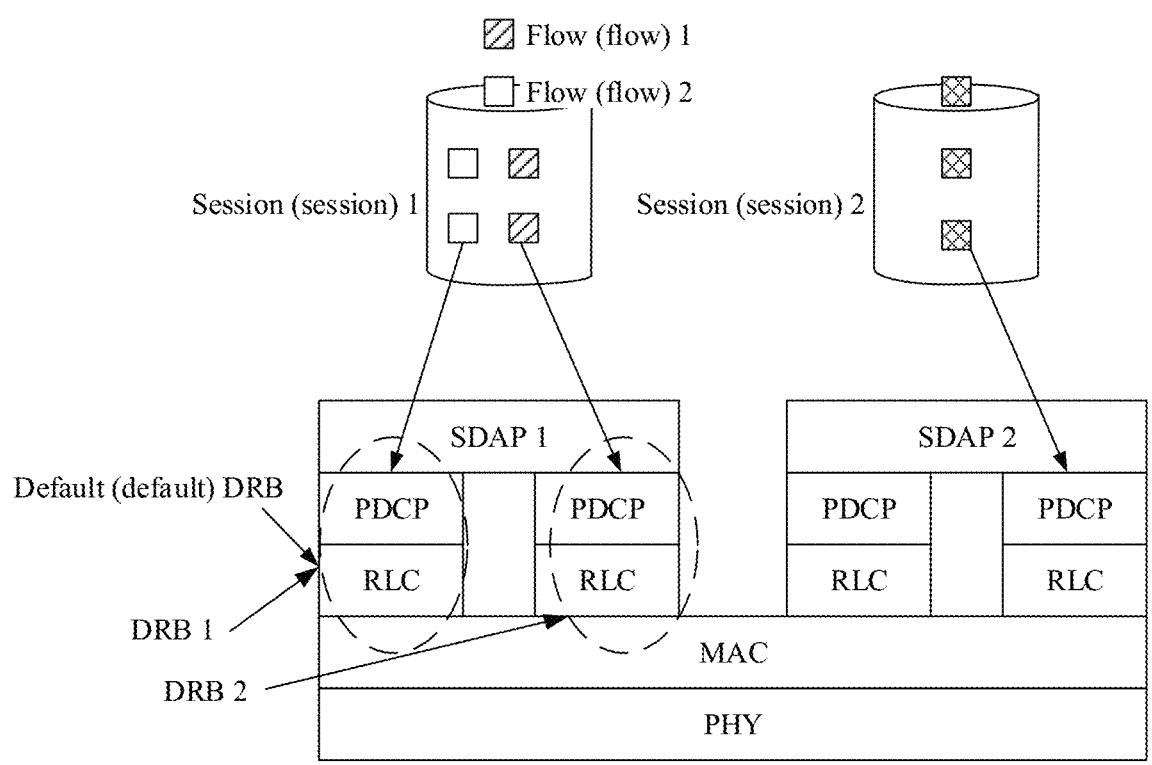
FIG. 5 is a schematic diagram of a process of mapping a QoS flow to a DRB according to an embodiment.

For a process of mapping from a QoS flow to a DRB, refer to FIG. 5. In a protocol stack on a radio access network side connected to a next generation core (NGC), an SDAP protocol layer is above a PDCP layer on a user plane. The SDAP protocol layer is responsible for mapping a QoS flow from the non-access stratum to a DRB of the access stratum, for example, mapping a QoS flow 1 in a PDU session 1 to a DRB 1, and mapping a QoS flow 2 in the PDU session 1 to a DRB 2. An SDAP entity that executes an SDAP protocol is established based on a session, and is further responsible for adding an uplink QoS flow ID and/or a downlink QoS flow ID to an air-interface protocol stack. In a process of mapping a QoS flow to a DRB, a plurality of QoS flows in a same session may be mapped to a same DRB, and data packets in the same DRB can be forwarded in a same manner based on a QoS profile corresponding to a QoS flow ID in a user plane data packet header between the base station and the core network. The QoS profile is a QoS parameter corresponding to the QoS flow ID, and includes one or more of a delay, a packet loss rate, a priority, a guaranteed rate, a maximum rate, a rate-unsatisfied notification indication, and the like. QoS flows in different sessions cannot be mapped to a same DRB. Each session of each terminal may correspond to a default DRB. The terminal maps, to the default DRB, a QoS flow for which a mapping relationship between an uplink QoS flow and a DRB is not configured. A gNB on the RAN side may configure the mapping relationship between the uplink QoS flow and the DRB for the terminal through RRC signaling or in a reflective mapping manner. Reflective mapping means that a downlink data packet carries a QoS flow ID and the terminal detects the QoS flow ID and maps uplink QoS flows with a same QoS flow ID to a same DRB. In addition, the base station may further notify, through an RRC message, the UE whether an SDAP header needs to be carried in a corresponding DRB on an uplink and/or a downlink. When the SDAP header is configured to be carried on the downlink, an SDAP layer of the base station needs to include a QFI for each data packet in a downlink direction, that is, include a QFI in an SDAP PDU. When the SDAP header is configured to be carried on the uplink, an SDAP layer of the UE needs to include a QFI for each data packet in a downlink direction, that is, include a QFI in an SDAP PDU.

When the UE is connected to a 4G evolved packet core (evolved packet core, EPC) network, an evolved packet transmission system (EPS) bearer is in a one-to-one correspondence with an evolved radio access bearer (E-RAB). The EPS bearer or the E-RAB is a minimum granularity for QoS control when the UE is connected to the EPC network.

However, a multi-radio dual connectivity (MR-DC) is introduced in 5G, and a network side may provide a communication service for the UE through two or more base stations. The two or more base stations may belong to a same radio access technology (RAT), or may belong to different radio access technologies. For example, one base station belongs to LTE and one base station belongs to NR. In addition, a core network in the MR-DC may be a 4G core network or a 5G core network.

In the MR-DC, one DRB may have various forms, and the various forms are classified by using a base station to which a PDCP layer belongs or a base station to which an RLC/a MAC/a PHY layer belongs. DRBs are classified into a master node terminated bearer (MN terminated bearer) (that is, a bearer is terminated in a master node, and it may also be considered that a user plane connection to the core network is terminated in the master node) and a secondary node terminated bearer (SN terminated bearer) (that is, a bearer is terminated in a secondary node, and it may also be considered that a user plane connection to the core network is terminated in the secondary node) based on the base station to which the PDCP layer belongs. DRBs may be classified into a master cell group bearer (MCG bearer), a secondary cell group bearer (SCG bearer), and a split bearer based on the base station to which the RLC/MAC/PHY layer belongs.

The MCG bearer means that an RLC bearer corresponding to one DRB is only on a master node. The master node of the DRB may have one or more RLC entities. For example, in a carrier aggregation (CA) data packet duplication scenario, there may be two RLC bearers on the master node.

The SCG bearer means that an RLC bearer corresponding to one DRB is only on a secondary node. The secondary node of the DRB may have one or more RLC entities. For example, in the CA data packet duplication scenario, there may be two RLC bearers on the master node.

The split bearer indicates that there is an RLC bearer corresponding to one DRB on both of the master node and the secondary node. For example, data in one DRB may be split into two base stations.

An MCG refers to a group of serving cells on the master node in MR-DC. These serving cells include a primary cell and one or more optional secondary cells. An SCG refers to a group of serving cells on the secondary node in MR-DC. These serving cells include a primary secondary cell and one or more optional secondary cells.

Figure 6:
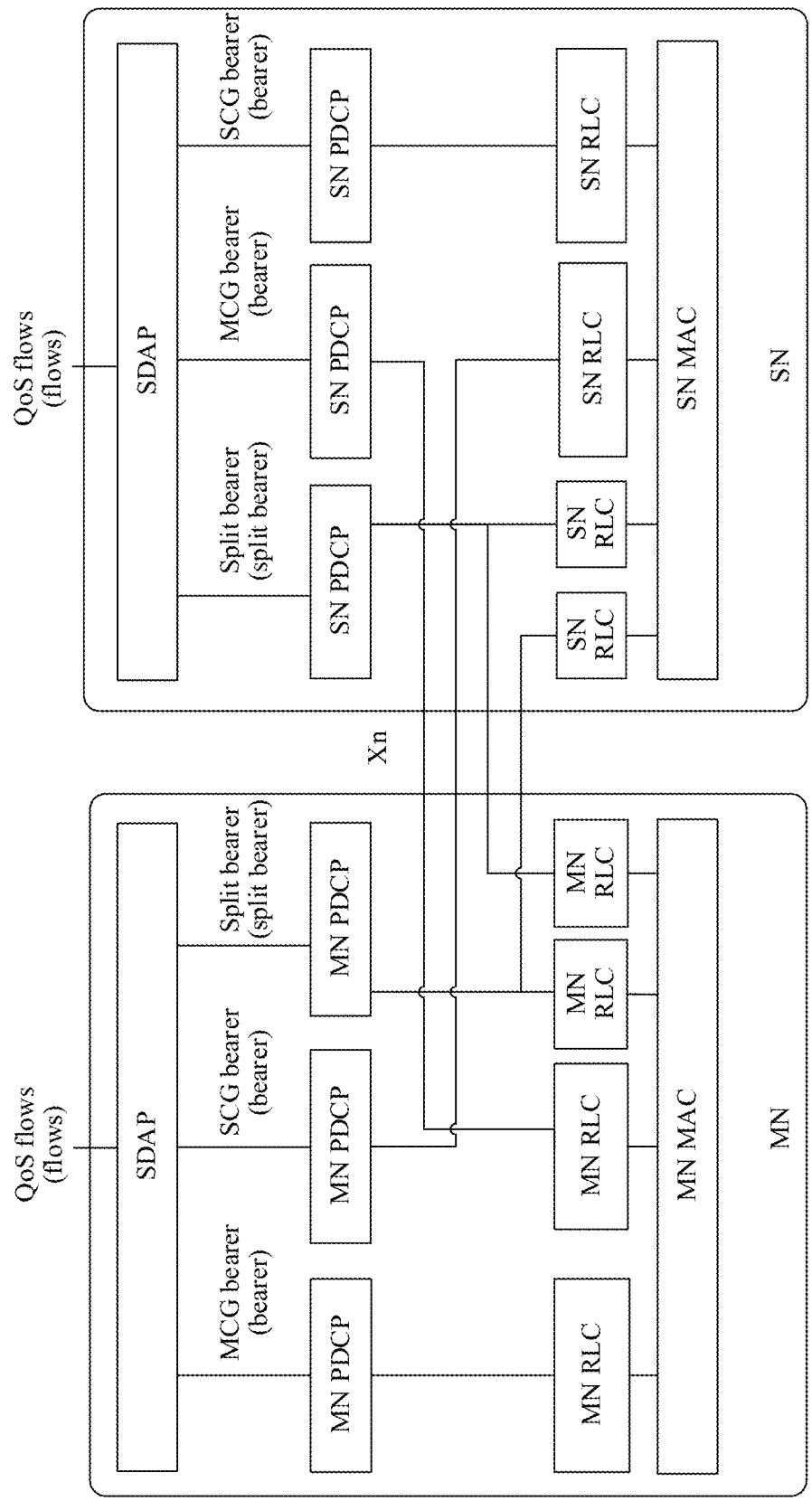
FIG. 6 is a schematic diagram of a plurality of different DRB types according to an embodiment.
Figure 7:
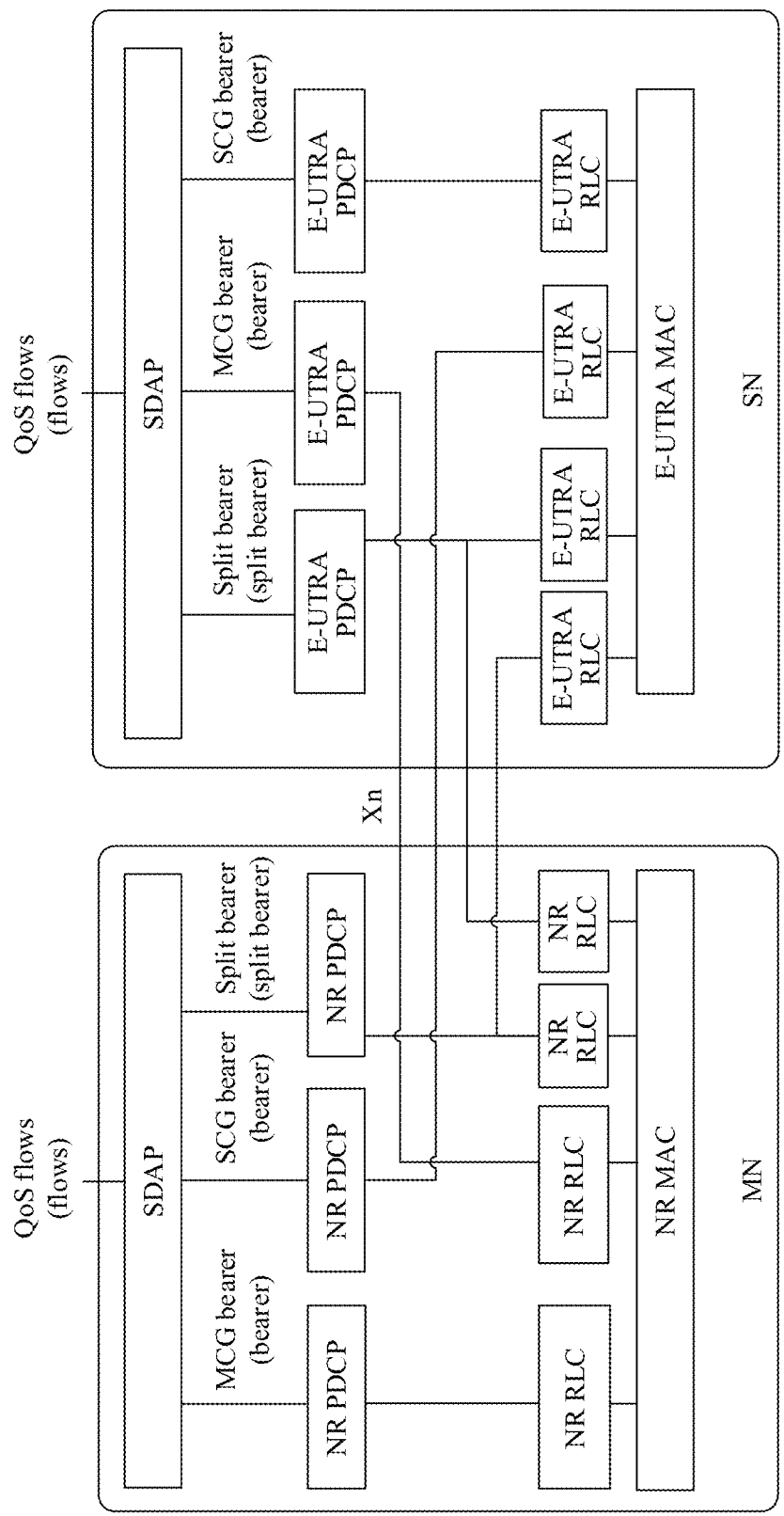
FIG. 7 is a schematic diagram of a plurality of different DRB types according to an embodiment.

The MN terminated bearer/the SN terminated bearer may be combined with the MCG bearer/the SCG bearer/the split bearer to form different DRB types. As shown in FIG. 6 and FIG. 7, FIG. 7 shows an example in which a master node is a base station in an NR system, a secondary node is a base station in an E-UTRA system, and UE is connected to a 5G core network.

As shown in FIG. 7, the master node terminated bearer is used as an example to describe the split bearer. A user plane connection to the core network is terminated in the master node, and a PDCP entity (that is, an NR PDCP in FIG. 7) of the master node sends, to an RLC entity (that is, NR RLC in FIG. 7) of the master node, a data packet belonging to a DRB (assumed to be a DRB 1). After receiving the data packet of the DRB 1 sent by the NR PDCP layer, the NR RLC sends the data packet to an NR MAC layer. After receiving the data packet of the DRB 1 sent by the NR RLC layer, the NR MAC layer sends the data packet to an NR PHY layer. After receiving the data packet of the DRB 1, the NR PHY layer sends the data packet to the UE. In addition, the PDCP entity (that is, the NR PDCP in FIG. 7) of the master node further sends the data packet of the DRB 1 to an RLC entity (that is, E-UTRA RLC in FIG. 7) of the secondary node. After receiving the data packet of the DRB 1 sent by the NR PDCP layer, the E-UTRA RLC sends the data packet to an E-UTRA MAC layer. After receiving the data packet of the DRB 1, the E-UTRA MAC layer sends the data packet to an E-UTRA PHY layer. After receiving the data packet of the DRB 1, the E-UTRA PHY layer sends the data packet to the UE. Herein, it may be considered that two paths are used to transmit the data packet of the DRB 1, and protocol layer entities on a path 1 include an NR PDCP, NR RLC, NR MAC, an NR PHY, a first PHY of the UE, first MAC of the UE, first RLC of the UE, and a first PDCP of the UE. Protocol layer entities on a path 2 include an NR PDCP, E-UTRA RLC, E-UTRA MAC, an E-UTRA PHY, a second PHY of the UE, second MAC of the UE, second RLC of the UE, and a second PDCP of the UE.

In an MR-DC scenario, to ensure service reliability, a transmit end may send a same data packet to the UE through two or more base stations. For example, the master node duplicates, at a PDCP layer to obtain two (or more) data packets, a data packet (for example, a data packet of a URLLC service) to be sent to a terminal device, and sends the two (or more) data packets to the terminal device through two (or more) different base stations, thereby improving reliability of the service. For example, in the MR-DC scenario, the master node duplicates a data packet (for example, a PDCP PDU) to obtain two data packets at the PDCP layer, and sends the two data packets to RLC entities of the two base stations, and the RLC entities of the two base stations send the data packets to the UE, that is, the data packets are sent to the UE through the split bearer. Similarly, a UE side may also duplicate a data packet to obtain two (or more) data packets at a PDCP layer of an uplink DRB and send the two (or more) data packets to two (or more) RLC entities of the UE, one RLC entity sends the data packet to the master node, and the other RLC entity sends the data packet to the secondary node, that is, the data packets are sent to the two base stations through the split bearer. For ease of description, a data packet duplication manner in the DC scenario is referred to as a DC duplication manner in the following embodiments. In the DC duplication manner, data packets (for example, PDCP PDUs) sent by the master node and the secondary node to the UE are the same. Correspondingly, data packets (for example, PDCP PDUs) sent by the UE to the master node and the secondary node are also the same.

In addition to ensuring service reliability in the DC duplication manner, in a carrier aggregation (CA) scenario, a transmit end may further send a data packet to a receive end through a plurality of carriers or cells of one base station. For example, the master node duplicates, at a PDCP layer to obtain two (or more) data packets, a data packet (for example, a data packet of a URLLC service, such as a PDCP PDU) to be sent to a terminal device, and sends the two (or more) data packets to the terminal device through two or more RLC entities of the master node, thereby improving reliability of the service. For example, the master node duplicates a data packet (for example, a PDCP data PDU) to two data packets at the PDCP layer, and sends the two data packets to two RLC entities of the master node, and the two RLC entities send the data packets to the UE. Similarly, a UE side may also duplicate a data packet to obtain two (or more) data packets at a PDCP layer of an uplink DRB and send the two (or more) data packets to two (or more) RLC entities of the UE, one RLC entity sends the data packet to one RLC entity of the master node, and the other RLC entity sends the data packet to the other RLC entity of the master node. For ease of description, a data packet duplication manner in the CA scenario is referred to as a CA duplication manner in the following embodiments. In the CA duplication manner, data packets (for example, PDCP PDUs) sent by the two RLC entities of the master node to the UE are the same. Correspondingly, data packets (for example, PDCP PDUs) sent by the UE to the two RLC entities of the master node are also the same. For CA duplication, the two or more RLC entities correspond to a same MAC entity, but data packets of these RLC entities are restricted to be sent on different carriers or cells (for example, restricted through logical channel mapping). Herein, it may also be considered that two or more paths (paths) are used to transmit data packets. For example, protocol layer entities on a path 1 include a first PDCP of the base station, first RLC of the base station, MAC of the base station, a PHY of the base station, a PHY of the UE, MAC of the UE, third RLC of the UE, and a second PDCP of the UE. Protocol layer entities on a path 2 include a first PDCP of the base station, second RLC of the base station, MAC of the base station, a PHY of the base station, a PHY of the UE, MAC of the UE, fourth RLC of the UE, and a second PDCP of the UE.

Both the DC duplication manner and the CA duplication manner are duplication manners. It should be noted that, unless otherwise specified, the following DC scenario includes DC duplication and a non-duplication DC. Unless otherwise specified, the CA scenario is the CA duplication scenario. In addition to duplicating the data packet to obtain two (or more) data packets, the transmit end may alternatively transmit the data packet to the UE through two or more base stations in a splitting manner instead of a duplication manner. For example, the master node divides, into two parts at the PDCP layer, the data packet (for example, the data packet of the URLLC service) to be sent to the terminal device, where one part of the data packet is sent to the UE through the RLC of the master node, and the other part of the data packet is sent to the UE through the RLC of the secondary node, that is, the data packet is sent to the UE through the split bearer. Correspondingly, the UE may also divide the data packet into two parts at the PDCP layer of the uplink DRB, send one part of the data packet to one RLC entity of the UE and the master node, and send the remaining other part of the data packet to the other RLC entity of the UE and the secondary node, that is, the data packet is sent to the two base stations through the split bearer. For ease of description, a data packet splitting manner is referred to as a non-duplication manner in the following embodiments. In the non-duplication manner, data packets sent by the master node and the secondary node to the UE are different. Correspondingly, data packets sent by the UE to the master node and the secondary node are also different. Herein, it may be considered that two or more paths are used to transmit data packets of a DRB. Specific explanation is the same as that in the foregoing DC scenario.

With the development of communication requirements, low-latency performance needs to be ensured for an increasing quantity of services. For example, a URLLC service requires a latency less than 0.5 ms. To ensure service performance, an operator needs to know delay performance of a current network.

In a current protocol, only a delay measurement method used when one-path communication (that is, one DRB corresponds to only one RLC bearer) is performed between the UE and one base station is provided, and a delay measurement method used when the UE performs multi-path communication with two or more base stations or when the UE performs multi-path communication with a plurality of RLC entities of one base station is not provided. That is, a delay measurement method used when one DRB corresponds to two or more RLC bearers is not provided in the current protocol. The embodiments provide a delay measurement method for a case in which one DRB corresponds to two or more RLC bearers.

In the embodiments, a path may also be referred to as a tributary, a channel, a link, or the like. The path may be a path between the UE and a different base station, or may be a path between the UE and a different RLC entity of a same base station.

Figure 8:
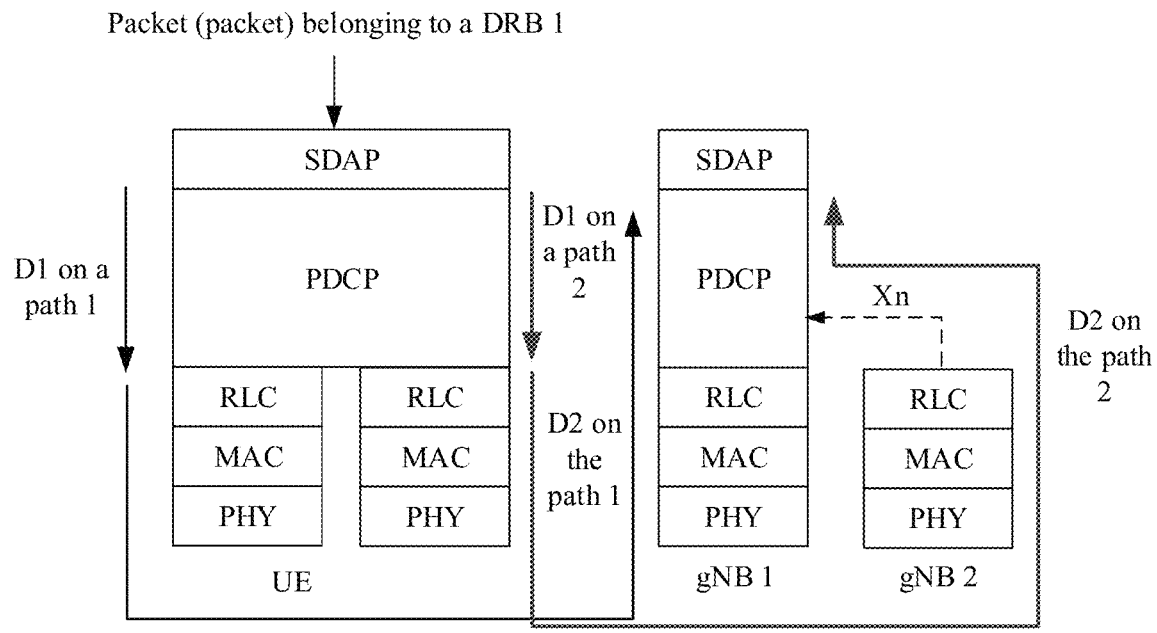
FIG. 8 is a schematic diagram of an uplink data transmission process according to an embodiment.

For example, in the DC scenario, two base stations: a master node gNB 1 and a secondary node gNB 2, provide two paths to transmit data packets of the DRB 1 for the UE. FIG. 8 is a schematic diagram of an uplink data transmission process. FIG. 9(*a*) and FIG. 9(*b*) are a schematic diagram of a downlink data transmission process. Here, for the uplink transmission process, protocol layer entities on a UE side on a path 1 sequentially include a PDCP layer, an RLC layer, a MAC layer, and a PHY layer from top to bottom. Protocol layer entities on the UE side on a path 2 sequentially include a PDCP layer, an RLC layer, a MAC layer, and a PHY layer from top to bottom. In addition, RLC layers, MAC layers, and PHY layers on the UE side on the path 1 and the path 2 are two different groups of protocol entities. Protocol layer entities on a network side on the path 1 sequentially include a PHY layer, a MAC layer, an RLC layer, and a PDCP layer of the master node from bottom to top, and protocol layer entities on the network side on the path 2 sequentially include a PHY layer, a MAC layer, and an RLC layer of the secondary node from bottom to top. For the downlink transmission process, protocol layer entities on the network side on a path 3 sequentially include a PDCP layer of the master node, an RLC layer of the master node, a MAC layer of the master node, and a PHY layer of the master node from top to bottom. Protocol layer entities on the network side on a path 4 sequentially include an RLC layer of the secondary node, a MAC layer of the secondary node, and a PHY layer of the secondary node from top to bottom. Protocol layer entities on the UE side on the path 3 sequentially include a PHY layer of the UE, a MAC layer of the UE, an RLC layer of the UE, and a PDCP layer of the UE from bottom to top. Protocol layer entities on the UE side on the path 4 sequentially include a PHY layer of the UE, a MAC layer of the UE, an RLC layer of the UE, and a PDCP layer of the UE from bottom to top. In addition, RLC layers, MAC layers, RLC layers, and PDCP layers on the UE side on the path 3 and the path 4 are two different groups of protocol entities. It should be noted that in the schematic diagram of this embodiment, an example in which the UE is connected to a protocol entity of a 5G core network is used. This embodiment may be further applied to a scenario in which the UE is connected to a 4G core network (for example, there is no SDAP protocol layer). This is not limited in the embodiments. For a same device (a terminal device or a network device), although that a plurality of paths correspond to different PHY entities is described in FIG. 8 or FIG. 9(*a*) and FIG. 9(*b*), in actual application, different paths may alternatively correspond to a same PHY entity, but data packets of different RLC entities are sent on different carriers or in different cells.

Figure 10:
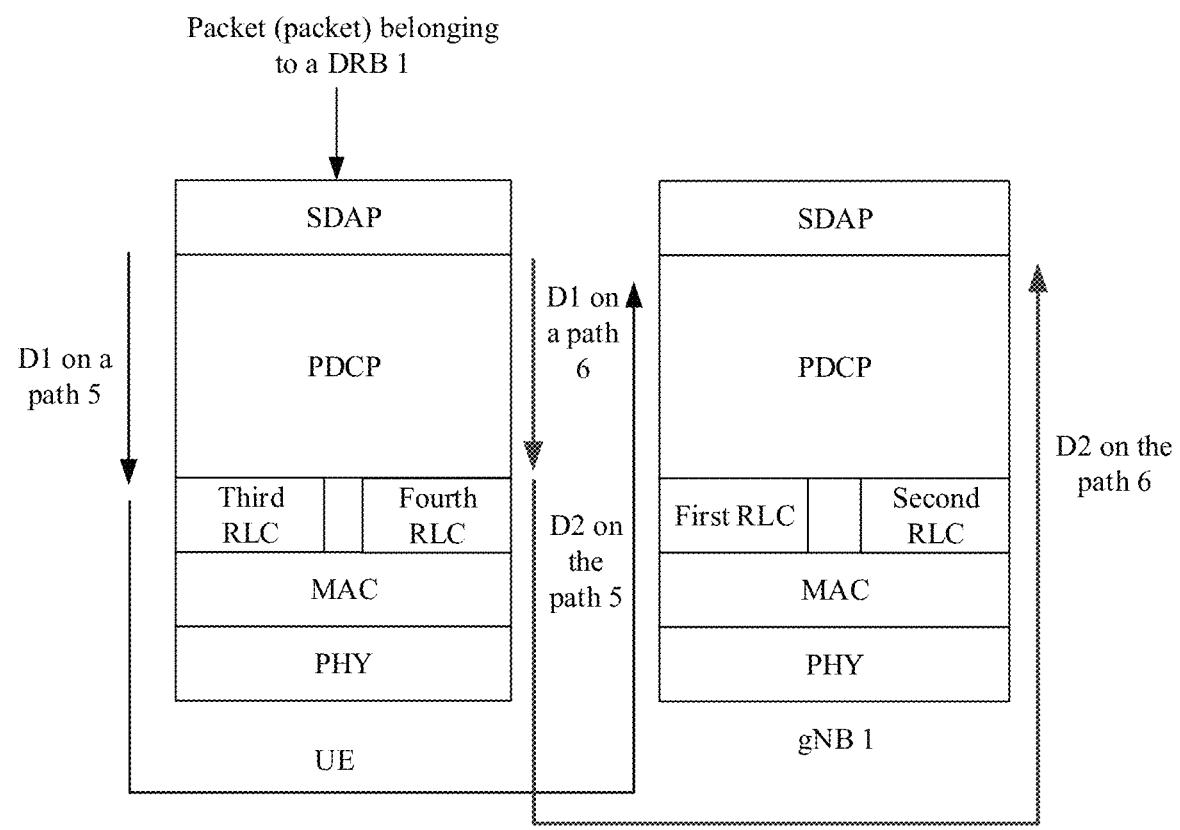
FIG. 10 is a schematic diagram of another uplink data transmission process according to an embodiment.
Figure 11:
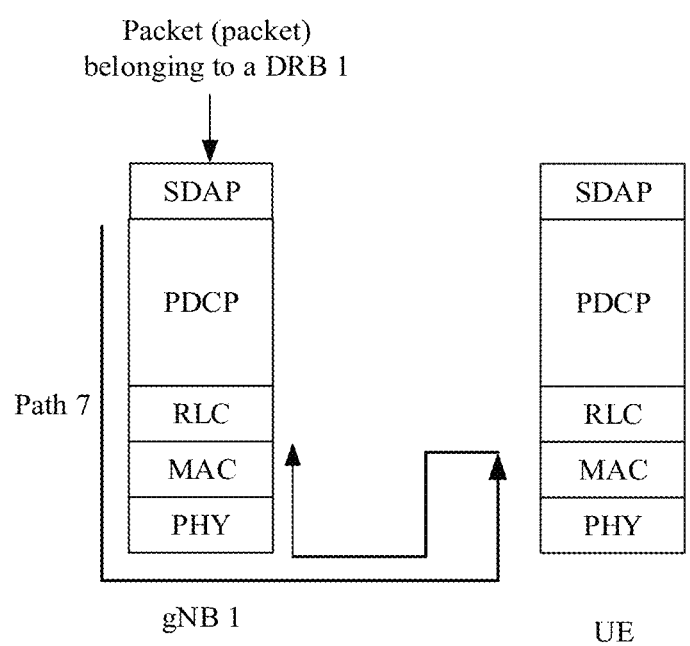
FIG. 11 is a schematic diagram of another downlink data transmission process according to an embodiment.

For another example, in the CA scenario, one base station: a master node gNB 1, provides two paths to transmit data packets of the DRB 1 for the UE. FIG. 10 is a schematic diagram of an uplink data transmission process. FIG. 11 is a schematic diagram of a downlink data transmission process. Herein, for the uplink transmission process, protocol layer entities on a UE side on a path 5 sequentially include a PDCP layer of the UE, a third RLC layer of the UE, a MAC layer of the UE, and a PHY layer of the UE from top to bottom. Protocol layer entities on the UE side on a path 6 sequentially include a PDCP layer of the UE, a fourth RLC layer of the UE, a MAC layer of the UE, and a PHY layer of the UE from top to bottom. In addition, RLC layers on the UE side on the path 5 and the path 6 are two different protocol entities, and MAC layers and PHY layers on the UE side are two groups of identical protocol entities. Protocol layer entities on a network side on the path 5 sequentially include a PHY layer of the gNB 1, a MAC layer of the gNB 1, a first RLC layer of the gNB 1, and a PDCP layer of the gNB 1 from bottom to top. Protocol layer entities on the network side on the path 6 sequentially include a PHY layer of the gNB 1, a MAC layer of the gNB 1, a second RLC layer of the gNB 1, and a PDCP layer of the gNB 1 from bottom to top. In addition, RLC layers on the network side on the path 5 and the path 6 are two different protocol entities, and MAC layers and PHY layers on the network side are two groups of identical protocol entities. The gNB 1 provides two paths for the UE to transmit data packets of the DRB 1 through two RLC entities. Similarly, for the downlink transmission process, protocol layer entities on the network side on a path 7 sequentially include a PDCP layer of the gNB 1, a first RLC layer of the gNB 1, a MAC layer of the gNB 1, and a PHY layer of the gNB 1 from top to bottom. Protocol layer entities on the network side on another path of the gNB 1 also sequentially include a PDCP layer of the gNB 1, a second RLC layer of the gNB 1, a MAC layer of the gNB 1, and a PHY layer of the gNB 1 from top to bottom. In addition, RLC layers on the network side on the two paths are two different protocol entities, and MAC layers and PHY layers on the network side on the two paths are two groups of identical protocol entities. Protocol layer entities on the UE side on the path 7 sequentially include a PHY layer of the UE, a MAC layer of the UE, a third RLC layer of the UE, and a PDCP layer of the UE from bottom to top. Protocol layer entities on the UE side on the another path also sequentially include a PHY layer of the UE, a MAC layer of the UE, a fourth RLC layer of the UE, and a PDCP layer of the UE from bottom to top. In addition, RLC layers on the UE side on the two paths are two different protocol entities, and MAC layers and PHY layers on the UE side on the two paths are two groups of identical protocol entities. For a same device (a terminal device or a network device), although different RLC entities correspond to a same PHY entity in FIG. 10 or FIG. 11, data packets of different RLC entities are sent on different carriers or in different cells. In addition, for the same device (the terminal device or the network device), although that a plurality of paths correspond to a same PHY entity is described in FIG. 10 or FIG. 11, in actual application, different paths may alternatively correspond to different PHY entities.

In the embodiments, an uplink delay and a downlink delay are measured in sections, and the uplink delay is measured in two sections: D1 and D2. D1 may be understood as a UE-side delay. D1 includes a time period between a time point at which the PDCP of the UE receives a data packet from an upper layer and a time point at which an uplink grant for sending the data packet is obtained. The delay also includes a delay between a time point at which the UE sends a scheduling request or random access and a time point at which an uplink grant is obtained. D1 is measured by the UE and reported to the network side. D2 may be understood as a network-side delay, and includes one or more of a HARQ transmission or retransmission delay, an RLC-side delay (for example, a processing delay), an F1 interface delay, a PDCP delay (for example, a PDCP reordering delay), and an Xn interface delay. For example, as shown in FIG. 8, D2 on the path 1 includes a HARQ transmission or retransmission delay of the first network device gNB 1, an RLC-side delay (for example, a processing delay) of the gNB 1, an F1 interface delay of the gNB 1, and a PDCP delay (for example, a PDCP reordering delay) of the gNB 1. D2 on the path 2 includes a HARQ transmission or retransmission delay of the second network device gNB 2, an RLC-side delay (for example, a processing delay) of the gNB 2, an Xn interface delay between the gNB 1 and the gNB 2, and a PDCP delay (for example, a PDCP reordering delay) of the gNB 1. The HARQ transmission or retransmission delay of the gNB 2, the RLC-side delay (for example, the processing delay) of the gNB 2, and the Xn interface delay between the gNB 1 and the gNB 2 are obtained by the gNB 2 and sent to the gNB 1. The gNB 1 is responsible for measuring the PDCP delay of the gNB 1, and determines D2 on the path 2 based on the HARQ transmission or retransmission delay of the gNB 2, the RLC-side delay (for example, the processing delay) of the gNB 2, and the Xn interface delay between the gNB 1 and the gNB 2 that are sent by the gNB 2. Alternatively, the HARQ transmission or retransmission delay of the gNB 2 and the RLC-side delay (for example, the processing delay) of the gNB 2 are obtained by the gNB 2 and sent to the gNB 1. The gNB 1 is responsible for measuring the Xn interface delay between the gNB 1 and the gNB 2 and the PDCP delay of the gNB 1, and determines D2 on the path 2 based on the HARQ transmission or retransmission delay of the gNB 2 and the RLC-side delay (for example, the processing delay) of the gNB 2 that are sent by the gNB 2. The Xn interface delay may be measured by the first network device, or may be measured by the second network device.

Figures 9A, 9B:
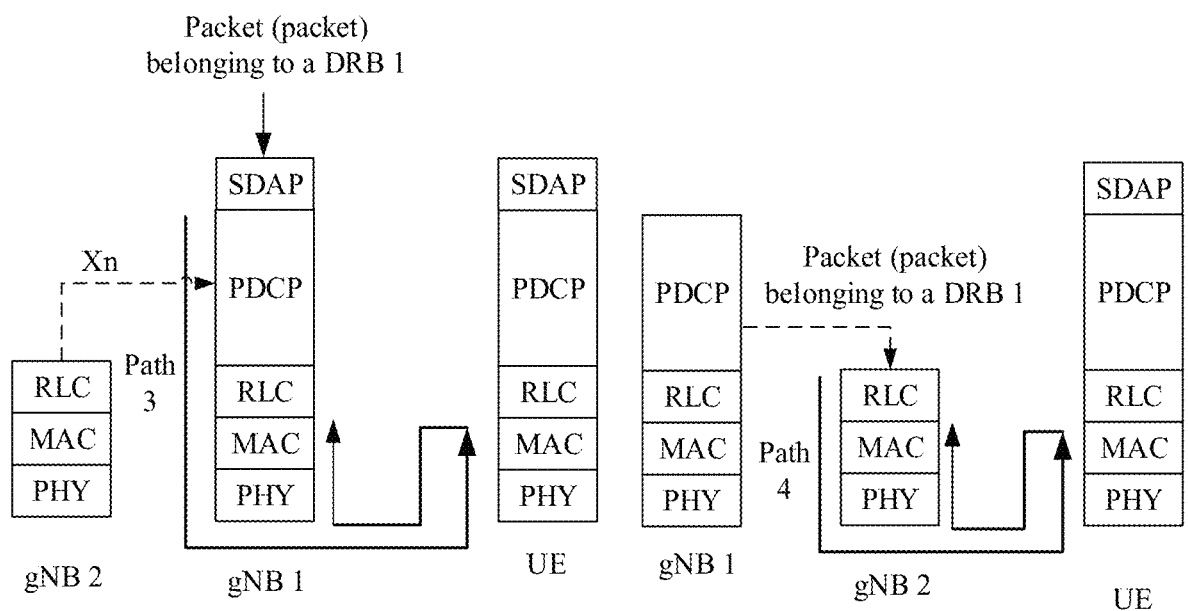
FIG. 9(*a*) and FIG. 9(*b*) are a schematic diagram of a downlink data transmission process according to an embodiment.

For the downlink delay, the downlink delay includes one or more of a PDCP layer delay (for example, a CU-UP delay), an F1-U delay, a HARQ transmission or retransmission delay, and an RLC-side delay (for example, a processing delay). As shown in FIG. 9(a) and FIG. 9(b), the downlink delay is a time period between a time point at which a data packet is received from an upper layer of the PDCP and a time point at which the MAC layer determines that the data packet is correctly received by the UE (for example, it is determined, based on a HARQ feedback received by the base station from the UE, that the data packet is correctly received by the UE). The CU-UP delay may be a time period between a time point at which a CU-UP receives a data packet through NG-U and a time point at which the data packet is sent to a CU-DU.

In the embodiments, the base station determines the uplink delay or the downlink delay. In addition, delay measurement may be performed based on a DRB granularity. After obtaining a DRB delay result, the base station may convert the result into a QoS flow—level delay (all QoS flows mapped to a same DRB have same QoS processing), and then send the delay to a core network. The core network may monitor a delay of a transmission path (air interface delay+delay between an access network and the core network), to determine whether a network can meet delay requirements of different services, or to facilitate the core network in adjusting resource allocation of a network to meet delay requirements of different services.

The following describes in detail how a base station determines an uplink delay when one DRB corresponds to two or more RLC bearers.

Embodiment 1

Figure 12:
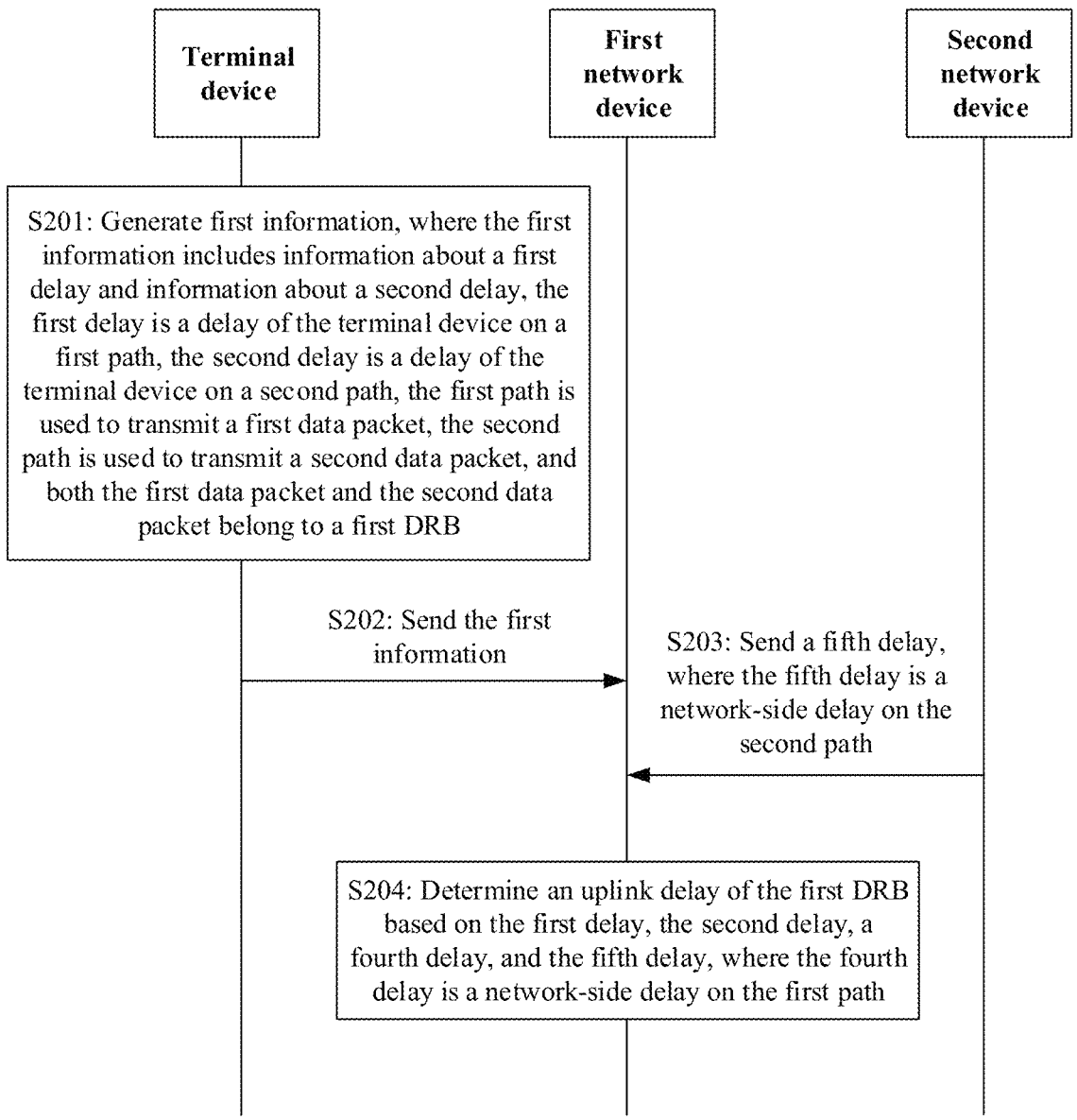
FIG. 12 is a schematic flowchart of a communication method according to Embodiment 1.

FIG. 12 is a schematic flowchart of a communication method according to Embodiment 1. The method includes steps S201 to S204.

S201: A terminal device generates first information, where the first information includes information about a first delay and information about a second delay, the first delay is a delay of the terminal device on a first path, the second delay is a delay of the terminal device on a second path, the first path is used to transmit a first data packet, the second path is used to transmit a second data packet, and both the first data packet and the second data packet belong to a first DRB.

S202: The terminal device sends the first information to a first network device, and correspondingly, the first network device receives the first information from the terminal device.

S203: A second network device sends a fifth delay to the first network device, and the first network device receives the fifth delay from the second network device, where the fifth delay is a network-side delay on the second path.

S204: The first network device determines an uplink delay of the first DRB based on the first delay, the second delay, a fourth delay, and the fifth delay, where the fourth delay is a network-side delay on the first path.

A sequence of performing step S202 and step S203 is not limited.

This embodiment may be applied to a DC scenario. For example, there are at least two network devices that perform data transmission with UE. An example in which two network devices perform data transmission with the UE is used. The network-side delay on the first path is a delay of the first network device on the first path, and the network-side delay on the second path is a delay of the second network device on the second path. The first network device and the second network device may be base stations. The first network device and the second network device may have a same standard, or may have different standards. For example, the first network device is a base station in NR, and the second network device is a base station in LTE.

The first DRB is a DRB, and the DRB is on the first network device or the DRB terminates on the first network device. For example, when the first network device is an MN, the DRB is an MN terminated bearer. When the first network device is an SN, the DRB is an SN terminated bearer. If a DC duplication manner is used, the UE duplicates a data packet of the DRB to obtain two data packets, sends one data packet to the first network device through the first path, and sends the other data packet to the second network device through the second path. Alternatively, if a non-DC duplication manner is used, the UE divides a data packet of the DRB into two parts, sends a part of the data packet to the first network device through the first path, and sends a remaining part of the data packet to the second network device through the second path. It should be noted that a specific manner in which the UE divides a data packet is not limited in the embodiments. In an example, the UE compares, with a threshold configured on a network side, a sum of a data volume at a PDCP layer and a data volume for initial transmission suspended at an RLC layer (where suspending means that a data packet is waiting for initial transmission, and the data packet arrives at the RLC layer and has not been scheduled). The terminal device measures UE-side delays of the DRB on the two paths. The first network device measures a network-side delay of the DRB on the first path, and the second network device measures a network-side delay of the DRB on the second path. For example, in FIG. 8, the first network device is a gNB 1, the second network device is a gNB 2, the first path is a path 1, and the second path is a path 2. The gNB 1 measures a network-side delay D2 on the path 1, the gNB 2 measures a network-side delay on the path 2, and the UE separately measures a terminal-side delay D1 on the path 1 and a terminal-side delay D1 on the path 2. Then, the UE sends D1 on the path 1 and D1 on the path 2 to the gNB 1, the gNB 2 sends the network-side delay on the path 2 to the gNB 1, and the gNB 1 finally determines an uplink delay of a DRB 1.

It should be noted that the first data packet and the second data packet are merely used to distinguish between data transmitted on different paths. In specific application, if the DC duplication manner is used, the first data packet and the second data packet may be several identical data packets. It should be noted that because scheduling moments of data packets on the two paths may be different, when the UE measures the first delay and the second delay, the first data packet and the second data packet may be several different data packets, or may be several identical data packets in a same measurement periodicity. If the non-DC duplication manner is used, the first data packet and the second data packet may be several different data packets.

Optionally, when a delay on a path is measured, an average delay on the path in a period of time may be measured, and the average delay is used as a delay on the path. For example, the first network device uses an average network-side delay on the first path in a first time window as a network-side delay on the first path, and the UE uses an average UE-side delay in a second time window on the first path as a UE-side delay on the first path. Duration of the first time window and duration of the second time window may be the same, or may be different. Data packets transmitted on the first path in the first time window and the second time window belong to the first DRB. The data packets transmitted on the first path in the first time window and the second time window may be exactly the same, or may be different. There are one or more first data packets and one or more second data packets, and quantities of first data packets and second data packets may be the same, or may be different.

Optionally, in the DC scenario, a UE side measures a delay of the DRB on each path. The first delay measured by the UE includes a delay between a time point at which a PDCP entity of the UE receives the first data packet from an upper layer and a time point at which the UE obtains an uplink grant for sending the first data packet to the first network device. The second delay measured by the UE includes a delay between a time point at which the PDCP entity of the UE receives the second data packet from the upper layer and a time point at which the UE obtains an uplink grant for sending the second data packet to the second network device.

A manner in which the UE determines the uplink delay on the UE side may be that a delay that corresponds to each data packet on the first path and that is between a time point at which the data packet is received from a PDCP upper-layer service access point (SAP) or an SDAP upper-layer SAP and a time point at which an uplink grant for transmitting the data packet is obtained is measured in a specific periodicity, and then an average value of delays of these data packets is used as the first delay; similarly, a delay that corresponds to each data packet on the second path and that is between a time point at which the data packet is received from the PDCP upper-layer SAP or the SDAP upper-layer SAP and a time point at which an uplink grant for transmitting the data packet is obtained is measured in a specific periodicity, and then an average value of delays of these data packets is used as the second delay. Optionally, the measurement periodicity on the first path and the measurement periodicity on the second path may be the same or different, and the measurement periodicity may be pre-specified, or may be configured by the network device.

Optionally, when reporting the information about the first delay or the information about the second delay, the UE may include, in the information about the first delay or the information about the second delay, an identifier corresponding to a path, for example, a logical channel (LCH) identifier (ID), a cell group ID, an RLC identifier (for example, a primary RLC identifier or a secondary RLC identifier), or an identifier of a base station (for example, an identifier of a master node or an identifier of a secondary node), to identify the first delay and the second delay. Alternatively, when reporting the information about the first delay or the information about the second delay, the UE implicitly identifies the first delay and the second delay by using different names or different occurrence locations of the two delays.

Optionally, when reporting the information about the first delay or the information about the second delay, the UE may include a DRB identifier in the information about the first delay or the information about the second delay, to indicate a specific DRB whose delay information is to be reported.

Optionally, in the DC scenario, the fourth delay measured by the first network device includes at least one of a HARQ transmission delay of the first network device, a delay of an RLC entity of the first network device, a delay of a PDCP entity of the first network device, and a delay of a first interface. The first interface is a communication interface (that is, an F1 interface) between a CU of the first network device and a DU of the first network device. The fifth delay measured by the second network device includes at least one of a HARQ transmission delay of the second network device, a delay of an RLC entity of the second network device, and a delay of a second interface. The second interface is a communication interface between the first network device and the second network device (for example, an Xn interface, where the Xn interface is an interface between the master node and the secondary node). A delay of a protocol entity includes a processing delay of a protocol layer or a delay between a time point at which the layer receives a data packet from a lower layer and a time point at which the layer sends the data packet to an upper layer.

The HARQ transmission delay of the first network device is a HARQ transmission delay of the first network device when the first network device obtains the data packet of the first DRB. The delay of the RLC entity of the first network device is a delay of the RLC entity of the first network device when the first network device obtains the data packet of the first DRB. The delay of the PDCP entity of the first network device is a delay of the RLC entity of the first network device when the first network device obtains the data packet of the first DRB. The delay of the first interface is a delay of the first interface of the first network device when the first network device obtains the data packet of the first DRB. Correspondingly, the HARQ transmission delay of the second network device is a HARQ transmission delay of the second network device when the second network device obtains the data packet of the first DRB. The delay of the RLC entity of the second network device is a delay of the RLC entity of the second network device when the second network device obtains the data packet of the first DRB. The delay of the second interface is a delay of the second interface of the second network device when the second network device obtains the data packet of the first DRB.

When the first network device does not use a CU-DU separation architecture, the fourth delay includes the HARQ transmission delay of the first network device, the delay of the RLC entity of the first network device, and the delay of the PDCP entity of the first network device, and the fifth delay includes the HARQ transmission delay of the second network device and the delay of the RLC entity of the second network device. Optionally, the delay of the second interface is measured by the first network device, and the first network device determines D2 on the second path based on the fifth delay, the delay of the second interface, and the delay of the PDCP layer of the first network device. Optionally, the delay of the second interface may alternatively be measured by the second network device. In this case, the fifth delay includes the HARQ transmission delay of the second network device, the delay of the RLC entity of the second network device, and the delay of the second interface, and the first network device determines D2 on the second path based on the fifth delay and the delay of the PDCP layer of the first network device.

Optionally, when the first network device uses a CU-DU separation architecture, if the first network device is a CU unit, the fourth delay includes the HARQ transmission delay of the first network device, the delay of the RLC entity of the first network device, the delay of the PDCP entity of the first network device, and the delay of the first interface, and the fifth delay includes the HARQ transmission delay of the second network device and the delay of the RLC entity of the second network device. Optionally, the delay of the second interface is measured by the CU unit, and the CU unit determines D2 on the second path based on the fifth delay, the delay of the second interface, and the delay of the PDCP layer of the first network device. Optionally, the delay of the second interface may alternatively be measured by the second network device. In this case, the fifth delay includes the HARQ transmission delay of the second network device, the delay of the RLC entity of the second network device, and the delay of the second interface, and the CU unit determines D2 on the second path based on the fifth delay and the delay of the PDCP layer of the first network device.

Optionally, when the first network device uses a CU-DU separation architecture, if the first network device is a DU unit, the fourth delay includes the HARQ transmission delay of the first network device and the delay of the RLC entity of the first network device, the fifth delay includes the HARQ transmission delay of the second network device and the delay of the RLC entity of the second network device, and the DU unit determines D2 on the second path based on the fifth delay.

A manner in which the first network device determines the uplink delay on the network side may be that a delay of each data packet on the first path between a time point at which the base station schedules the data packet and a time point at which the base station receives the data packet for processing is measured in a specific periodicity, and then an average value of delays of these data packets is used as the fourth delay. Alternatively, the first network device separately measures an average delay (in a specific periodicity) of each data packet on the first path between a time point at which the DU schedules the data packet and a time point at which the DU sends the data packet to a CU-UP, an F1 interface delay, and an average delay of the CU-UP (which is an average delay between a time point at which the CU-UP receives each data packet through the F1 interface and a time point at which the CU-UP sends the data packet to a core network), and then adds up these delays to obtain the fourth delay. Similarly, that the second network device internally measures the uplink delay is that a delay of each data packet on the second path between a time point at which the base station schedules the data packet and a time point at which the base station receives the data packet for processing (for example, a time point at which the data packet is sent to the core network or a time point at which the PDCP layer submits the data packet to the upper layer) is measured in a specific periodicity, and then an average value of delays of these data packets is used as the fifth delay. Alternatively, the second network device separately measures an average delay (in a specific periodicity) of delays of all data packets on the second path between a time point at which the base station schedules the data packet and a time point at which the base station receives the data packet for processing (for example, a time point at which the DU sends the data packet to the CU) and an X2/Xn interface delay, and then adds up these delays to obtain the fifth delay.

Optionally, that the first network device determines the uplink delay of the first DRB based on the first delay, the second delay, the fourth delay, and the fifth delay may be that the first network device determines a first uplink delay based on the first delay and the fourth delay, determines a second uplink delay based on the second delay and the fifth delay, and then determines the uplink delay of the first DRB based on the first uplink delay and the second uplink delay. That is, in this embodiment, a total delay on each path is first determined (for example, an uplink delay on each path is: average uplink delay on the UE side reported by the UE+average delay on a base station side measured by the base station side), and a final delay (where the final delay is the uplink delay of the first DRB) of the DRB is determined based on the total delay on each path. FIG. 8 is used as an example. The gNB 1 first determines a total delay on the path 1 based on D1 on the path 1 and D2 on the path 1, and determines a total delay on the path 2 based on D1 on the path 2 and D2 on the path 2. For example, determining formulas are as follows: delay on the path 1=delay D1 on the path 1+delay D2 on the path 1; delay on the path 2=delay D1 on the path+delay D2 on the path 2. Finally, the final delay of the DRB is determined based on the total delay on the path 1 and the total delay on the path 2. For example, the final delay of the DRB is min(delay on the path 1, delay on the path 2), or the final delay of the DRB is max(delay on the path 1, delay on the path 2), or the final delay of the DRB is an average value of the delay on the path 1 and the delay on the path 2. Optionally, because moments for obtaining the first delay and the fourth delay may be different, and moments for obtaining the second delay and the fifth delay may be different, the first network device may determine the first uplink delay based on the first delay determined at a current moment and the fourth delay determined at the current moment, and obtain the second uplink delay based on the second delay determined at the current moment and the fifth delay determined at the current moment. Optionally, the fifth delay sent by the second network device does not include a PDCP delay. When determining D2 on the second path, the first network device may obtain D2 on the second path by summing the fifth delay sent by the second network device and the PDCP delay of the first network device. It may be understood that a manner in which the network device determines the final delay of the DRB is not limited in this embodiment.

Optionally, the UE may include the first information in an RRC message (for example, a measurement reporting message).

Optionally, before the first network device receives the first information from the terminal device, the method further includes: The first network device sends first indication information to the terminal device, and the terminal device receives the first indication information from the first network device. The first indication information is used to indicate the terminal device to measure the first information. After receiving the first indication information, the terminal device starts to measure the first information. Alternatively, the first indication information is used to indicate the terminal device to measure the first delay and the second delay. After receiving the first indication information, the terminal device starts to measure the first information. Optionally, a specific network device in which the first DRB is located or terminated sends the first indication information to the terminal device. For example, for an MN terminated split bearer, the master node sends the first indication information to the terminal device. For an SN terminated split bearer, the secondary node sends the first indication information to the terminal device. Optionally, the first indication information may further include a DRB identifier, to indicate a specific DRB on which the UE is to perform UE-side delay measurement. Different measurement periodicities may be further configured for different DRBs. Optionally, the first indication information may further indicate to perform uplink delay measurement, or perform downlink delay measurement, or perform uplink and downlink delay measurement. In this process, delay measurement configuration may be performed based on a DRB granularity. In this process, load of the UE can be reduced, and processing overheads of the UE can be reduced. Optionally, the first network device may send the first indication information through a measurement configuration message. It should be noted that, in this embodiment, the network side notifies the UE of a specific DRB on which delay information is to be measured, that is, the first indication information includes the DRB identifier, to indicate the specific DRB on which the UE is to perform UE-side delay measurement. Optionally, different measurement periodicities or a same measurement periodicity may be further configured for different DRBs in the first indication information. Optionally, the first indication information may further indicate to perform uplink delay measurement, or perform downlink delay measurement, or perform uplink and downlink delay measurement. Optionally, the first indication information may be sent through a measurement configuration. The foregoing may be used as an independent implementation and may not depend on a network-side specific measurement method and a UE reporting method in the embodiments.

Optionally, before the second network device sends the fifth delay to the first network device, the method further includes: The first network device sends second indication information to the second network device, and the second network device receives the second indication information from the first network device, where the second indication information indicates the second network device to measure the fifth delay. For example, in the DC scenario, for example, for the MN terminated split bearer, the master node needs to notify, through an Xn/X2 interface, the secondary node to measure the network-side delay on the second path of the DRB. Optionally, the second indication information may further indicate to perform uplink delay measurement, or perform downlink delay measurement, or perform uplink and downlink delay measurement. Optionally, the second indication information may further include a DRB identifier, to indicate a specific DRB on which the secondary node is to perform network-side delay measurement.

In a DRB offloading scenario (where DRB offloading means that a DRB migrates between an MN terminated bearer and an SN terminated bearer, for example, the master node migrates the DRB from the master node to the secondary node), the UE may automatically stop delay measurement on the DRB when receiving a DRB offloading command delivered by the network device. Alternatively, a DRB offloading command delivered by the master node also carries indication information indicating that a source base station (a base station before migration) deletes a delay measurement configuration task of the DRB. The UE may stop delay measurement on the DRB based on the indication information when receiving the DRB offloading command. This is because a measurement task cannot be inherited, and a measurement identifier (measID) is independent on both sides of the master node and the secondary node. Alternatively, when the master node does not notify the UE to delete a delay measurement task of the DRB, the UE reports a result that measurement on the DRB is not performed or the UE does not report a measurement result. When the UE receives the delay measurement task of the DRB from the secondary node, the UE restarts delay measurement on the DRB. Similarly, when the master node migrates the DRB from the master node to the secondary node, the master node may further notify the secondary node to stop delay measurement on the DRB. After the DRB is migrated, a target base station (a base station after migration) may re-trigger the measurement task of the DRB. In this process, load of the UE can be reduced, and processing overheads of the UE can be reduced.

In this embodiment, two network devices are used as an example for description. In actual application, more network devices may alternatively may establish, for the terminal device, paths for transmitting a data packet of the first DRB. For an implementation process of a plurality of paths, refer to an implementation process of the foregoing two paths. Details are not described herein again.

According to the method embodiment shown in FIG. 12, in a scenario in which a data packet of one DRB is transmitted on a plurality of paths, for example, in the DC scenario, the UE may separately perform UE-side delay measurement on each path, and the network device may separately perform network-side delay measurement on each path, and finally determine the uplink delay of the DRB, thereby implementing DRB delay measurement. The network side measures and obtain the delay of the DRB, so that the network side can adjust resource allocation based on the delay, to meet a delay requirement of a service.

Embodiment 2

Figure 13:
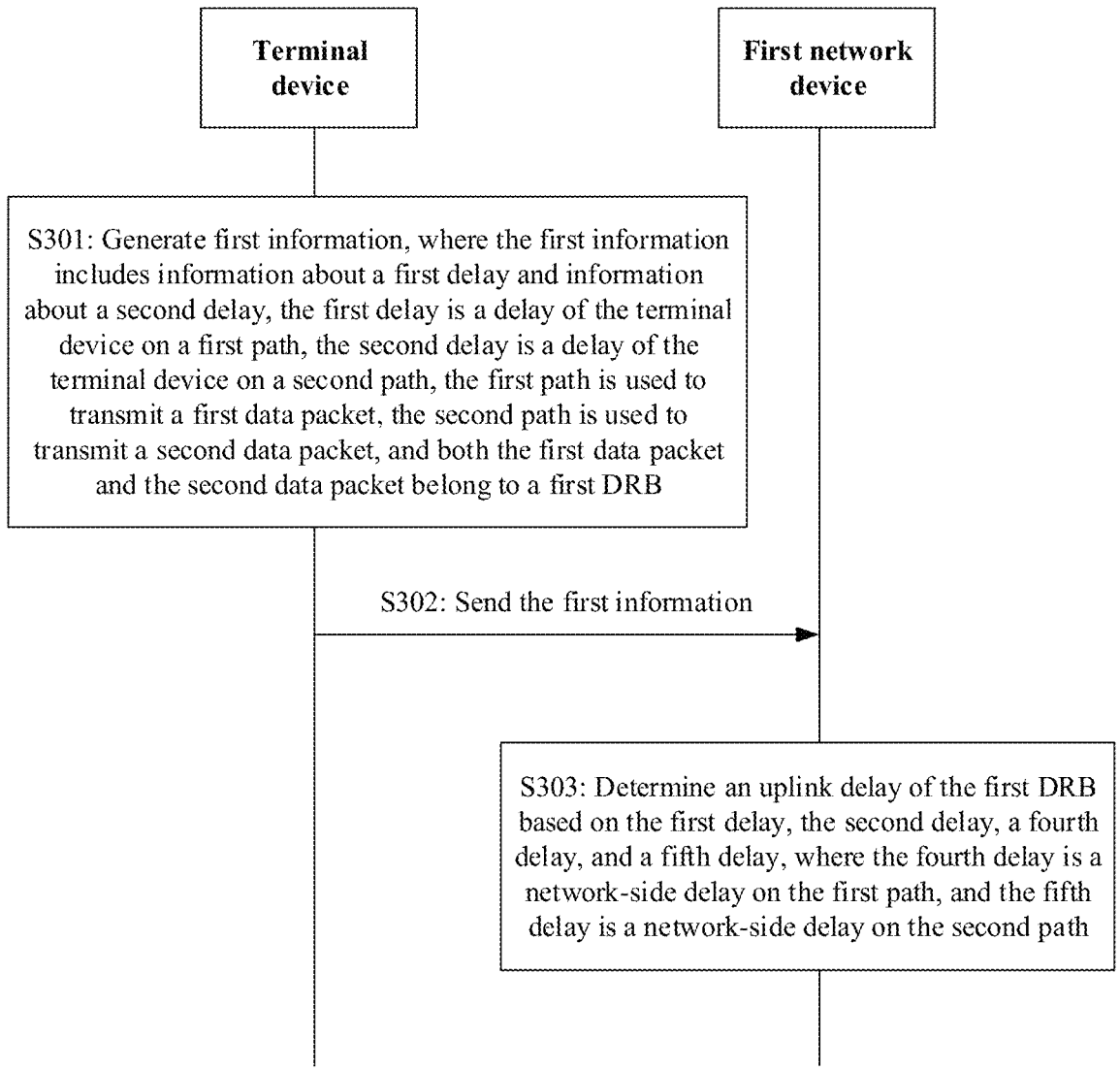
FIG. 13 is a schematic flowchart of a communication method according to Embodiment 2.

Embodiment 1 shown in FIG. 12 is described by using a DC scenario. This embodiment is further applicable to a CA scenario. For details, refer to FIG. 13. FIG. 13 is a schematic flowchart of a communication method according to Embodiment 2. The method includes steps S301 to S303.

S301: A terminal device generates first information, where the first information includes information about a first delay and information about a second delay, the first delay is a delay of the terminal device on a first path, the second delay is a delay of the terminal device on a second path, the first path is used to transmit a first data packet, the second path is used to transmit a second data packet, and both the first data packet and the second data packet belong to a first DRB.

S302: The terminal device sends the first information to a first network device, and the first network device receives the first information from the terminal device.

S303: The first network device determines an uplink delay of the first DRB based on the first delay, the second delay, a fourth delay, and a fifth delay, where the fourth delay is a network-side delay on the first path, and the fifth delay is a network-side delay on the second path.

This embodiment may be applied to the CA scenario. For example, the first network device has at least two RLC entities to perform data transmission with UE. An example in which the first network device has two RLC entities to perform data transmission with the UE is used. The network-side delay on the first path is a delay on a path corresponding to a first RLC entity of the first network device. The network-side delay on the second path is a delay on a path corresponding to a second RLC entity of the first network device. For example, in FIG. 10, the first network device is a gNB 1, the first path is a path 5, and the second path is a path 6. The gNB 1 measures a network-side delay D2 on the path 5 and a network-side delay D2 on the path 6, and the UE separately measures a terminal-side delay D1 on the path 5 and a terminal-side delay D1 on the path 6. Then, the UE sends D1 on the path 5 and D1 on the path 6 to the gNB 1, and the gNB 1 finally determines an uplink delay of a DRB 1.

The first DRB is a DRB. If a CA duplication manner is used, the UE duplicates a data packet of the DRB to obtain two data packets, sends one data packet to the first RLC entity of the first network device through the first path, and sends the other data packet to the second RLC entity of the first network device through the second path. The terminal device measures UE-side delays of the DRB on the two paths. The first network device measures the network-side delay of the DRB on the first path and the network-side delay of the DRB on the second path. For example, in FIG. 10, the first network device is the gNB 1, the first path is the path 5, and the second path is the path 6. The gNB 1 measures the network-side delay D2 on the path 5 and the network-side delay D2 on the path 6, and the UE separately measures the terminal-side delay D1 on the path 5 and the terminal-side delay D1 on the path 6. Then, the UE sends D1 on the path 5 and D1 on the path 6 to the gNB 1, and the gNB 1 finally determines the uplink delay of the DRB 1.

Optionally, in the CA scenario, the first delay measured by the UE includes a delay between a time point at which a PDCP entity of the terminal device receives the first data packet from an upper layer and a time point at which the terminal device obtains an uplink grant for sending the first data packet to the first RLC entity. The second delay measured by the UE includes a delay between a time point at which the PDCP entity of the terminal device receives the second data packet from the upper layer and a time point at which the terminal device obtains an uplink grant for sending the second data packet to the second RLC entity.

For example, a manner in which the UE determines an uplink delay on a UE side may be that a delay that corresponds to each data packet on the first path and that is between a time point at which the data packet is received from a PDCP upper-layer SAP or an SDAP upper-layer SAP and a time point at which an uplink grant for transmitting the data packet through the first RLC entity is obtained is measured in a specific periodicity, and then an average value of delays of these data packets is used as the first delay. Similarly, a delay that corresponds to each data packet on the second path and that is between a time point at which the data packet is received from the PDCP upper-layer SAP or the SDAP upper-layer SAP and a time point at which an uplink grant for transmitting the data packet through the second RLC entity is obtained is measured in a specific periodicity, and then an average value of delays of these data packets is used as the second delay. Optionally, the measurement periodicity on the first path and the measurement periodicity on the second path may be the same or different, and the measurement periodicity may be pre-specified, or may be configured by the network device. It should be noted that because scheduling moments of data packets on the two paths may be different, when the UE measures the first delay and the second delay, the first data packet and the second data packet may be several different data packets, or may be several identical data packets in a same measurement periodicity.

Optionally, when reporting the information about the first delay or the information about the second delay, the UE carries an identifier corresponding to a path, for example, an LCH ID, a cell group ID, or an RLC identifier (for example, a primary RLC identifier or a secondary RLC identifier), to identify the first delay and the second delay. Alternatively, when reporting the information about the first delay or the information about the second delay, the UE implicitly identifies the first delay and the second delay by using different names or different occurrence locations of the two delays. Optionally, when reporting the information about the first delay or the information about the second delay, the UE may include a DRB identifier in the information about the first delay or the information about the second delay, to indicate a specific DRB whose delay information is to be reported.

Optionally, in the CA scenario, the fourth delay measured by the first network device includes at least one of a HARQ transmission delay of the first network device, a delay of the first RLC entity of the first network device, a delay of a PDCP entity of the first network device, and a delay of a first interface. The first interface is a communication interface between a CU of the network device and a DU of the network device. The fifth delay measured by the first network device includes at least one of the HARQ transmission delay of the first network device, a delay of the second RLC entity of the first network device, the delay of the PDCP entity of the first network device, and the delay of the first interface.

A manner in which the first network device determines the uplink delay on the network side may be that a delay of each data packet on the first path between a time point at which the base station schedules the data packet and a time point at which the base station receives the data packet for processing is measured in a specific periodicity, and then an average value of delays of these data packets is used as the fourth delay. Alternatively, the first network device separately measures an average delay of each data packet on the first path between a time point at which the DU schedules the data packet and a time point at which the DU sends the data packet to a CU-UP, an F1 interface delay, and an average delay of the CU-UP (which is an average delay between a time point at which the CU-UP receives each data packet through an F1 interface and a time point at which the CU-UP sends the data packet to a core network), and then adds up these delays to obtain the fourth delay. Similarly, a delay of each data packet on the second path between a time point at which the base station schedules the data packet and a time point at which the base station receives the data packet for processing is measured in a specific periodicity, and then an average value of delays of these data packets is used as the fifth delay. Alternatively, the first network device separately measures an average delay of each data packet on the second path between a time point at which the DU schedules the data packet and a time point at which the DU sends the data packet to a CU-UP, an F1 interface delay, and an average delay of the CU-UP (which is an average delay between a time point at which the CU-UP receives each data packet through an F1 interface and a time point at which the CU-UP sends the data packet to a core network), and then adds up these delays to obtain the fifth delay.

Optionally, that the first network device determines the uplink delay of the first DRB based on the first delay, the second delay, the fourth delay, and the fifth delay may be that the first network device determines a first uplink delay based on the first delay and the fourth delay, determines a second uplink delay based on the second delay and the fifth delay, and then determines the uplink delay of the first DRB based on the first uplink delay and the second uplink delay. That is, in this embodiment, a total delay on each path is first determined (for example, an uplink delay on each path is: average uplink delay on the UE side reported by the UE+average delay on a base station side measured by the base station side), and a final delay (where the final delay is the uplink delay of the first DRB) of the DRB is determined based on the total delay on each path. FIG. 10 is used as an example. The gNB 1 first determines a total delay on the path 5 based on D1 on the path 5 and D2 on the path 5, and determines a total delay on the path 6 based on D1 on the path 6 and D2 on the path 6. For example, determining formulas are as follows: delay on the path 5=delay D1 on the path 5+delay D2 on the path 5; delay on the path 6=delay D1 on the path 6+delay D2 on the path 6. Finally, the final delay of the DRB is determined based on the total delay on the path 5 and the total delay on the path 6. For example, the final delay of the DRB is min(delay on the path 5, delay on the path 6), or the final delay of the DRB is max(delay on the path 5, delay on the path 6), or the final delay of the DRB is an average value of the delay on the path 5 and the delay on the path 6. Optionally, because moments for obtaining the first delay and the fourth delay may be different, and moments for obtaining the second delay and the fifth delay may be different, the first network device may determine the first uplink delay based on the first delay determined at a current moment and the fourth delay determined at the current moment, and obtain the second uplink delay based on the second delay determined at the current moment and the fifth delay determined at the current moment. It may be understood that a manner in which the network device determines the final delay of the DRB is not limited in this embodiment.

Optionally, the UE may include the first information in an RRC message (for example, a measurement reporting message).

Optionally, before the first network device receives the first information from the terminal device, the method further includes: The first network device sends first indication information to the terminal device, and the terminal device receives the first indication information from the first network device. The first indication information is used to indicate the terminal device to measure the first information. After receiving the first indication information, the terminal device starts to measure the first information. Optionally, the first indication information may further include a DRB identifier, to indicate a specific DRB on which the UE is to perform UE-side delay measurement. Different measurement periodicities may be further configured for different DRBs. Optionally, the first indication information may further indicate to perform uplink delay measurement, or perform downlink delay measurement, or perform uplink and downlink delay measurement. In this process, delay measurement configuration may be performed based on a DRB granularity. In this process, load of the UE can be reduced, and processing overheads of the UE can be reduced. Optionally, the first network device may send the first indication information through a measurement configuration message.

According to the method embodiment shown in FIG. 13, in a scenario in which a data packet of one DRB is transmitted on a plurality of paths, for example, in the CA scenario, the UE may separately perform UE-side delay measurement on each path, and the network device may separately perform network-side delay measurement on each path, and finally determine the uplink delay of the DRB, thereby implementing DRB delay measurement. The network side measures and obtain the delay of the DRB, so that the network side can adjust resource allocation based on the delay, to meet a delay requirement of a service.

Embodiment 3

Figure 14:
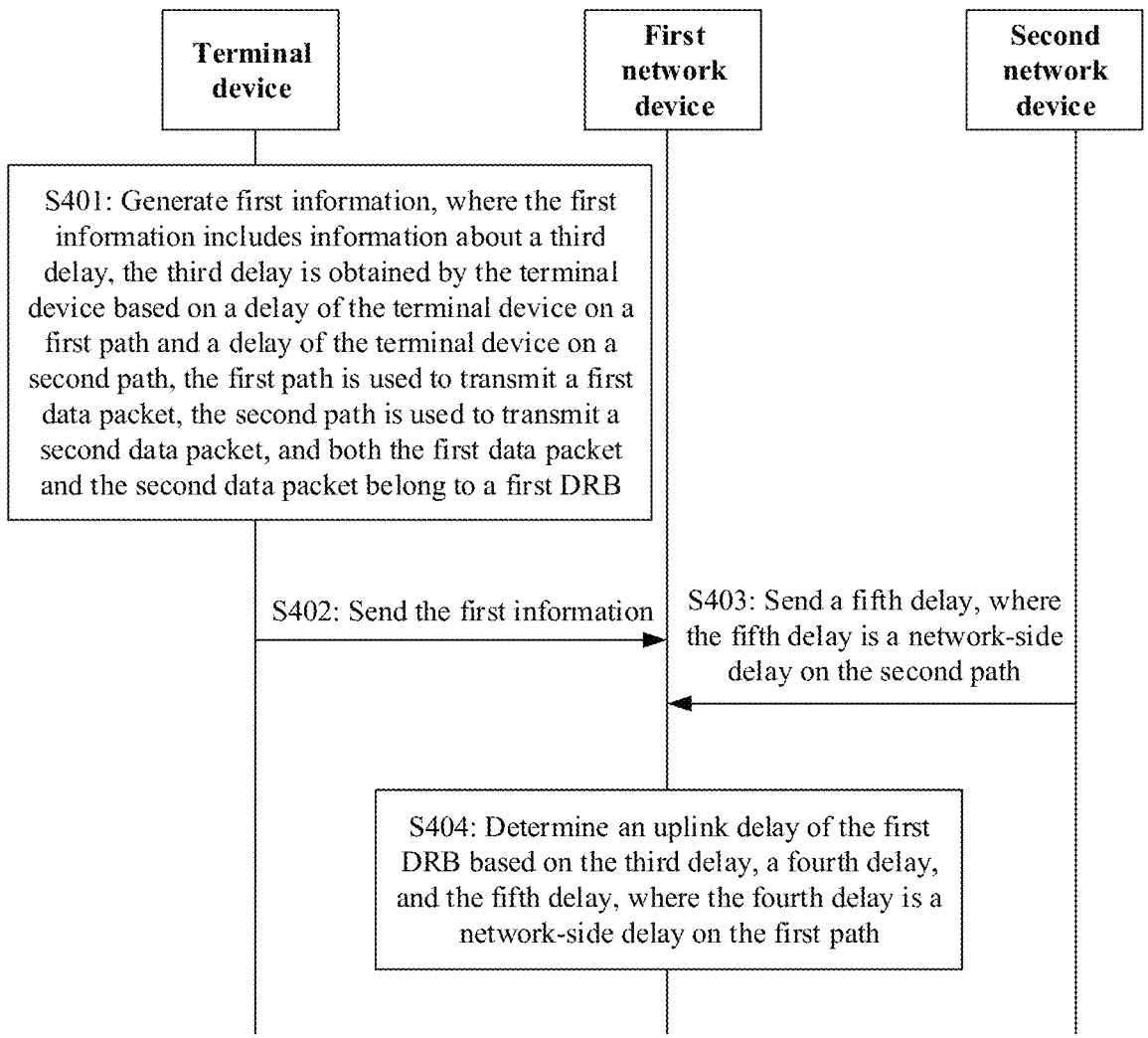
FIG. 14 is a schematic flowchart of a communication method according to Embodiment 3.

In Embodiment 1 shown in FIG. 12 and Embodiment 2 shown in FIG. 13, UE reports UE-side delays on two paths, and a first network device measures total delays on the two paths, and determines a final delay of a first DRB based on the total delays on the two paths. In addition to this manner, the UE may report a combined UE-side delay on the two paths, and a base station first obtains a combined network-side delay based on a network-side delay measured on each path, and then determines the final delay of the first DRB based on the combined UE-side delay and the combined network-side delay. For example, FIG. 14 is a schematic flowchart of a communication method according to Embodiment 3. The method includes steps S401 to S404.

S401: A terminal device generates first information, where the first information includes information about a third delay, the third delay is obtained by the terminal device based on a delay of the terminal device on a first path and a delay of the terminal device on a second path, the first path is used to transmit a first data packet, the second path is used to transmit a second data packet, and both the first data packet and the second data packet belong to a first DRB.

S402: The terminal device sends the first information to a first network device, and the first network device receives the first information from the terminal device.

S403: A second network device sends a fifth delay to the first network device, and the first network device receives the fifth delay from the second network device, where the fifth delay is a network-side delay on the second path.

S404: The first network device determines an uplink delay of the first DRB based on the third delay, a fourth delay, and the fifth delay, where the fourth delay is a network-side delay on the first path.

A sequence of performing step S402 and step S403 is not limited. This embodiment may be applied to a DC scenario. The network-side delay on the first path is a delay of the first network device on the first path, and the network-side delay on the second path is a delay of the second network device on the second path.

The terminal device measures the third delay by comprehensively considering a UE-side delay of the first data packet transmitted on the first path and a UE-side delay of the second data packet transmitted on the second path. The third delay is obtained by performing comprehensive determining based on the UE-side delay of the first data packet transmitted on the first path and the UE-side delay of the second data packet transmitted on the second path. There are one or more pieces of data in each of the first data packet and the second data packet.

A manner in which the UE determines an uplink delay on a UE side may be that a delay that corresponds to each data packet on each of the first path and the second path and that is between a time point at which the data packet is received from a PDCP upper-layer SAP or an SDAP upper-layer SAP and a time point at which an uplink grant for transmitting the data packet is obtained is measured in a specific periodicity, and then an average value of delays of these data packets is used as the third delay. In a DC duplication scenario, data packets transmitted on various paths are the same. The UE may independently measure, as two data packets, a same data packet sent on the two paths, that is, measure a delay between a time point at which a data packet is received from a PDCP upper-layer SAP or an SDAP upper-layer SAP and a time point at which an uplink grant for transmitting the data packet is obtained on each path. The data packet may have two delay values. Alternatively, a minimum value (for example, a delay that corresponds to each data packet and that is between a time point at which the data packet is received from a PDCP upper-layer SAP or an SDAP upper-layer SAP and a time point at which an uplink grant for transmitting the data packet is obtained on any path), a maximum value (for example, a delay that corresponds to each data packet and that is between a time point at which the data packet is received from the PDCP upper-layer SAP or the SDAP upper-layer SAP and a time point at which a latest uplink grant for transmitting the data packet is obtained on these paths), or an average value of the data packet on the two paths is used as a final delay of the data packet on the UE side. For non-duplication DC packets, data packets transmitted on various paths are different. The UE measures a delay between a time point at which a data packet is received from a PDCP upper-layer SAP or an SDAP upper-layer SAP and a time point at which an uplink grant for transmitting the data packet is obtained (possibly on either of the two paths). In this case, the UE measures delays on the two paths (that is, the delays are determined uniformly regardless of specific paths, which is similar to a determining method for only one path). It should be noted that because scheduling moments of data packets on the two paths may be different, when the UE measures the third delay, and data packets measured on the first path and the second path may be several different data packets, or may be several identical data packets in a same measurement periodicity.

Compared with the two delays reported by the UE in Embodiment 1 or Embodiment 2, one delay is reported by the UE side in this embodiment. The UE obtains combined D1 based on D1 on each path, and reports the combined D1 to the network device. The combination may be taking an average value, a maximum value, a minimum value, or the like. This is not limited in this embodiment.

A manner in which the network device determines an uplink delay on a network side may be that the network side separately measures and determines a network-side processing delay on the two paths. For example, an average value of the two paths may be used as a network-side delay. For example, average value=average (D2 on a path 1, D2 on a path 2). In the embodiments, a minimum value or a maximum value of the two paths is used as a network-side processing delay is not limited. The network device obtains a combined D2 based on D2 on each path, and then obtains a final delay measurement result based on the combined D1 reported by the UE, that is, determines a final delay of the DRB (where the final delay is the uplink delay of the first DRB). It may be understood that a manner in which the network device determines the final delay of the DRB is not limited in this embodiment.

The first network device and the second network device respectively measure network-side delays on respective paths. For example, in FIG. 8, the first network device is a gNB 1, the second network device is a gNB 2, the first path is a path 1, and the second path is a path 2. The gNB 1 measures a network-side delay D2 on the path 1, the gNB 2 measures a network-side delay on the path 2, and the UE comprehensively measures an average terminal-side delay D1 on the path 1 and the path 2 (or the UE measures an average UE-side delay D1 of a data packet of a DRB 1). Then, the UE sends a measurement result D1 to the gNB 1, the gNB 2 sends the fifth delay to the gNB 1, and the gNB 1 finally determines an uplink delay of the DRB 1.

Optionally, that the first network device determines the uplink delay of the first DRB based on the third delay, the fourth delay, and the fifth delay includes: The first network device determines a sixth delay based on the fourth delay and the fifth delay; and determines the uplink delay of the first DRB based on the third delay and the sixth delay. Optionally, the fifth delay sent by the second network device does not include a PDCP delay. When determining D2 on the second path, the first network device may obtain D2 on the second path by summing the fifth delay sent by the second network device and the PDCP delay of the first network device, and then determine the sixth delay based on D2 on the first path and D2 on the second path. FIG. 8 is used as an example, where final uplink delay of the DRB 1=uplink delay D1 reported by the UE (for example, an average value of D1 on the path 1 and D1 on the path 2)+uplink delay D2 determined by the gNB 1 (for example, an average value of D2 on the path 1 and D2 on the path 2). Optionally, because moments for obtaining the fourth delay and the fifth delay may be different, the first network device may determine a sixth uplink delay based on a latest fourth delay and a latest fifth delay.

For related descriptions of a HARQ transmission delay of the first network device, a delay of an RLC entity of the first network device, a delay of a PDCP entity of the first network device, a delay of a first interface, a HARQ transmission delay of the second network device, a delay of an RLC entity of the second network device, and a delay of a second interface, refer to related descriptions in Embodiment 1 shown in FIG. 12. Details are not described herein again. For related descriptions of the fourth delay and the fifth delay, refer to related descriptions in Embodiment 1 shown in FIG. 12. Details are not described herein again.

Optionally, the UE may include the first information in an RRC message (for example, a measurement reporting message). Optionally, when reporting information about a first delay or information about a second delay, the UE may include a DRB identifier in the information about the first delay or the information about the second delay, to indicate a specific DRB whose delay information is to be reported.

Optionally, before the first network device receives the first information from the terminal device, the method further includes: the first network device sends first indication information to the terminal device, and the terminal device receives the first indication information from the first network device. The first indication information is used to indicate the terminal device to measure the first information. Optionally, a specific network device in which the first DRB is located sends the first indication information to the terminal device. For example, for an MN terminated split bearer, a master node sends the first indication information to the terminal device. For an SN terminated split bearer, a secondary node sends the first indication information to the terminal device. Optionally, the first indication information may further include a DRB identifier, to indicate a specific DRB on which the UE is to perform UE-side delay measurement. Different measurement periodicities may be further configured for different DRBs. Optionally, the first indication information may further indicate to perform uplink delay measurement, or perform downlink delay measurement, or perform uplink and downlink delay measurement. In this process, delay measurement configuration may be performed based on a DRB granularity. In this process, load of the UE can be reduced, and processing overheads of the UE can be reduced. It should be noted that the first network device sends the first indication information to the terminal device, and the terminal device receives the first indication information from the first network device. The several steps in which the terminal device measures the first information based on the first indication information may be separately used as an embodiment without depending on the foregoing UE reporting method and the network-side determining method.

Optionally, before the second network device sends the fifth delay to the first network device, the method further includes: the first network device sends second indication information to the second network device, and the second network device receives the second indication information from the first network device, where the second indication information indicates the second network device to measure the fifth delay. For example, in the DC scenario, for example, for the MN terminated split bearer, the master node needs to notify, through an Xn/X2 interface, the secondary node to measure the network-side delay on the second path of the DRB. Optionally, the second indication information may further indicate to perform uplink delay measurement, or perform downlink delay measurement, or perform uplink and downlink delay measurement. Optionally, the second indication information may further include a DRB identifier, to indicate a specific DRB on which the secondary node is to perform network-side delay measurement.

In a DRB offloading scenario, the UE may automatically stop delay measurement on the DRB when receiving a DRB offloading command delivered by the network device. Alternatively, a DRB offloading command delivered by the network device also carries indication information indicating that a source base station (a base station before migration) deletes a delay measurement configuration task of the DRB. The UE may stop delay measurement on the DRB based on the indication information when receiving the DRB offloading command. This is because a measurement task cannot be inherited, and a measurement identifier (measID) is independent on both sides of the master node and the secondary node. Alternatively, when the master node does not notify the UE to delete a delay measurement task of the DRB, the UE reports a result that measurement on the DRB is not performed or the UE does not report a measurement result. When the UE receives the delay measurement task of the DRB from the secondary node, the UE restarts delay measurement on the DRB. Similarly, when the master node migrates the DRB from the master node to the secondary node, the master node may further notify the secondary node to stop delay measurement on the DRB. After the DRB is migrated, a target base station (a base station after migration) may re-trigger the measurement task of the DRB. In this process, load of the UE can be reduced, and processing overheads of the UE can be reduced.

In this embodiment, two network devices are used as an example for description. In actual application, more network devices may alternatively may establish, for the terminal device, paths for transmitting a data packet of the first DRB. For an implementation process of a plurality of paths, refer to an implementation process of the foregoing two paths. Details are not described herein again.

According to the method embodiment 3 shown in FIG. 14, in a scenario in which a data packet of one DRB is transmitted on a plurality of paths, for example, in the DC scenario, the UE may perform UE-side delay measurement on the plurality of paths, and the network device may perform network-side delay measurement on the plurality of paths, and finally determine the uplink delay of the DRB, thereby implementing DRB delay measurement. The network side measures and obtain the delay of the DRB, so that the network side can adjust resource allocation based on the delay, to meet a delay requirement of a service.

Embodiment 4

Figure 15:
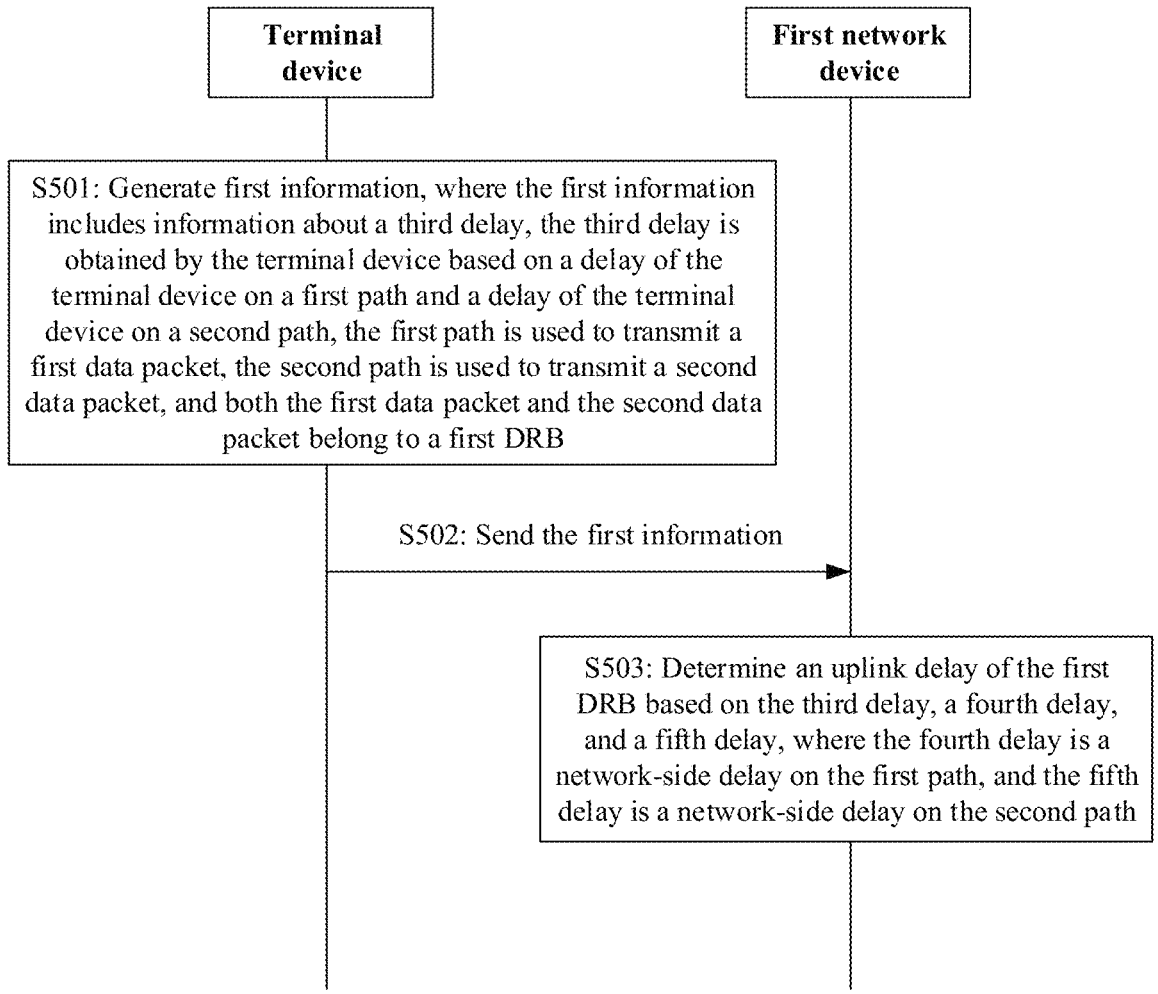
FIG. 15 is a schematic flowchart of a communication method according to Embodiment 4.

Embodiment 3 shown in FIG. 14 is described by using a DC scenario. This embodiment is further applicable to a CA scenario. For details, refer to FIG. 15. FIG. 15 is a schematic flowchart of a communication method according to Embodiment 4. The method includes steps S501 to S503.

S501: A terminal device generates first information, where the first information includes information about a third delay, the third delay is obtained by the terminal device based on a delay of the terminal device on a first path and a delay of the terminal device on a second path, the first path is used to transmit a first data packet, the second path is used to transmit a second data packet, and both the first data packet and the second data packet belong to a first DRB.

S502: The terminal device sends the first information to a first network device, and the first network device receives the first information from the terminal device.

S503: The first network device determines an uplink delay of the first DRB based on the third delay, a fourth delay, and a fifth delay, where the fourth delay is a network-side delay on the first path, and the fifth delay is a network-side delay on the second path.

This embodiment may be applied to the CA scenario. For example, the first network device has at least two RLC entities to perform data transmission with UE. An example in which the first network device has two RLC entities to perform data transmission with the UE is used. The network-side delay on the first path is a delay on a path corresponding to a first RLC entity of the first network device. The network-side delay on the second path is a delay on a path corresponding to a second RLC entity of the first network device.

The terminal device measures the third delay by comprehensively considering a UE-side delay of the first data packet transmitted on the first path and a UE-side delay of the second data packet transmitted on the second path. The third delay is obtained by performing comprehensive determining based on the UE-side delay of the first data packet transmitted on the first path and the UE-side delay of the second data packet transmitted on the second path. There are one or more pieces of data in each of the first data packet and the second data packet.

A manner in which the UE determines an uplink delay on a UE side may be that a delay that corresponds to each data packet on each of the first path and the second path and that is between a time point at which the data packet is received from a PDCP upper-layer SAP or an SDAP upper-layer SAP and a time point at which an uplink grant for transmitting the data packet is obtained is measured in a specific periodicity, and then an average value of delays of these data packets is used as the third delay. In a CA duplication scenario, data packets transmitted on various paths are the same. The UE may independently measure, as two data packets, a same data packet sent on the two paths, that is, measure a delay between a time point at which a data packet is received from a PDCP upper-layer SAP or an SDAP upper-layer SAP and a time point at which an uplink grant for transmitting the data packet is obtained on each path. The data packet may have two delay values. Alternatively, a minimum value (for example, a delay that corresponds to each data packet and that is between a time point at which the data packet is received from a PDCP upper-layer SAP or an SDAP upper-layer SAP and a time point at which an uplink grant for transmitting the data packet is obtained on any path), a maximum value (for example, a delay that corresponds to each data packet and that is between a time point at which the data packet is received from the PDCP upper-layer SAP or the SDAP upper-layer SAP and a time point at which a latest uplink grant for transmitting the data packet is obtained on these paths), or an average value of the data packet on the two paths is used as a final delay of the data packet on the UE side.

Compared with the two delays reported by the UE in Embodiment 1 or Embodiment 2, one delay is reported by the UE side in this embodiment. The UE obtains combined D1 based on D1 on each path, and reports the combined D1 to the network device. The combination may be taking an average value, a maximum value, a minimum value, or the like.

The first network device separately measures and determines a network-side processing delay on the two paths (for example, taking the average value, the maximum value, or the minimum value). For example, an average value of the two paths may be used as a network-side delay. For example, average value=average (D2 on a path 5, D2 on a path 6). In the embodiments, a minimum value or a maximum value of the two paths is used as a network-side processing delay is not limited. The network device obtains a combined D2 based on D2 on each path, and then obtains a final delay measurement result based on the combined D1 reported by the UE, that is, determines a final delay of the DRB (where the final delay is the uplink delay of the first DRB). It may be understood that a manner in which the network device determines the final delay of the DRB is not limited in this embodiment.

Optionally, that the first network device determines the uplink delay of the first DRB based on the third delay, the fourth delay, and the fifth delay includes: the first network device determines a sixth delay based on the fourth delay and the fifth delay; and determines the uplink delay of the first DRB based on the third delay and the sixth delay. For example, in FIG. 10, the first network device is a gNB 1, the first path is a path 5, and the second path is a path 6. The gNB 1 comprehensively measures an average network-side delay D2 on the path 5 and the path 6 (or the gNB 1 measures an average network-side delay D2 of a data packet of a DRB 1), and the UE comprehensively measures an average terminal-side delay D1 on the path 5 and the path 6 (or the UE measures an average UE-side delay D1 of the data packet of the DRB 1). Then, the UE sends a measurement result D1 to the gNB 1, and the gNB 1 finally determines an uplink delay of the DRB 1.

Optionally, the UE may include the first information in an RRC message (for example, a measurement reporting message). Optionally, when reporting information about a first delay or information about a second delay, the UE may include a DRB identifier in the information about the first delay or the information about the second delay, to indicate a specific DRB whose delay information is to be reported.

Optionally, before the first network device receives the first information from the terminal device, the method further includes: the first network device sends first indication information to the terminal device, and the terminal device receives the first indication information from the first network device. The first indication information is used to indicate the terminal device to measure the first information. Optionally, the first indication information may further include a DRB identifier, to indicate a specific DRB on which the UE is to perform UE-side delay measurement. Different measurement periodicities may be further configured for different DRBs. Optionally, the first indication information may further indicate to perform uplink delay measurement, or perform downlink delay measurement, or perform uplink and downlink delay measurement. In this process, delay measurement configuration may be performed based on a DRB granularity. In this process, load of the UE can be reduced, and processing overheads of the UE can be reduced.

According to the method embodiment 4 shown in FIG. 15, in a scenario in which a data packet of one DRB is transmitted on a plurality of paths, for example, in the CA scenario, the UE may perform UE-side delay measurement on the plurality of paths, and the network device may perform network-side delay measurement on the plurality of paths, and finally determine the uplink delay of the DRB, thereby implementing DRB delay measurement. The network side measures and obtain the delay of the DRB, so that the network side can adjust resource allocation based on the delay, to meet a delay requirement of a service.

Embodiment 5

Figure 16:
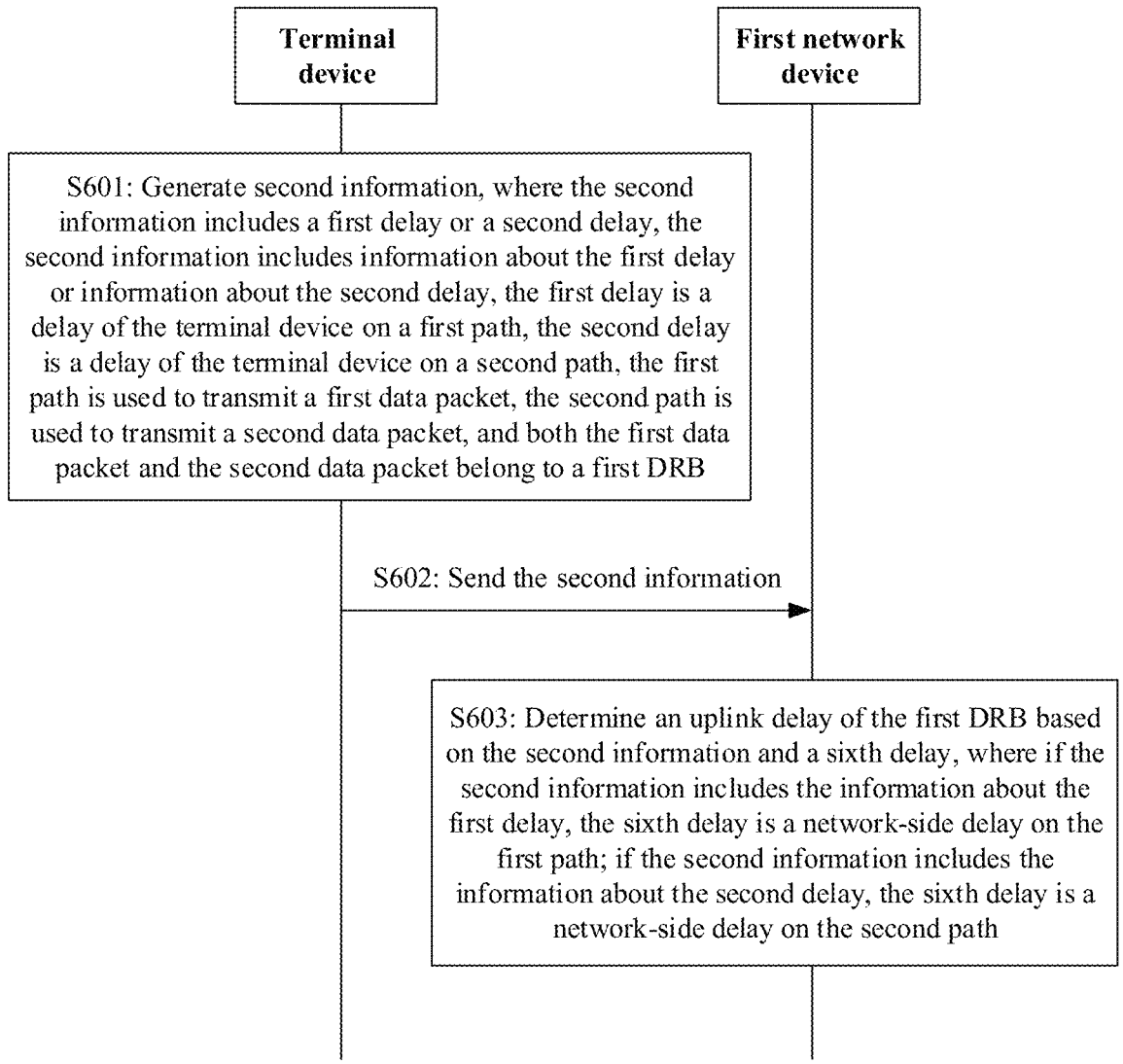
FIG. 16 is a schematic flowchart of a communication method according to Embodiment 5.

An example in which delays on a plurality of paths are measured is used to describe Embodiment 1 to Embodiment 4 (where the plurality of delays on the plurality of paths may be separately reported, or a combined delay may be reported). In actual application, a delay on only one path may be measured (for example, a delay of only a data packet sent through a master node is measured, or a delay of only a data packet sent through a secondary node is measured). FIG. 16 is a schematic flowchart of a communication method according to Embodiment 5. The method includes but is not limited to the following steps S601 to S603.

S601: A terminal device generates second information, where the second information includes a first delay or a second delay, the second information includes information about the first delay or information about the second delay, the first delay is a delay of the terminal device on a first path, the second delay is a delay of the terminal device on a second path, the first path is used to transmit a first data packet, the second path is used to transmit a second data packet, and both the first data packet and the second data packet belong to a first DRB.

S602: The terminal device sends the second information to a first network device, and the first network device receives the second information from the terminal device.

S603: The first network device determines an uplink delay of the first DRB based on the second information and a sixth delay, where if the second information includes the information about the first delay, the sixth delay is a network-side delay on the first path; if the second information includes the information about the second delay, the sixth delay is a network-side delay on the second path.

Optionally, a specific path on which a delay is to be measured may be defined in a protocol. For example, in a DC scenario, the first network device is a master node, and it is defined in the protocol that a delay on a path between the master node and the terminal device is to be measured. In this case, UE is responsible for measuring a UE-side delay on the path, and the master node is responsible for measuring a network-side delay on the path. Alternatively, it is defined in the protocol that a delay on a path between a secondary node and the terminal device is to be measured. In this case, UE is responsible for measuring a UE-side delay on the path, and the secondary node is responsible for measuring a network-side delay on the path, and sends the network-side delay to the master node for final determining. Alternatively, it is defined in the protocol that a specific path on which a delay is to be measured is selected based on a DRB type. If an MN terminated bearer is used, the UE is responsible for measuring a UE-side delay on a path between the master node and the terminal device, and the master node is responsible for measuring a network-side delay on the path. If an SN terminated bearer is used, the UE is responsible for measuring a UE-side delay on a path between a secondary node and the terminal device, and the secondary node is responsible for measuring a network-side delay on the path. Alternatively, in a CA scenario, it is defined in the protocol that a delay on a path between a primary RLC entity of the first network device and the terminal device is to be measured. In this case, the UE is responsible for measuring a UE-side delay on the path, and the first network device is responsible for measuring a network-side delay on the path.

Optionally, the network device may alternatively indicate a specific path on which a delay is to be measured. For example, the network device may further send indication information to the terminal device, to indicate a specific path on which a delay is to be measured. The indication information may carry an ID of the path (for example, an LCH ID, a base station ID, a cell group ID, or an RLC identifier (for example, a primary RLC identifier or a secondary RLC identifier)). For example, in the DC scenario, the first network device is the master node, and the master node may send indication information to the UE, where the indication information carries an identifier of the master node, and indicates to measure the delay on the path between the master node and the terminal device. In this case, the UE is responsible for measuring the UE-side delay on the path, and the master node is responsible for measuring the network-side delay on the path. Optionally, the indication information may further carry a DRB identifier, to indicate a specific DRB on which delay measurement is to be performed.

This embodiment may be applied to the DC scenario. The network-side delay on the first path is a delay of the first network device on the first path, and the network-side delay on the second path is a delay of the second network device on the second path. If the delay on the first path is measured, the first network device determines a total delay on the first path based on D1 that is on the first path and that is reported by the UE and D2 that is on the first path and that is measured by the first network device. If the delay on the second path is measured, the second network device determines a total delay on the second path based on D1 that is on the second path and that is reported by the UE and D2 that is on the second path and that is sent by the second network device.

In the DC scenario, if the delay on the first path is measured, the UE-side delay, that is, the first delay, includes a delay between a time point at which a PDCP entity of the terminal device receives the first data packet from an upper layer and a time point at which the terminal device obtains an uplink grant for sending the first data packet to the first network device. The network-side delay, that is, the sixth delay, includes at least one of a HARQ transmission delay of the first network device, a delay of an RLC entity of the first network device, a delay of a PDCP entity of the first network device, and a delay of a first interface. The first interface is a communication interface, for example, an F1 interface, between a CU of the first network device and a DU of the first network device. If the delay on the second path is measured, the UE-side delay, that is, the second delay, includes a delay between a time point at which a PDCP entity of the terminal device receives the second data packet from an upper layer and a time point at which the terminal device obtains an uplink grant for sending the second data packet to the second network device. The network-side delay, that is, the sixth delay, includes at least one of a HARQ transmission delay of the second network device, a delay of an RLC entity of the second network device, and a delay of a second interface. The second interface is a communication interface, for example, an Xn interface, between the first network device and the second network device.

This embodiment may be further applied to the CA scenario. The network-side delay on the first path is a network-side delay on a path corresponding to a first RLC entity of the first network device, and the network-side delay on the second path is a network-side delay on a path corresponding to a second RLC entity of the first network device. If the delay on the first path is measured, the first network device determines a total delay on the first path based on D1 that is on the first path and that is reported by the UE and D2 that is on the first path and that is measured by the first network device. If the delay on the second path is measured, the first network device determines a total delay on the second path based on D1 that is on the second path and that is reported by the UE and D2 that is on the second path and that is measured by the first network device.

In the CA scenario, if the delay on the first path is measured, the UE-side delay, that is, the first delay, includes a delay between a time point at which a PDCP entity of the terminal device receives the first data packet from an upper layer and a time point at which the terminal device obtains an uplink grant for sending the first data packet to the first RLC entity of the first network device. The network-side delay, that is, the sixth delay, includes at least one of a HARQ transmission delay of the first network device, a delay of the first RLC entity of the first network device, a delay of a PDCP entity of the first network device, and a delay of a first interface. The first interface is a communication interface between a CU of the first network device and a DU of the first network device. If the delay on the second path is measured, the UE-side delay, that is, the first delay, includes a delay between a time point at which a PDCP entity of the terminal device receives the second data packet from an upper layer and a time point at which the terminal device obtains an uplink grant for sending the second data packet to the second RLC entity of the first network device. The network-side delay, that is, the sixth delay, includes at least one of a HARQ transmission delay of the first network device, a delay of the second RLC entity of the first network device, a delay of a PDCP entity of the first network device, and a delay of a first interface. The first interface is a communication interface between a CU of the first network device and a DU of the first network device.

Optionally, the first information reported by the UE may further include an identifier corresponding to the first delay or an identifier corresponding to the second delay, and the identifiers are used to distinguish between different delays. For example, the identifier may be a path identifier, an LCH identifier, a base station identifier, or a cell group identifier.

In a DRB offloading scenario, the UE may automatically stop delay measurement on the DRB when receiving a DRB offloading command delivered by the network device. Alternatively, a DRB offloading command delivered by the network device also carries indication information indicating that a source base station (a base station before migration) deletes a delay measurement configuration task of the DRB. The UE may stop delay measurement on the DRB based on the indication information when receiving the DRB offloading command. Alternatively, when the master node does not notify the UE to delete a delay measurement task of the DRB, the UE reports a result that measurement on the DRB is not performed or the UE does not report a measurement result. When the UE receives the delay measurement task of the DRB from the secondary node, the UE restarts delay measurement on the DRB. Similarly, when the master node migrates the DRB from the master node to the secondary node, the master node may further notify the secondary node to stop delay measurement on the DRB. After the DRB is migrated, a target base station (a base station after migration) may re-trigger the measurement task of the DRB. In this process, load of the UE can be reduced, and processing overheads of the UE can be reduced.

According to the method embodiment 5 shown FIG. 16, in a scenario in which a data packet of one DRB is transmitted on a plurality of paths, for example, in the DC scenario or the CA scenario, the UE may perform UE-side delay measurement on a path, and the network device may perform network-side delay measurement on the path, and finally determine the uplink delay of the DRB, thereby implementing DRB delay measurement. The network side measures and obtain the delay of the DRB, so that the network side can adjust resource allocation based on the delay, to meet a delay requirement of a service.

Embodiment 6

Figure 17:
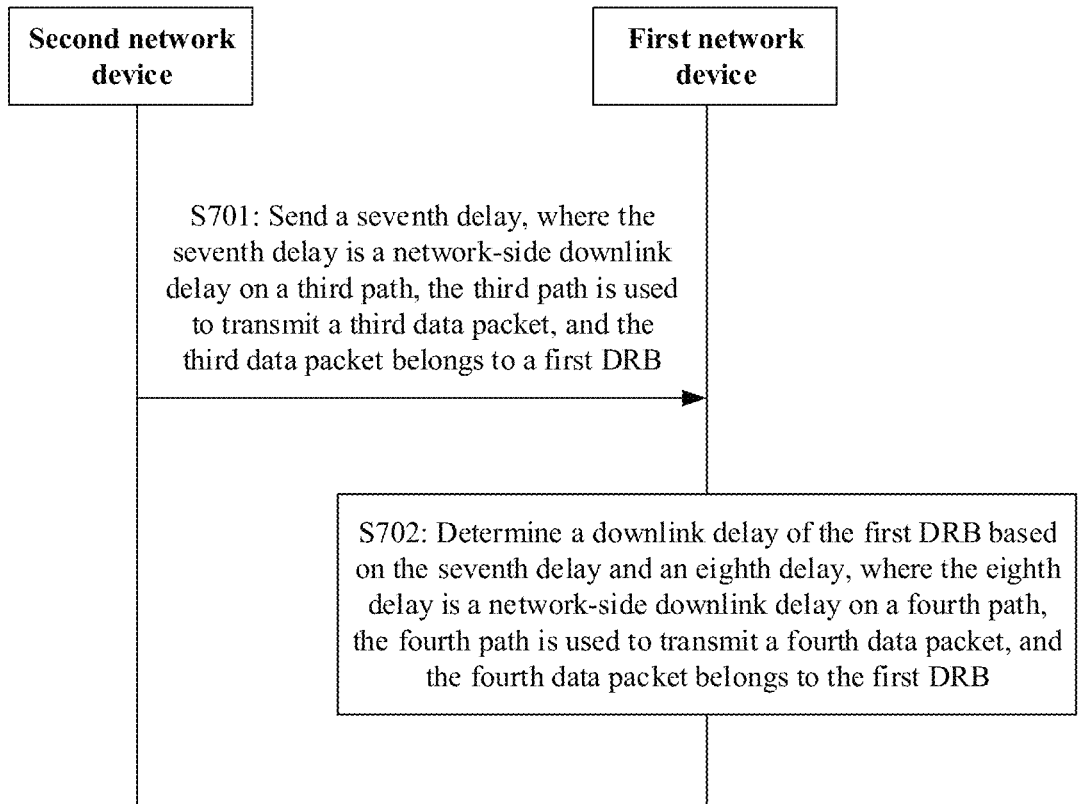
FIG. 17 is a schematic flowchart of a communication method according to Embodiment 6.

The foregoing FIG. 12 to FIG. 16 are described by using an uplink delay as an example. A downlink delay may be measured by a network side independently. FIG. 17 is a schematic flowchart of a communication method according to Embodiment 6. The method includes the following steps.

S701: A second network device sends a seventh delay to a first network device, and the first network device receives the seventh delay sent by the second network device, where the seventh delay is a network-side downlink delay on a third path, the third path is used to transmit a third data packet, and the third data packet belongs to a first DRB.

S702: The first network device determines a downlink delay of the first DRB based on the seventh delay and an eighth delay, where the eighth delay is a network-side downlink delay on a fourth path, the fourth path is used to transmit a fourth data packet, and the fourth data packet belongs to the first DRB.

Optionally, the seventh delay includes a delay between a time point at which the second network device receives an RLC SDU from a PDCP of the first network device and a time point at which the last part of the RLC SDU is correctly received by UE (where it is determined, based on received HARQ feedback information, that the RLC SDU is correctly received by the UE). Optionally, the seventh delay may further include at least one of an X2 interface delay or an Xn interface delay. The eighth delay is a delay between a time point at which the PDCP of the first network device receives a data packet from an upper layer and a time point at which a MAC layer receives, from a PHY, that the data packet is correctly received by the UE. The eighth delay may include a PDCP layer delay (for example, a CU-UP delay), an F1-U delay, a HARQ transmission or retransmission delay, and an RLC-side delay (for example, a processing delay). As shown in FIG. 9(a) and FIG. 9(b), in a DC scenario, a gNB 1 measures a downlink processing delay on a path 3 (for example, a period of time from a time point at which each data packet is received from the upper layer of the PDCP to a time point at which the MAC layer receives, from the PHY, that the data packet is correctly received by the UE), a gNB 2 measures a downlink processing delay on a path 4, and the gNB 2 may also measure an Xn/X2 delay between the gNB 2 and the gNB 1. The gNB 2 may notify the gNB 1 of a final value (for example, an average processing delay of data packets in a secondary node in a period of time may be measured, and the processing delay is between a time point at which the gNB 1 receives an RLC SDU and a time point at which the last part of the RLC SDU is correctly received by the UE) of a downlink delay result on a gNB 2 side, and the gNB 1 performs final determining.

Optionally, the first network device determines the downlink delay of the first DRB based on the seventh delay and the eighth delay. For example, an average value (or a weighted average value, or a maximum value, or a minimum value) of the seventh delay and the eighth delay may be determined as the downlink delay of the first DRB. In this case, the UE does not need to report the downlink delay.

Optionally, the UE may alternatively measure the downlink delay. For example, an internal downlink processing delay of the UE is a delay between a time point at which the last part of an SDAP SDU or a PDCP SDU is correctly received by a terminal device and a time point at which an SDAP layer or a PDCP layer of the terminal device submits the SDU to an upper layer. Similar to an uplink, the UE may separately measure and report a UE-side downlink delay on each path.

The DC scenario is used as an example for description in FIG. 17. In a CA scenario, one network device separately measures a downlink delay on each path and finally determines the downlink delay of the first DRB. For example, in the CA scenario, the seventh delay may include one or more of a CU-UP delay of the first network device, an F1-U delay, and a DU-side delay. The eighth delay may include one or more of the CU-UP delay of the first network device, the F1-U delay, and the DU-side delay. Refer to FIG. 11. A gNB 1 measures a downlink network-side delay on a path 7. Similarly, the gNB 1 measures a downlink network-side delay on another path by using a same method, and finally determines the downlink delay of the first DRB. For a manner of determining the downlink delay of the first DRB, refer to related descriptions in Embodiment 6 shown in FIG. 17. Details are not described herein again.

In addition, the network side may further measure a downlink delay corresponding to a data packet of the first DRB on only one path. For example, a downlink delay corresponding to only a data packet that is sent from a master node to the UE and that is of the first DRB is measured. Alternatively, a downlink delay corresponding to only a data packet that is sent from the secondary node to the UE and that is of the first DRB is measured. Further, the path may alternatively be the same as a path for uplink delay measurement, that is, an uplink delay is measured on a path, and a downlink delay is also measured on the corresponding path.

It should be noted that a DRB is described in all the foregoing embodiments. Optionally, same processing in all the foregoing embodiments may also be performed on a signal radio bearer (SRB).

It should be noted that, in a scenario in which the terminal device separately measures UE-side delays on a plurality of paths, an example in which the terminal device sends the UE-side delays on the plurality of paths to the first network device is used for description in the foregoing embodiments. In another optional implementation, the terminal device may alternatively send D1 on the first path to the first network device, for example, the master node, and send D1 on the second path to the second network device, for example, the secondary node. After determining, based on D1 on the second path sent by the terminal device and the network-side delay that is on the second path and that is measured by the secondary node, and obtaining the uplink delay on the second path, the secondary node directly sends the total uplink delay on the second path to the master node (instead of sending a partial delay on the second path to the master node). Then, the master node determines the uplink delay of the first DRB based on the total uplink delay on the first path and the total uplink delay on the second path.

It should be noted that the first network device mentioned in the foregoing embodiments sends the first indication information to the terminal device, and the terminal device receives the first indication information from the first network device. The several steps in which the terminal device measures, based on the first indication information, the UE-side delay related to the first DRB may be separately used as an embodiment without depending on a specific UE reporting process and a network-side determining process in the foregoing method embodiments. Optionally, a specific network device in which the first DRB is located or terminated sends the first indication information to the terminal device. For example, for an MN terminated split bearer, the master node sends the first indication information to the terminal device. For an SN terminated split bearer, the secondary node sends the first indication information to the terminal device. Optionally, the first indication information may further include a DRB identifier, to indicate a specific DRB on which the UE is to perform UE-side delay measurement. Different measurement periodicities may be further configured for different DRBs. Optionally, the first indication information may further indicate to perform uplink delay measurement, or perform downlink delay measurement, or perform uplink and downlink delay measurement. In this process, delay measurement configuration may be performed based on a DRB granularity. In this process, load of the UE can be reduced, and processing overheads of the UE can be reduced. Optionally, the first network device may send the first indication information through a measurement configuration message.

An implementation process in a DRB offloading scenario may also be implemented as an independent embodiment without depending on the specific UE reporting process and the network-side determining process in the foregoing method embodiments. That is, the UE may automatically stop delay measurement on the DRB when receiving a DRB offloading command delivered by the network device. Alternatively, a DRB offloading command delivered by the master node also carries indication information indicating that a source base station (a base station before migration) deletes a delay measurement configuration task of the DRB. The UE may stop delay measurement on the DRB based on the indication information when receiving the DRB offloading command. This is because a measurement task cannot be inherited, and a measurement identifier (measID) is independent on both sides of the master node and the secondary node. Alternatively, when the master node does not notify the UE to delete a delay measurement task of the DRB, the UE reports a result that measurement on the DRB is not performed or the UE does not report a measurement result. When the UE receives the delay measurement task of the DRB from the secondary node, the UE restarts delay measurement on the DRB.

The foregoing method embodiments are described by using an example in which the UE reports delay information. In addition, the UE may further report information about a percentage. The percentage is a percentage of a delay of a data packet exceeding a threshold, and the threshold may be set by the network side. For example, the UE measures UE-side delays of 10 data packets in a periodicity, determines whether a delay of each data packet exceeds a threshold, and then uses a percentage of a quantity (for example, 8) of data packets exceeding the threshold in a quantity (10) of the 10 data packets as reported information about the percentage, and the network side determines a UE-side delay (or delay range) based on the percentage.

The solutions provided in the embodiments are described above from a perspective of interaction between the network devices. It may be understood that, to implement the foregoing functions, the network elements, for example, the terminal device and the network devices, include corresponding hardware structures and/or software modules for performing the functions. A person of ordinary skill in the art should be aware that, in combination with the examples described in the embodiments, network elements and algorithm steps may be implemented by using hardware or a combination of hardware and computer software in the embodiments. Whether a function is performed by hardware or hardware driven by computer software depends on particular applications and design constraint conditions of the solutions. A person of ordinary skill in the art may use different methods to implement the described functions for each particular application, but it should not be considered that the implementation goes beyond the scope of the embodiments.

It may be understood that, in the foregoing methods, a method implemented by the terminal device may alternatively be implemented by a component (for example, a chip or a circuit) that can be configured in the terminal device, and a method implemented by the network device (the first network device or the second network device) may alternatively be implemented by a component (for example, a chip or a circuit) that can be configured in the network device.

In the embodiments, functional modules of the terminal device, the network device, and the like may be obtained through division based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that in the embodiments, division into the modules is an example and is merely logical function division and may be other division during actual implementation.

Figure 18:
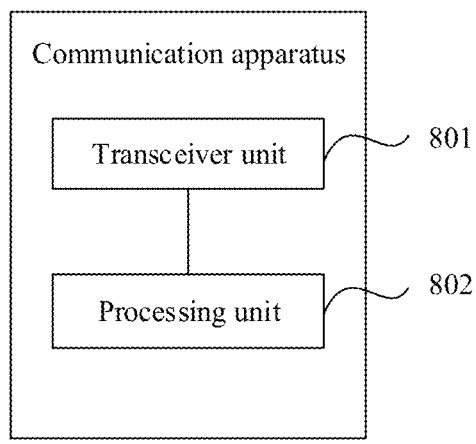
FIG. 18 is a schematic diagram of a hardware structure of a communication apparatus according to an embodiment.

When each functional module is obtained through division based on each corresponding function, FIG. 18 is a possible schematic diagram of a logical structure of the communication apparatus in the foregoing embodiments. The communication apparatus 800 includes a transceiver unit 801 and a processing unit 802. The communication apparatus may be a first network device or a component that can be configured in the first network device. For example, the transceiver unit 801 is configured to support the communication apparatus 800 in performing the corresponding step of receiving or sending information by the first network device in the method embodiments shown in FIG. 12 to FIG. 17. The processing unit 802 is configured to support the communication apparatus in performing the corresponding related processing step of the first network device in the method embodiments shown in FIG. 12 to FIG. 17, for example, implementing a function other than a function of the transceiver unit. Optionally, the communication apparatus 800 may further include a storage unit, configured to store code (a program) or data. In a possible manner, the processing unit 802 may invoke the code or the data in the storage unit, so that the communication apparatus 800 determines an uplink delay of a first DRB based on first information, a fourth delay, and a fifth delay, where the first information includes information about a first delay and information about a second delay, or the first information includes information about a third delay, the first delay is a delay of a terminal device on a first path, the second delay is a delay of the terminal device on a second path, the third delay is obtained by the terminal device based on the delay of the terminal device on the first path and the delay of the terminal device on the second path, the first path is used to transmit a first data packet, the second path is used to transmit a second data packet, both the first data packet and the second data packet belong to the first DRB, the fourth delay is a network-side delay on the first path, and the fifth delay is a network-side delay on the second path.

In hardware implementation, the processing unit 802 may be a processor, a processing circuit, or the like. The transceiver unit 801 may be a transceiver, a transceiver circuit, an interface circuit, or the like. The storage unit may be a memory. The processing unit, the transceiver unit, and the storage unit may be integrated together, or may be separated.

Figure 19:
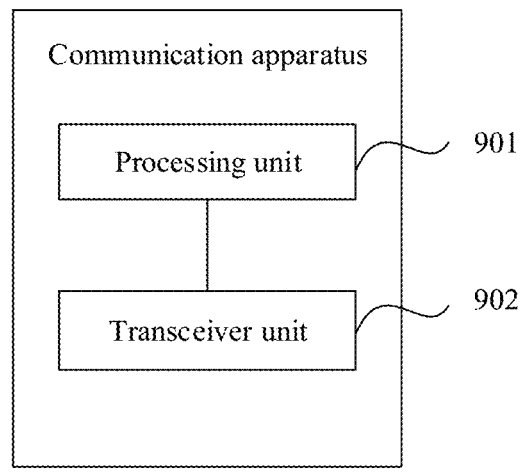
FIG. 19 is a schematic diagram of a hardware structure of another communication apparatus according to an embodiment.

FIG. 19 is a possible schematic diagram of a logical structure of the communication apparatus in the foregoing embodiments. The communication apparatus 900 includes a processing unit 901 and a transceiver unit 902. The communication apparatus may be a second network device or a component that can be configured in the second network device. For example, the transceiver unit 902 is configured to support the communication apparatus 900 in performing the corresponding step of receiving or sending information by the second network device in the method embodiments shown in FIG. 12 to FIG. 17. The processing unit 901 is configured to support the second network device in performing the related processing step of the second network device in the method embodiments shown in FIG. 12 to FIG. 17, for example, implementing a function other than a function of the transceiver unit. Optionally, the communication apparatus 900 may further include a storage unit, configured to store code (a program) or data. In a possible manner, the processing unit 802 may invoke the code or the data in the storage unit, so that the communication apparatus 900 obtains a fifth delay, where the fifth delay is a network-side delay on a second path, the second path is used to transmit a second data packet, the second data packet belongs to a first DRB, and there are two or more paths used to transmit a data packet of the first DRB.

In hardware implementation, the processing unit 901 may be a processor, a processing circuit, or the like. The transceiver unit 902 may be a transceiver, a transceiver circuit, an interface circuit, or the like. The storage unit may be a memory. The processing unit, the transceiver unit, and the storage unit may be integrated together, or may be separated.

Figure 20:
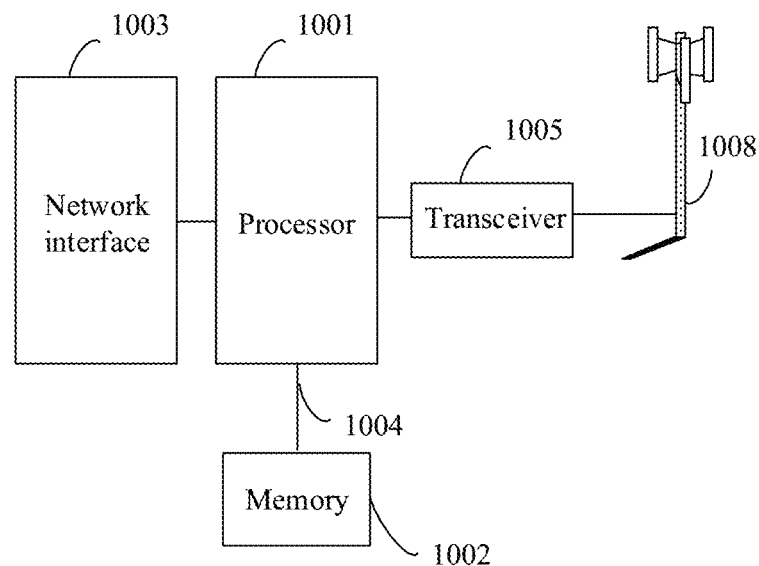
FIG. 20 is a schematic diagram of a logical structure of a network device according to an embodiment.

FIG. 20 is a possible schematic diagram of a hardware structure of the network device in the foregoing embodiments according to an embodiment. The network device may be the first network device or the second network device. As shown in FIG. 20, the network device 1000 may include one or more processors 1001, a memory 1002, a network interface 1003, a transceiver 1005, and an antenna 1008. These components may be connected through a bus 1004 or in another manner. In FIG. 20, an example in which the components are connected through a bus is used.

The network interface 1003 may be used by the network device 1000 for communicating with another communication device, for example, another network device. For example, the network interface 1003 may be a wired interface.

The transceiver 1005 may be configured to perform transmission processing, for example, signal modulation, on a signal that is output by the processor 1001. The transceiver 1005 may be further configured to receive a mobile communication signal received by the antenna 1008, for example, perform signal demodulation. In some embodiments, the transceiver 1005 may be considered as a wireless modem. In the network device 1000, there may be one or more transceivers 1005. The antenna 1008 may be configured to convert electromagnetic energy in a transmission line into an electromagnetic wave in free space, or convert an electromagnetic wave in free space into electromagnetic energy in a transmission line.

The memory 1002 may be coupled to the processor 1001 through the bus 1004 or an input/output port, or the memory 1002 may be integrated with the processor 1001. The memory 1002 is configured to store various software programs and/or a plurality of groups of instructions or data. For example, the memory 1002 may include a high-speed random access memory, and may further include a nonvolatile memory, for example, one or more magnetic disk storage devices, a flash memory device, or another nonvolatile solid-state storage device. The memory 1002 may store an operating system (which is briefly referred to as a system below), for example, an embedded operating system such as uCOS, VxWorks, or RTLinux. The memory 1002 may further store a network communication program. The network communication program may be configured to communicate with one or more additional devices, one or more pieces of user equipment, or one or more network devices.

The processor 1001 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in the embodiments. Alternatively, the processor may be a combination of processors implementing a determining function, for example, a combination of one or more microprocessors or a combination of a digital signal processor and a microprocessor.

In this embodiment, the processor 1001 may be configured to: read and execute computer-readable instructions. For example, the processor 1001 may be configured to: invoke a program stored in the memory 1002, for example, a program for implementing, on a network device 1000 side, the communication method provided in one or more embodiments, and execute instructions included in the program.

It may be understood that the network device 1000 may be the network device 101 in the wireless communication system 100 shown in FIG. 1, and may be implemented as a base transceiver station, a wireless transceiver, a basic service set (BSS), an extended service set (ESS), a NodeB, an eNodeB, a gNB, or the like.

It should be noted that the network device 1000 shown in FIG. 20 is merely an implementation of this embodiment, and in actual application, the network device 1000 may further include more or fewer components. This is not limited herein. For a specific implementation of the network device 1000, refer to the related descriptions in the foregoing method embodiments. Details are not described herein again.

Figure 21:
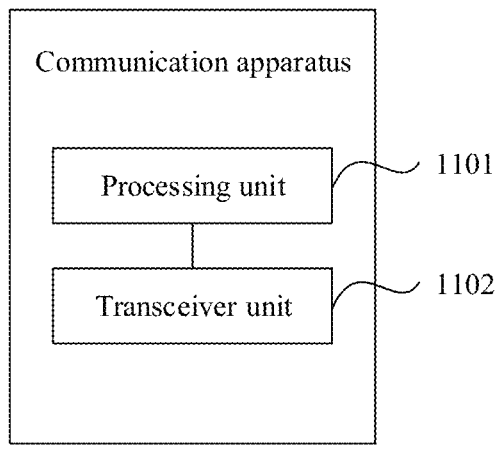
FIG. 21 is a schematic diagram of a hardware structure of a communication apparatus according to an embodiment.

When each functional module is obtained through division based on each corresponding function, FIG. 21 is a possible schematic diagram of a logical structure of the communication apparatus that correspondingly implements a corresponding operation of the terminal device in the foregoing embodiments. The communication apparatus 110 includes a processing unit 1101 and a transceiver unit 1102. The communication apparatus may be a terminal device, or may be a component that can be used in the terminal device. For example, the transceiver unit 1102 is configured to support the communication apparatus 110 in performing the corresponding step of receiving or sending information by the terminal device in the method embodiments shown in FIG. 12 to FIG. 17. The processing unit 1101 is configured to support the terminal device in performing the related processing step of the terminal device in the method embodiments shown in FIG. 12 to FIG. 17, for example, implementing a function other than a function of the transceiver unit. Optionally, the communication apparatus may further include a storage unit, configured to store code (a program) or data. In a possible manner, the processing unit 1101 may invoke the code or the data in the storage unit, so that the communication apparatus 110 obtains first information, where the first information includes information about a first delay and information about a second delay, or the first information includes information about a third delay, the first delay is a delay of the terminal device on a first path, the second delay is a delay of the terminal device on a second path, the third delay is obtained by the terminal device based on the delay of the terminal device on the first path and the delay of the terminal device on the second path, the first path is used to transmit a first data packet, the second path is used to transmit a second data packet, and both the first data packet and the second data packet belong to a first DRB.

In hardware implementation, the processing unit 1101 may be a processor, a processing circuit, or the like. The transceiver unit 1102 may be a transceiver, a transceiver circuit, an interface circuit, or the like. The storage unit may be a memory. The processing unit, the transceiver unit, and the storage unit may be integrated together, or may be separated.

Figure 22:
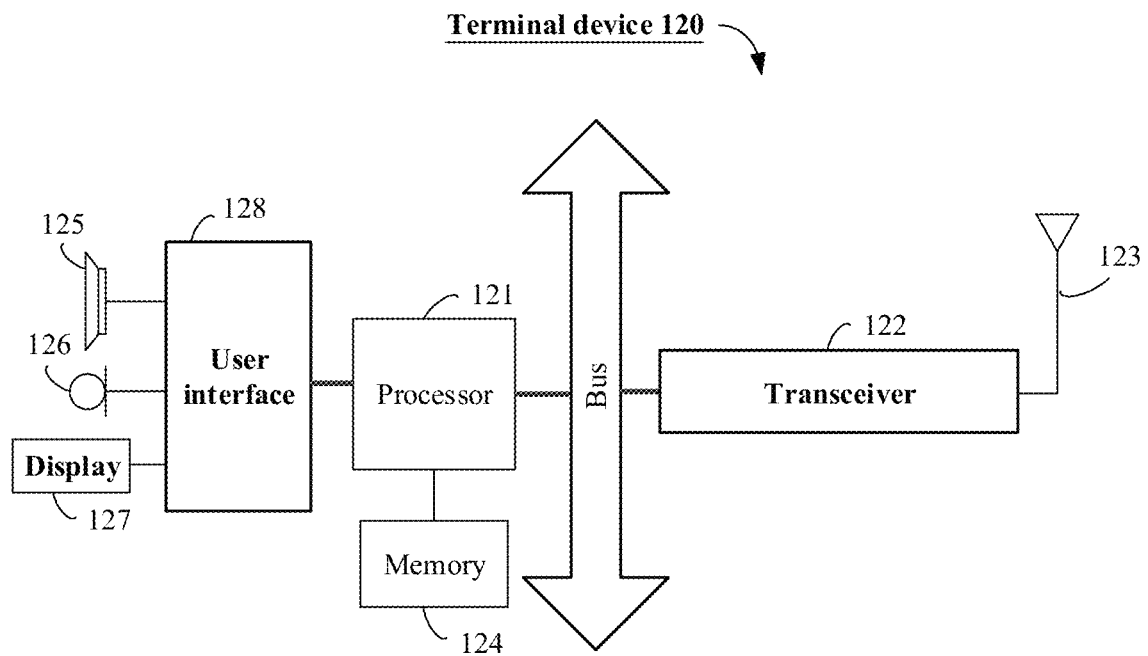
FIG. 22 is a schematic diagram of a logical structure of a terminal device according to an embodiment.

FIG. 22 is a possible schematic diagram of a hardware structure of the terminal device in the foregoing embodiments according to an embodiment. As shown in FIG. 22, the terminal device 120 may include input/output modules (for example, audio input/output module 125, a key input module 126, and a display 127), a user interface 128, one or more processors 121, a transceiver 122, an antenna 123, and a memory 124. These components may be connected through a bus or in another manner. In FIG. 22, an example in which the components are connected through a bus is used.

The antenna 123 may be configured to convert electromagnetic energy into an electromagnetic wave in free space, or convert an electromagnetic wave in free space into electromagnetic energy in a transmission line. The transceiver 122 may be configured to transmit on a signal that is output by the processor 121, and may also be configured to receive a mobile communication signal received by the antenna 123. In this embodiment, the transceiver 122 may be considered as a wireless modem. In the terminal device 120, there may be one or more transceivers 122.

In addition to the transceiver 122 shown in FIG. 22, the terminal device 120 may further include another communication component, for example, a GPS module, a Bluetooth module, or a wireless fidelity (Wi-Fi) module. In addition to the foregoing wireless communication signal, the terminal device 1200 may further support another wireless communication signal, for example, a satellite signal or a short-wave signal. In addition to supporting wireless communication, the terminal device 120 may further configured with a wired network interface (for example, a LAN interface) to support wired communication.

The input/output modules may be configured to implement interaction between the terminal device 120 and a user/an external environment, and may mainly include the audio input/output module 125, the key input module 126, the display 127, and the like. For example, the input/output modules may further include a camera, a touchscreen, a sensor, and the like. The input/output modules all communicate with the processor 121 through the user interface 128.

The memory 124 may be coupled to the processor 121 through the bus or an input/output port, or the memory 124 may be integrated with the processor 121. The memory 124 is configured to store various software programs and/or a plurality of groups of instructions. For example, the memory 124 may include a high-speed random access memory, and may further include a nonvolatile memory, for example, one or more magnetic disk storage devices, a flash memory device, or another nonvolatile solid-state storage device. The memory 124 may store an operating system (which is briefly referred to as a system below), for example, an embedded operating system such as Android, iOS, Windows, or Linux. The memory 12212 may further store a network communication program. The network communication program may be configured to communicate with one or more additional devices, one or more pieces of user equipment, or one or more network devices. The memory 124 may further store a user interface program. The user interface program may use a graphical operation interface to intuitively display content of an application program, and use input controls such as a menu, a dialog box, and a key to receive a control operation performed by a user on the application program.

In this embodiment, the memory 124 may be configured to store a program for implementing, on a terminal device 120 side, the communication method provided in one or more embodiments. For implementation of the communication method provided in the one or more embodiments, refer to the foregoing embodiments.

The processor 121 may be configured to: read and execute computer-readable instructions. For example, the processor 121 may be configured to: invoke a program stored in the memory 124, for example, the program for implementing, on the terminal device 120 side, the communication method provided in the one or more embodiments, and execute instructions included in the program to implement the methods in the foregoing embodiments. The processor 121 may support one or more of global system for mobile communications (GSM) (2G) communication, wideband code division multiple access (WCDMA) (3G) communication, long term evolution (LTE) (4G) communication, 5G communication, and the like. Optionally, the processor 121 drives or controls the transceiver 122 to send any message or data. Optionally, the processor 121 drives or controls the transceiver 122 to receive any message or data. Therefore, the processor 121 may be considered as a control center for performing sending or receiving, and the transceiver 122 is a specific executor of sending and receiving operations.

It may be understood that the terminal device 120 may be the terminal device 102 in the wireless communication system 100 shown in FIG. 1, and may be implemented as an eMTC device, a mobile device, a mobile station, a mobile unit, a wireless unit, a remote unit, a user agent, a mobile client, or the like.

It should be noted that the terminal device 120 shown in FIG. 22 is merely an implementation of this embodiment, and in actual application, the terminal device 120 may further include more or fewer components. This is not limited herein. For a specific implementation of the terminal device 120, refer to the related descriptions in the foregoing method embodiments. Details are not described herein again.

Figure 23:
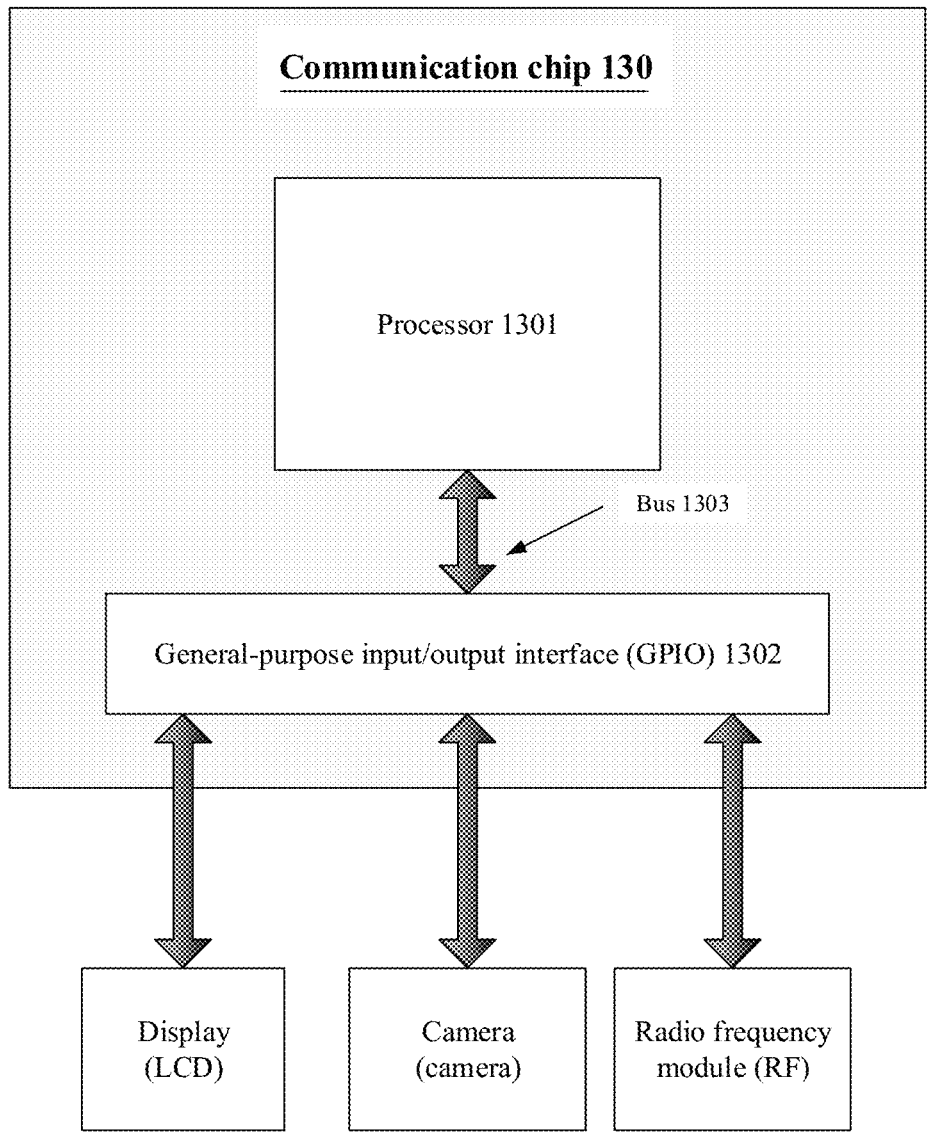
FIG. 23 is a schematic diagram of a structure of a communication chip according to an embodiment.

FIG. 23 is a schematic diagram of a structure of a communication chip according to the embodiments. As shown in FIG. 23, the communication chip 1300 may include a processor 1301 and one or more interfaces 1302 coupled to the processor 1301. An example is as follows:

The processor 1301 may be configured to: read and execute computer-readable instructions. In a specific implementation, the processor 1301 may mainly include a controller, an arithmetic unit, and a register. For example, the controller is mainly responsible for decoding instructions, and sends a control signal for an operation corresponding to the instructions. The arithmetic unit is mainly responsible for performing a fixed-point or floating-point arithmetic operation, a shift operation, a logic operation, and the like, and may also perform an address operation and address conversion. The register is mainly responsible for storing a register operand, an intermediate operation result, and the like that are temporarily stored during instruction execution. In a specific implementation, a hardware architecture of the processor 1301 may be an application-specific integrated circuit (ASIC) architecture, a microprocessor without interlocked piped stages (MIPS) architecture, an advanced reduced instruction set computing machine (ARM) architecture, an NP architecture, or the like. The processor 1301 may be a single-core or multi-core processor.

For example, the interface 1302 may be configured to input to-be-processed data to the processor 1301, and may output a processing result of the processor 1301. In a specific implementation, the interface 1302 may be a general-purpose input/output (GPIO) interface, and may be connected to a plurality of peripheral devices (for example, a display (such as an LCD), a camera, and a radio frequency (RF) module). The interface 1302 is connected to the processor 1301 through a bus 1303.

In a possible implementation, the processor 1301 may be configured to invoke, from a memory, a program or data for implementing, on a communication device side, the communication method provided in one or more embodiments, so that the chip can implement the communication methods shown in FIG. 12 to FIG. 17. The memory may be integrated with the processor 1301, or may be coupled to the communication chip 130 through the interface 1302. In other words, the memory may be a part of the communication chip 130, or may be independent of the communication chip 130. The interface 1302 may be configured to output an execution result of the processor 1301. In the embodiments, the interface 1302 may be configured to output a decoding result of the processor 1301. For the communication method provided in one or more embodiments, refer to the foregoing embodiments. Details are not described herein again.

It should be noted that functions corresponding to each of the processor 1301 and the interface 1302 may be implemented by using a hardware design, may be implemented by using a software design, or may be implemented by combining software and hardware. This is not limited herein.

In another embodiment, a computer storage medium is further provided. The computer storage medium stores computer-executable instructions. When a device (which may be a single-chip microcomputer, a chip, or the like) or a processor may invoke the computer-executable instructions stored in the readable storage medium, the device or the processor performs the steps of the terminal device or the network device in the communication methods provided in FIG. 12 to FIG. 17. The computer storage medium may include any medium that can store program code, such as a USB flash drive, a removable hard disk, a read-only memory, a random access memory, a magnetic disk, or an optical disc.

In another embodiment, a computer program product is further provided. The computer program product includes computer-executable instructions, and the computer-executable instructions are stored in a computer-readable storage medium. At least one processor of a device may read the computer-executable instructions from the computer-readable storage medium, and when the at least one processor executes the computer-executable instructions, the device implements the steps of the terminal device or the network device in the communication methods provided in FIG. 12 to FIG. 17.

In another embodiment, a communication system is further provided. The communication system includes a plurality of devices, and the plurality of devices include a terminal device and a first network device. Alternatively, the communication system includes a plurality of devices, and the plurality of devices include a terminal device, a first network device, and a second network device. For example, the first network device may be the communication apparatus shown in FIG. 18 or the network device provided in FIG. 20, and is configured to perform the steps corresponding to the first network device in the delay measurement methods provided in FIG. 12 to FIG. 17; and/or the terminal device may be the communication apparatus shown in FIG. 21 or the terminal device provided in FIG. 22, and is configured to perform the steps corresponding to the terminal device in the delay measurement methods provided in FIG. 12 to FIG. 17; and/or the second network device may be the communication apparatus shown in FIG. 19 or the network device provided in FIG. 20, and is configured to perform the steps corresponding to the second network device in the delay measurement methods provided in FIG. 12 to FIG. 17.

Finally, it should be noted that the foregoing descriptions are merely specific implementations of the embodiments. However, the scope of the embodiments is not limited thereto. Any variation or replacement within the scope disclosed in the embodiments shall fall within the scope of the embodiments.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedures or functions according to the embodiments are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid-state drive, (SSD)), or the like.

In conclusion, the foregoing descriptions are merely examples of embodiments, but are not intended to limit the protection scope. Any modification, equivalent replacement, or improvement made without departing from the spirit and principle of the embodiments shall fall in the scope of the embodiments.

What is claimed is:

1. A communication method, comprising:
receiving first information from a terminal device, wherein the first information comprises information about a first delay and information about a second delay, or the first information comprises information about a third delay, the first delay is a delay of the terminal device on a first path, the second delay is a delay of the terminal device on a second path, the third delay is obtained by the terminal device based on the delay of the terminal device on the first path and the delay of the terminal device on the second path, the first path is used to transmit a first data packet, the second path is used to transmit a second data packet, and both the first data packet and the second data packet belong to a first data radio bearer (DRB); and
determining an uplink delay of the first DRB based on the first information, a fourth delay, and a fifth delay, wherein the fourth delay is a network-side delay on the first path, and the fifth delay is a network-side delay on the second path.

2. The method according to claim 1, wherein the network-side delay on the first path is a delay of a first network device on the first path, and the network-side delay on the second path is a delay of a second network device on the second path.

3. The method according to claim 2, wherein before the determining of an uplink delay of the first DRB based on the first information, a fourth delay, and a fifth delay, the method further comprises:
receiving the fifth delay from a second communication device.

4. The method according to claim 2, wherein the first delay comprises a delay between a time point at which a packet data convergence protocol (PDCP) entity of the terminal device receives the first data packet from an upper layer and a time point at which the terminal device obtains an uplink grant for sending the first data packet to the first network device, and the second delay comprises a delay between a time point at which the PDCP entity of the terminal device receives the second data packet from the upper layer and a time point at which the terminal device obtains an uplink grant for sending the second data packet to the second network device.

5. The method according to claim 1, wherein the network-side delay on the first path is a network-side delay on a path corresponding to a first radio link control (RLC) entity of the first network device, and the network-side delay on the second path is a network-side delay on a path corresponding to a second RLC entity of the first network device.

6. The method according to claim 1, wherein the first information comprises the information about the first delay and the information about the second delay, and the determining of an uplink delay of the first DRB based on the first information, a fourth delay, and a fifth delay comprises:
determining a first uplink delay based on the first delay and the fourth delay, and determining a second uplink delay based on the second delay and the fifth delay; and
determining the uplink delay of the first DRB based on the first uplink delay and the second uplink delay; or
the first information comprises the information about the third delay, and the determining of an uplink delay of the first DRB based on the first information, a fourth delay, and a fifth delay comprises:
  determining a sixth delay based on the fourth delay and the fifth delay, and determining the uplink delay of the first DRB based on the third delay and the sixth delay.

7. The method according to claim 1, wherein if the first information comprises the information about the first delay and the information about the second delay, the first information further comprises an identifier corresponding to the first delay and an identifier corresponding to the second delay.

8. A network device, comprising:
a processor, and
a memory coupled to the processor, the memory comprising instructions that, when executed by the processor, cause the network device to:
receive first information from a terminal device, wherein the first information comprises information about a first delay and information about a second delay, or the first information comprises information about a third delay, the first delay is a delay of the terminal device on a first path, the second delay is a delay of the terminal device on a second path, the third delay is obtained by the terminal device based on the delay of the terminal device on the first path and the delay of the terminal device on the second path, the first path is used to transmit a first data packet, the second path is used to transmit a second data packet, and both the first data packet and the second data packet belong to a first data radio bearer (DRB); and
determine an uplink delay of the first DRB based on the first information, a fourth delay, and a fifth delay, wherein the fourth delay is a network-side delay on the first path, and the fifth delay is a network-side delay on the second path.

9. The network device according to claim 8, wherein the network-side delay on the first path is a delay of a first network device on the first path, and the network-side delay on the second path is a delay of a second network device on the second path.

10. The network device according to claim 9, wherein the instructions, when executed by the processor, further cause the network device to:
receive the fifth delay from a second communication device before determining an uplink delay of the first DRB based on the first information, a fourth delay, and a fifth delay.

11. The network device according to claim 9, wherein the first delay comprises a delay between a time point at which a packet data convergence protocol (PDCP) entity of the terminal device receives the first data packet from an upper layer and a time point at which the terminal device obtains an uplink grant for sending the first data packet to the first network device, and the second delay comprises a delay between a time point at which the PDCP entity of the terminal device receives the second data packet from the upper layer and a time point at which the terminal device obtains an uplink grant for sending the second data packet to the second network device.

12. The network device according to claim 8, wherein the network-side delay on the first path is a network-side delay on a path corresponding to a first radio link control (RLC) entity of the first network device, and the network-side delay on the second path is a network-side delay on a path corresponding to a second RLC entity of the first network device.

13. The network device according to claim 8, wherein the first information comprises the information about the first delay and the information about the second delay, and the determining an uplink delay of the first DRB based on the first information, a fourth delay, and a fifth delay comprises:
  determining a first uplink delay based on the first delay and the fourth delay, and determining a second uplink delay based on the second delay and the fifth delay; and
  determining the uplink delay of the first DRB based on the first uplink delay and the second uplink delay; or
  the first information comprises the information about the third delay, and the determining an uplink delay of the first DRB based on the first information, a fourth delay, and a fifth delay comprises:
  determining a sixth delay based on the fourth delay and the fifth delay, and determining the uplink delay of the first DRB based on the third delay and the sixth delay.

14. The network device according to claim 8, wherein if the first information comprises the information about the first delay and the information about the second delay, the first information further comprises an identifier corresponding to the first delay and an identifier corresponding to the second delay.

15. A terminal device, comprising:
a processor, and
a memory coupled to the processor, the memory comprising instructions that, when executed by the processor, cause the terminal device to:
obtain first information, wherein the first information comprises information about a first delay and information about a second delay, or the first information comprises information about a third delay, the first delay is a delay of a terminal device on a first path, the second delay is a delay of the terminal device on a second path, the third delay is obtained by the terminal device based on the delay of the terminal device on the first path and the delay of the terminal device on the second path, the first path is used to transmit a first data packet, the second path is used to transmit a second data packet, and both the first data packet and the second data packet belong to a first data radio bearer (DRB); and
send the first information to a first network device,
wherein a network-side delay on the first path is a delay of the first network device on the first path, and a network-side delay on the second path is a delay of a second network device on the second path,
wherein the first delay comprises a delay between a time point at which a packet data convergence protocol (PDCP) entity of the terminal device receives the first data packet from an upper layer and a time point at which the terminal device obtains an uplink grant for sending the first data packet to the first network device, and the second delay comprises a delay between a time point at which the PDCP entity of the terminal device receives the second data packet from the upper layer and a time point at which the terminal device obtains an uplink grant for sending the second data packet to the second network device.

16. The terminal device according to claim 15, wherein if the first information comprises the information about the first delay and the information about the second delay, the first information further comprises an identifier corresponding to the first delay and an identifier corresponding to the second delay, and the identifiers are used to distinguish between different delays.

17. A terminal device, comprising:
a processor, and
a memory coupled to the processor, the memory comprising instructions that, when executed by the processor, cause the terminal device to:
obtain first information, wherein the first information comprises information about a first delay and information about a second delay, or the first information comprises information about a third delay, the first delay is a delay of a terminal device on a first path, the second delay is a delay of the terminal device on a second path, the third delay is obtained by the terminal device based on the delay of the terminal device on the first path and the delay of the terminal device on the second path, the first path is used to transmit a first data packet, the second path is used to transmit a second data packet, and both the first data packet and the second data packet belong to a first data radio bearer (DRB); and
send the first information to a first network device,
wherein a network-side delay on the first path is a network-side delay on a path corresponding to a first radio link control (RLC) entity of the first network device, and a network-side delay on the second path is a network-side delay on a path corresponding to a second RLC entity of the first network device,
wherein the first delay comprises a delay between a time point at which a PDCP entity of the terminal device receives the first data packet from an upper layer and a time point at which the terminal device obtains an uplink grant for sending the first data packet to the first RLC entity, and the second delay comprises a delay between a time point at which the PDCP entity of the terminal device receives the second data packet from the upper layer and a time point at which the terminal device obtains an uplink grant for sending the second data packet to the second RLC entity.

* * * * *